(12) United States Patent
Rink et al.

(10) Patent No.: US 7,399,977 B2
(45) Date of Patent: Jul. 15, 2008

(54) APPARATUS AND METHOD FOR DETERMINING RADIATION DOSE

(75) Inventors: Alexandra Rink, Aurora (CA); David Jaffray, Etobicoke (CA); I. Alex Vitkin, Toronto (CA)

(73) Assignee: University Health Network, Toronto, Onatrio (CA)

( * ) Notice: Subject to any disclaimer, the term of this patent is extended or adjusted under 35 U.S.C. 154(b) by 0 days.

(21) Appl. No.: 11/187,810

(22) Filed: Jul. 25, 2005

(65) Prior Publication Data

US 2006/0017009 A1    Jan. 26, 2006

Related U.S. Application Data

(60) Provisional application No. 60/590,369, filed on Jul. 23, 2004.

(51) Int. Cl.
  *G01T 1/02*  (2006.01)
(52) U.S. Cl. .................. 250/484.5; 250/459.1
(58) Field of Classification Search ............. 250/484.5, 250/484.3, 484.4, 583, 581, 580
See application file for complete search history.

(56) References Cited

U.S. PATENT DOCUMENTS

| | | | |
|---|---|---|---|
| 4,734,355 A | | 3/1988 | Lewis et al. |
| 4,784,934 A | | 11/1988 | Lewis et al. |
| 4,804,514 A | * | 2/1989 | Bartko et al. .......... 376/154 |
| 5,002,852 A | | 3/1991 | Lewis et al. |
| 5,030,834 A | | 7/1991 | Lindmayer et al. |
| 5,332,903 A | | 7/1994 | Buehler et al. |
| 5,596,199 A | * | 1/1997 | McNulty et al. ....... 250/370.07 |
| 5,606,163 A | * | 2/1997 | Huston et al. ............ 250/337 |
| 5,777,341 A | | 7/1998 | Seiwatz et al. |
| 5,892,234 A | | 4/1999 | McKeever et al. |
| 5,938,605 A | | 8/1999 | Häsing et al. |
| 5,962,857 A | | 10/1999 | McKeever et al. |
| 6,041,150 A | | 3/2000 | Hasing et al. |

(Continued)

FOREIGN PATENT DOCUMENTS

CA    2024480    3/1991

(Continued)

OTHER PUBLICATIONS

Gladstone D.J. and Chin L.M., Automated data collection and analysis system for MOSFET radiation detectors, Med Phys 18(3), pp. 542-548: May/Jun. 1991.

(Continued)

*Primary Examiner*—David P. Porta
*Assistant Examiner*—Mark R. Gaworecki
(74) *Attorney, Agent, or Firm*—Bereskin & Parr

(57) ABSTRACT

A radiation dosimeter system and method for estimating a deposited radiation dose to an object involves locating at least one radiation dosimeter at the object. The radiation dosimeter includes a radiation sensitive medium having an optical property that changes due to the deposited radiation dose. An optical interrogation signal is provided to the radiation dosimeter via an enclosed optical path for interacting with the radiation sensitive medium. During irradiation, the optical interrogation signal is transformed into an optical information signal that encodes an ionizing radiation induced change in the optical property of the radiation sensitive medium. The radiation dosimeter system then processes the optical information signal for estimating the deposited radiation dose.

52 Claims, 22 Drawing Sheets

U.S. PATENT DOCUMENTS

| | | | |
|---|---|---|---|
| 6,076,010 A * | 6/2000 | Boas et al. | 600/477 |
| 6,087,666 A | 7/2000 | Huston et al. | |
| 6,138,083 A * | 10/2000 | Videen | 702/155 |
| 6,140,651 A * | 10/2000 | Justus et al. | 250/390.11 |
| 6,278,117 B1 | 8/2001 | Bardash | |
| 6,285,031 B1 | 9/2001 | Listl et al. | |
| 6,402,689 B1 * | 6/2002 | Scarantino et al. | 600/300 |
| 6,452,203 B1 | 9/2002 | Struye et al. | |
| 6,787,107 B2 | 9/2004 | Steklenski | |
| 6,892,948 B2 | 5/2005 | Steklenski et al. | |
| 6,936,830 B2 | 8/2005 | Gaza et al. | |
| 6,963,771 B2 | 11/2005 | Scarantino et al. | |
| 6,969,860 B1 | 11/2005 | Takehisa et al. | |
| 7,227,158 B1 * | 6/2007 | Patel et al. | 250/484.5 |
| 2003/0125616 A1 * | 7/2003 | Black et al. | 600/407 |
| 2003/0212302 A1 * | 11/2003 | Rozenfeld et al. | 600/1 |
| 2005/0090738 A1 * | 4/2005 | Black et al. | 600/436 |

FOREIGN PATENT DOCUMENTS

| | | |
|---|---|---|
| EP | 0 416 493 A2 | 3/1991 |
| WO | WO 97/17595 | 5/1997 |
| WO | WO 00/62092 | 10/2000 |
| WO | WO 01/52622 A2 | 7/2001 |
| WO | WO 03/092813 A1 | 11/2003 |

OTHER PUBLICATIONS

Klassen N.V., van der Zwan L., Gygler J., GafChromic MD-55: Investigated as a precision dosimeter, Med Phys 24(12), pp. 1924-1934: Dec. 1997.

McLaughlin W.L. et al., Sensitometry of the response of a new radiochromic film dosimeter to gamma radiation and electron beams, Nuclear Instruments and Methods in Physics Research A302 (1991), pp. 165-176.

Bueker H., and Haesing F.W., Fiber-optic radiation sensors, Proc SPIE 2425, p. 106-114: 1994.

Gripp S. et al., Clinical in vivo dosimetry using optical fibers, Radiat Oncol Invest 6, p. 142-149: 1998.

Saylor M.C., Tamargo T.T., McLaughlin W.L., A thin film recording medium for use in food irradiation, Radial Phys Chem 31(4-6), pp. 529-538: 1988.

Niroomand-Rad A. et al., Radiochromic film dosimetry: recommendations of AAPM radiation therapy committee Task Group 55, Med Phys 25(11), pp. 2093-2115: 1998.

Chiu-Tsao S., Zerda A., Lin J., Kim J.H., High-sensitivity GafChromic film dosimetry for $^{125}$I seed, Med Phys 21(5), pp. 651-657: 1994.

Becks K.H. et al., A multichannel dosimeter based on scintillating fibers for medical applications, Nucl Instrum Methods Phys Res A 454, p. 147-151: 2000.

Chu R.D.H. et al., GafChromic™ Dosimetry Media: A New High Dose, Thin Film Routine Dosimeter And Dose Mapping Tool, Radiat Phys Chem, 35(4-6), pp. 767-773: 1990.

Huston A.L. et al., Remote optical fiber dosimetry, Nucl Instrum Methods Phys Res B 184, p. 55-67: 2001.

Mack A. et al., High precision film dosimetry with GafChromic® films for quality assurance especially when using small fields, Med Phys 30(9), pp. 2399-2409: 2003.

Justus B.L. et al., Gated fiber-optic-coupled detector for in vivo real-time radiation dosimetry, Applied Optics, 43(8), pp. 1663-1668: 2004.

Reinstein L.E. and Gluckman G.R., Optical density dependence on postirradiation temperature and time for MD-55-2 type radiochromic film, Med Phys 26(3), pp. 478-484: 1999.

Sullivan P.R., Hasson B.F., Grossman C.H., Simpson L.D., Optical density changes of GafChromic MD-55 film resulting from laser light exposure at wavelengths of 671 nm and 633 nm, Med Phys 27(1), pp. 245-251: 2000.

Gaza R., McKeever S.W.S., Akselrod M.S., Near-real-time radiotherapy dosimetry using optically stimulated luminescence of $Al_2O_3$:C: Mathematical models and preliminary results, Med Phys 32(4), pp. 1094-1102: 2005.

Ali I., Costescu C., Vicic M., Dempsey J.F., Williamson J.F., Dependence of radiochromic film optical density post-exposure kinetics on dose and dose fractionation, Med Phys 30(8), pp. 1958-1967, 2003.

Cheung T., Butson M.J., Yu P.K.N., Use of multiple layers of Gafchromic film to increase sensitivity, Phys Med Biol 46, pp. N235-N240, 2001.

Rink A., Vitkin, I.A. and Jaffray, D.A., Suitability of radiochromic medium for real-time optical measurements of ionizing radiation dose, Med. Phys. 32(4), pp. 1140-1155: Apr. 2005.

Bueker, H. et al., Fiber-Optic Radiation Dosimetry for Medical Applications, SPIE vol. 1201 Optical Fibers in Medicine V, pp. 419-429, 1990.

* cited by examiner

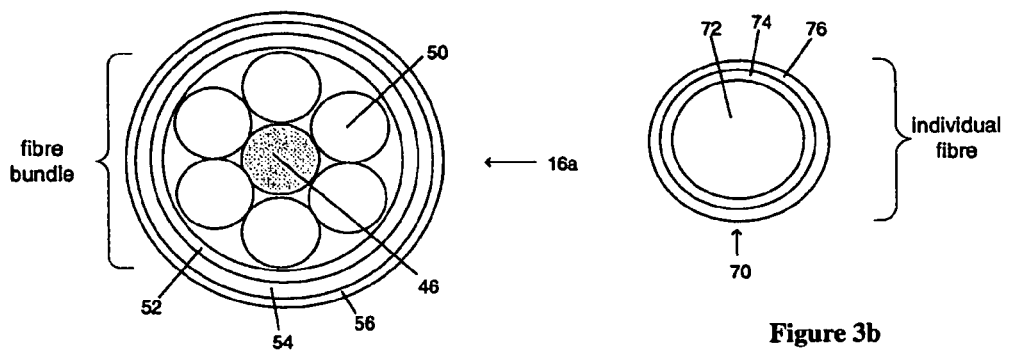
Figure 3a
Figure 3b
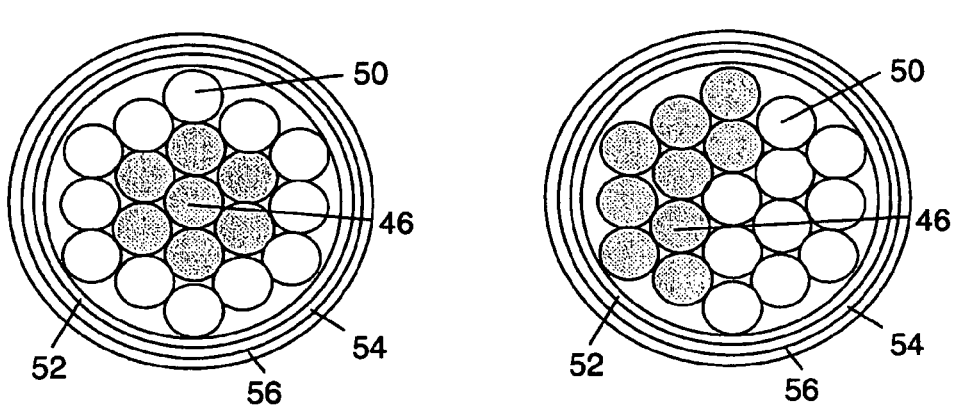
Figure 3c
Figure 3d
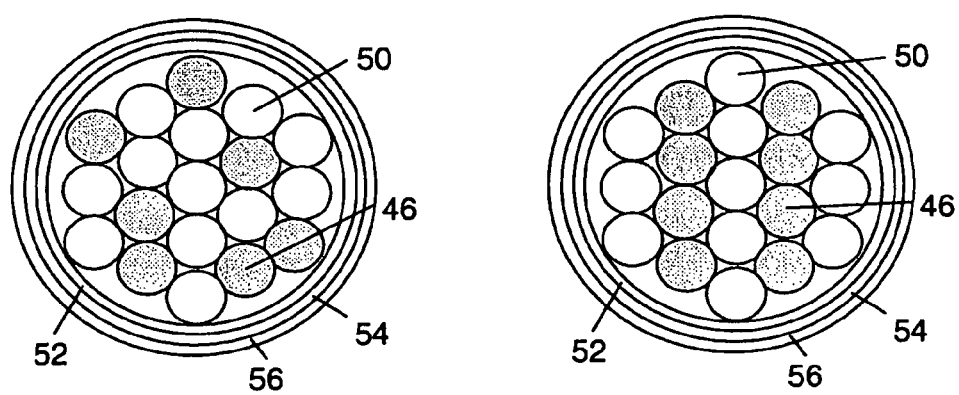
Figure 3e
Figure 3f

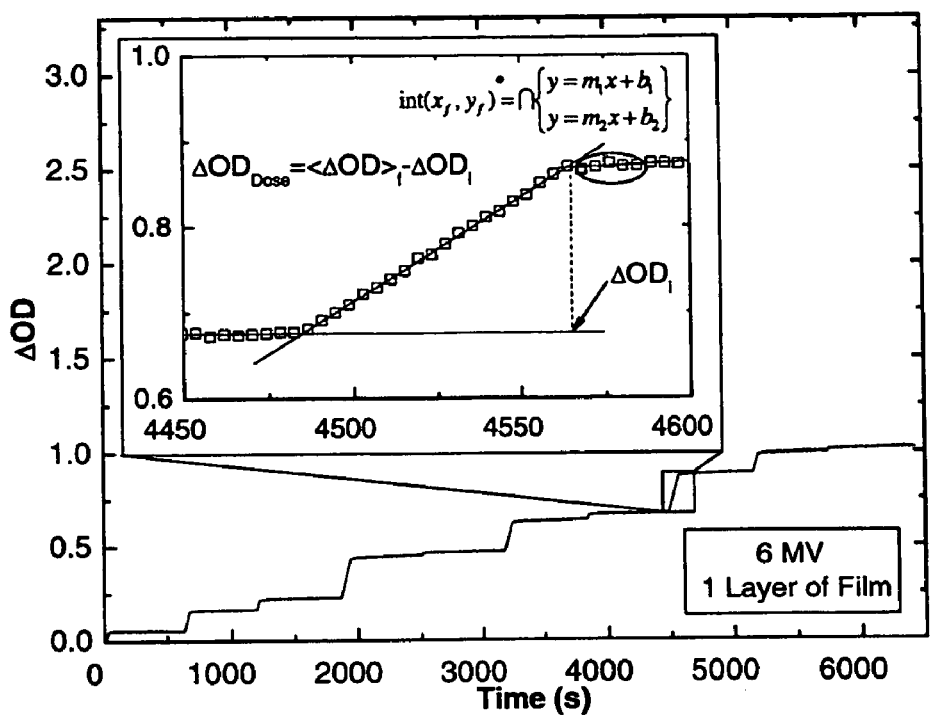
Figure 10e
Figure 11a
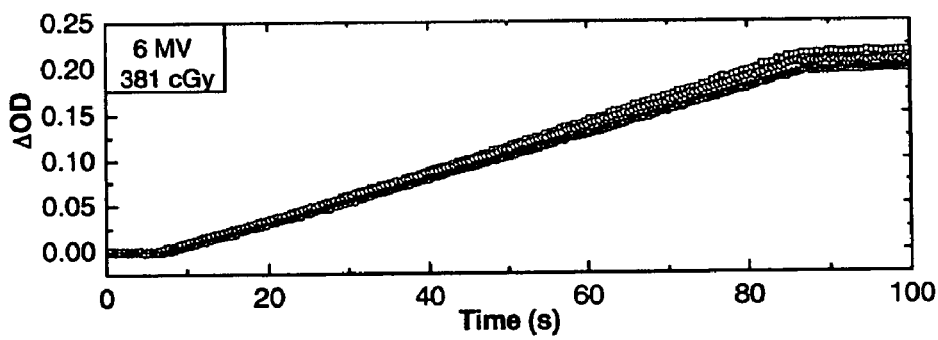
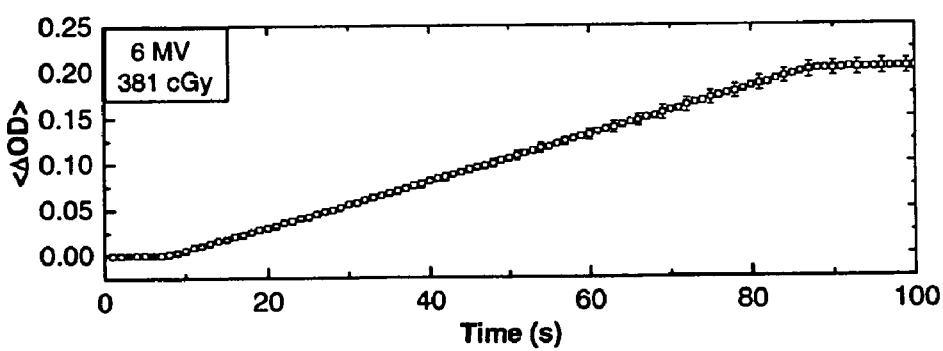
Figure 11b

APPARATUS AND METHOD FOR DETERMINING RADIATION DOSE

REFERENCE TO RELATED APPLICATION

This application claims priority from U.S. Provisional Patent Application Ser. No. 60/590,369 filed on Jul. 23, 2004.

FIELD OF THE INVENTION

The invention relates to an apparatus and method for measuring ionizing radiation dose. More particularly, this invention relates to an apparatus and a method for estimating the radiation dose delivered to a patient.

BACKGROUND OF THE INVENTION

Approximately 50% of cancer patients receive radiation therapy for treatment of their disease. A majority of the treatments are divided into fractions, in which radiation doses are delivered daily over several weeks. Treating patients with an ionizing radiation dose that is within 5% of the prescribed dose is vital to their recovery, elimination of cancerous growth and is also required by the International Commission of Radiation Units and Measurements [ICRU Report 24, 1976]. Accordingly, performing quality assurance on the delivered treatment is important for exposing any inconsistencies in treatment delivery so that the prescribed dose for the fraction of delivered radiation in the next treatment can be altered to increase the efficacy of the treatment. Furthermore, ionizing radiation is employed in diagnostic tests and in interventional imaging procedures. The measurement of applied dose is of great value in these contexts.

Currently, there are a few techniques used to estimate the actual amount of radiation that is given to a patient. However, many of these techniques are not used during each treatment session, do not provide a real time estimate of the delivered radiation dose, or cannot be used in situ (i.e. placed within the tissue of the patient).

One way to estimate the dose to be delivered to a patient is to rely on a dose measured with an accepted dosimeter (MOSFET or ion chamber) within a phantom. A phantom is an inanimate representation of the patient for purposes of dosimetry. However, this technique does not provide the actual applied dose, and a conversion from dose in phantom to dose in patient would still have to be performed. It can give a general estimate of dose delivered to the volume treated and provide a rough shape of dose distribution. However, the best estimate of dose is always one that is measured during the actual treatment, as there are many differences between a phantom and an actual patient (i.e. properties of tissue vary within a patient and between patients, breathing motion, internal organ motion between treatments, etc).

One technique for measuring dose to the patient in current, limited use is to rely on thermal luminescence dosimeters (TLD), which are often used in the personal monitors that are worn by workers in environments in which radiation is used to determine the radiation exposure of the workers. The personal monitors contain radiation sensitive material that may be analyzed to determine radiation dose. Current accepted processing methods typically require post-exposure, high-temperature curing followed by rigorous processing steps, and therefore cannot provide a radiation dose measurement right away. The TLD material may be placed on the patient during radiation therapy and used to do initial measurements at the beginning of a patient's treatment program. However, because of the rigorous processing procedure required, at best, the dose is read out the same day as the treatment is delivered and not immediately after or during the treatment.

Another radiation dosimeter that is currently in limited use is MOSFET-based. The MOSFET-based radiation dosimeter includes metallic components and the signal is transmitted via metallic conductive wires. While it is possible to use metallic components in the dosimeter, the metallic components and wires interact with the ionizing radiation which may prevent accurate measurements from being made.

Another type of dosimeter is an ionization micro-chamber dosimeter that relies on electronics-based measurements, and has inner metallic components. The inside of the ionization micro-chamber, which can be as small as 2.0 mm$^3$, is filled with air. The interaction of a volume of air with ionizing radiation is quite different than that of the same volume of water. Hence the air also contributes to the alteration of prescribed dose in the vicinity of the detector. Aside from these issues, ionization micro-chamber dosimeters are also quite expensive (i.e. approximately $5,000 CDN). At this price, it would be extremely difficult to implement such a dosimeter for daily patient dosimetry, unless each dosimeter was sterilized and reused (but this can also be costly). The ionization micro-chamber dosimeters are also complicated to use, and are generally operated by physicists.

Metallic wires may still be used in a dosimeter. However, it is beneficial to use another material that won't affect radiation delivery or radiation measurement, is cost-effective, and is safe and robust for use with patients. Further, there is a need for radiation dosimeters that can determine the amount of radiation that is delivered to the surface as well as the sub-surface of the patient during treatment. It is also desirable to have a radiation dosimeter that enables estimation of the delivered radiation dose quickly (in real-time), so that the medical practitioner can stop treatment and adjust the prescribed radiation dose during current treatment session if necessary.

SUMMARY OF THE INVENTION

The inventors have developed a radiation dosimetry system and method that provides real-time measurements of the radiation dose that is delivered to a patient as well as the radiation dose rate, with minimal disturbance to the ionizing radiation dose. This is in contrast to currently practiced methods using passive devices which may require as long as one day to obtain radiation measurements. The system of the invention may provide measurements before, during and after delivery of radiation by measuring an optical property of a radiation sensitive medium that changes when the medium is subjected to ionizing radiation. At any time during exposure, the optical property may be measured, and compared to a previous value such as a baseline measure obtained during pre-exposure for example. The system of the invention can sense the start of exposure by detecting a change in the optical property above the baseline value. The measured optical property can then be converted using a sensitivity factor (obtained from a pre-exposure calibration) to a dose value. This can be done in at most a few seconds. Dose rate can also be measured in real-time in a similar fashion. This is important since an unexpected dose-rate automatically signals an error with the delivery of the radiation. Measuring the dose rate allows a radiation therapist to quickly take action in the event that there is a problem without having to wait for the radiation fraction to be delivered. The system and method of the invention enables the radiation therapist to continuously monitor the delivery of the radiation.

The inventive system and method may also use an optical property model in certain cases. The model allows one to include pre-exposure, during-exposure and post-exposure data, to estimate the delivered radiation and take any effects into account that would otherwise reduce the accuracy of the radiation dose estimate. Such effects may include the age of the radiation sensitive material, and any post radiation delivery effects experienced by the radiation sensitive material. The optical property model provides an expected shape for the change in optical property for the radiation sensitive medium when it is subjected to radiation. The optical property model may be a linear optical property model which applies to a linear radiation sensitive medium that is being subjected to ionizing radiation at a constant dose rate. The optical property model may be a continuous and increasing optical property model which applies to a linear radiation sensitive medium that is being subjected to ionizing radiation at a non-constant dose rate. The optical property model may be a non-linear optical property model which applies to a non-linear radiation sensitive medium that is being subjected to ionizing radiation at a constant dose rate or non-constant dose rate.

In a first aspect, at least one embodiment of the invention provides a radiation dosimeter system for estimating a deposited radiation dose to an object. The radiation dosimeter system comprises at least one radiation dosimeter located at or within the object, and the radiation dosimeter includes a radiation sensitive medium having an optical property that changes due to the deposited radiation dose. The radiation dosimeter system provides an optical interrogation signal to the radiation dosimeter via an enclosed optical path for interacting with the radiation sensitive medium. In use, the optical interrogation signal is transformed into an optical information signal that encodes an ionizing radiation induced change in the optical property and the radiation dosimeter system processes the optical information signal for estimating the deposited radiation dose.

In one embodiment, the radiation dosimeter system further comprises a processing assembly connected to the at least one radiation dosimeter for providing the optical interrogation signal to the radiation dosimeter and receiving the optical information signal from the radiation dosimeter; and, an analysis unit connected to the processing assembly for enabling the radiation dosimeter to measure the deposited radiation dose by receiving and analyzing the optical information signal.

Further, the at least one radiation dosimeter is coupled to the processing assembly via an optical fiber cable and the at least one radiation dosimeter includes a connection port for connecting to the optical fiber cable, the radiation sensitive medium for sensing the deposited radiation dose, where the optical property of the radiation sensitive medium changes due to the delivered radiation at a rate enabling real-time estimation of the deposited radiation dose; a delivery conduit coupled to the connection port and the radiation sensitive medium for delivering the optical interrogation signal to the radiation sensitive medium; and, a return conduit coupled to the connection port and the radiation sensitive medium for receiving the optical information signal from the radiation sensitive medium and delivering the optical information signal to the connection port.

The optical property includes optical density and the radiation sensitive medium undergoes a rate of change in optical density that is related to the dose rate at which the radiation dose is deposited.

The analysis unit analyses the rate of change in optical density of the radiation sensitive medium by employing a process to estimate the applied dose rate and cumulative applied dose by using an optical property model based upon prior knowledge of a relation between at least one of dose rate and total accumulated dose, and the rate of change in optical density of the radiation sensitive medium.

In another aspect, at least one embodiment of the invention provides a radiation dosimeter for use in estimating a deposited radiation dose to an object. The radiation dosimeter comprises a connection port; a radiation sensitive medium for sensing the deposited radiation dose, the radiation sensitive medium having an optical property that changes due to the deposited radiation at a rate enabling real-time estimation of the deposited radiation dose; a delivery conduit coupled to the connection port and the radiation sensitive medium for delivering an optical interrogation signal to the radiation sensitive medium; and, a return conduit coupled to the connection port and the radiation sensitive medium for receiving an optical information signal from the radiation sensitive medium and delivering the optical information signal to the connection port. In use, the optical property of the radiation sensitive medium is modified by the deposited radiation dose and the optical interrogation signal is transformed by an ionizing radiation induced change in the optical property of the radiation sensitive medium and this change in the optical property is encoded in the optical information signal thereby allowing for the estimation of the deposited radiation dose.

The delivery conduit includes a plurality of delivery optical fibers and the return conduit includes a plurality of return optical fibers, and the plurality of delivery optical fibers are positioned off-center with respect to the longitudinal axis of the radiation dosimeter.

In one instance, the delivery and return conduit are located in an optical fiber bundle and the plurality of delivery and return optical fibers are randomly dispersed within the optical fiber bundle.

In another instance, the delivery and return conduit are located in an optical fiber bundle and the plurality of delivery and return optical fibers are arranged in one of an alternating row configuration and an alternating column configuration.

The optical property is optical density. In one instance, the radiation sensitive medium is made from radiation sensitive material with an optical density that increases with applied dose regardless of the cumulative total dose applied when the total cumulative applied dose is less than a saturation point at which there is a significant loss in sensitivity.

In another instance, the optical property is optical density and the radiation sensitive medium is made from a radiation sensitive material having a non-linear change in optical density in response to ionizing radiation.

In a further aspect, at least one embodiment of the invention provides a method for estimating a deposited radiation dose to an object comprising:

a) locating at least one radiation dosimeter at or within the object, the radiation dosimeter including a radiation sensitive medium having an optical property that changes in response to ionizing radiation in a manner related to the deposited radiation dose;

b) providing an optical interrogation signal to the radiation dosimeter while the radiation dose is delivered to the object for interacting with the radiation sensitive medium, wherein the optical interrogation signal is transformed into an optical information signal which encodes the change in the optical property; and, c) analyzing the change in the optical property of the radiation sensitive medium that is encoded in the optical information signal using an optical property model for estimating the deposited radiation dose therefrom.

In one instance, the optical property of the radiation sensitive medium changes due to the deposited radiation dose at a rate enabling real-time estimation of the deposited radiation dose.

In one instance, the optical property includes optical density and the radiation sensitive medium undergoes a rate of change in optical density that is related to the dose rate at which the radiation dose is deposited.

In one instance, the method further includes generating the optical interrogation signal in a wavelength range that includes the wavelength at which an optimum change in optical density occurs for the radiation sensitive medium for a given dose range of the deposited radiation dose.

In one instance, the method further includes analyzing the optical information signal by using a spectral window of interest that is generated to include the wavelength at which an optimum change in optical density occurs for the radiation sensitive medium for a given dose range of the deposited radiation dose.

In one instance, the optical property of the radiation sensitive medium has a linear or non-linear response to ionizing radiation and the method further includes shifting the spectral window of interest if there are variations of the wavelength at which an optimum change in optical density occurs based on at least one of the temperature of the radiation sensitive medium, the cumulative total dose applied to the radiation sensitive medium, and age of the radiation sensitive medium.

The method includes characterizing the change in optical density of the radiation sensitive medium by the optical property model based on prior knowledge of a relation between at least one of the delivered dose rate, and total accumulated dose, and the rate of change in optical density of the radiation sensitive medium.

In one instance, the optical property of the radiation sensitive material has a linear response to the deposited radiation dose during ionization, and the method further includes calibrating the radiation dosimeter prior to use by calculating a sensitivity factor by: irradiating the radiation dosimeter with a single known calibration dose over a time interval; calculating the resulting change in optical density for the single known calibration dose over the time interval; obtaining calibration values including the optical density change near the start and end of the time interval; and, fitting a line to the calibration values and calculating the sensitivity factor by determining the slope of the line over the time interval.

In one instance, the optical property model is a linear optical property model including a baseline optical density value, and the method includes estimating the delivered radiation at a given time by measuring the optical density for the given time, subtracting a baseline optical density value and multiplying by the sensitivity factor obtained during calibration of the radiation dosimeter.

The linear optical property model includes a pre-delivery phase, and a delivery phase, each phase being characterized by line having a different rate of change in optical density, the method further including: finding the intersection of the lines corresponding to the pre-delivery phase and the delivery phase to determine the beginning of radiation delivery and defining a first optical density thereat; measuring a second optical density after the beginning of radiation delivery; and, subtracting the first optical density from the second optical density to generate a change in optical density during delivery of the radiation dose.

The linear optical property model further includes a post-delivery phase being characterized by a line having a different slope from the lines representing the pre-delivery and delivery phases, the method further including: finding the intersection of the lines corresponding to the delivery phase and post-delivery phase to determine the end of radiation delivery and defining a third optical density thereat; and, subtracting the first optical density from the third optical density to generate a total change in optical density during delivery of the radiation dose.

In one instance, the optical property model is a continuous and increasing optical property model including a pre-delivery phase, a delivery phase and a post-delivery phase, the pre-delivery and post-delivery phases being identified when the time derivative of the optical density change has a value comparable to a predefined threshold value representing noise, and wherein the continuous and increasing optical property model includes a baseline optical density value, and the method further includes estimating the delivered radiation at a given time by measuring the optical density for the given time, subtracting a baseline optical density value therefrom and multiplying by the sensitivity factor obtained during calibration of the radiation dosimeter.

In one instance, the optical property of the radiation sensitive material has a non-linear response to the deposited radiation dose during ionization, and the method further includes calibrating the radiation dosimeter prior to use by: irradiating the radiation dosimeter with a known calibration dose taking into account the total accumulated dose that the nonlinear radiation sensitive medium has been subjected to since first use; calculating the resulting change in optical density over several time intervals during irradiation to the known calibration dose; and, calculating a calibration relationship between the time derivative of the change in optical density and the time derivative of the known given dose at the several intervals during the entire exposure to calibration dose.

For the radiation sensitive material having a non-linear response, the method further includes fitting a line to the calibration data to determine an equation that defines the calibration relationship between the time derivative of the change in optical density and the time derivative of the known given dose over the entire exposure to the calibration dose.

For the non-linear response material, the method may further include generating a lookup table that provides information for estimating the deposited radiation dose based on a given optical change, the information including data relating a change in optical density to applied dose and the information further including a set of scaling factors obtained from the calibration relationship for adjusting the change in optical density based on the total accumulated dose being given thus far to the radiation dosimeter.

The non-linear optical property model includes a pre-delivery phase, a delivery phase and a post-delivery phase, the pre-delivery and post-delivery phases can be identified when the time derivative of the optical property change is comparable to a predefined threshold value representing noise.

For the non-linear response material, estimating the deposited radiation dose during use for a given time interval may include:

a) noting the previous dose that the radiation dosimeter had been subjected to prior to the given time interval;

b) measuring the time derivative of the change in optical density for the given time interval;

c) using the calibration relationship and the total dose delivered to radiation dosimeter thus far to obtain a sensitivity factor expected for this time interval; and, d) multiplying the sensitivity factor by the time derivative of the change in optical density and the time duration of the given time interval.

In another aspect, at least one embodiment of the invention provides a method of creating an optical property model for calibrating a radiation dosimeter for estimating a radiation dose applied to an object, wherein the method comprises:

a) selecting a radiation sensitive medium that undergoes an ionizing radiation induced change in an optical property when subjected to the radiation dose;

b) selecting one of a linear, a continuous and increasing, and non-linear optical property model depending on the response properties of the optical property of the radiation sensitive medium and the dose rate of the applied radiation dose;

c) exposing the radiation sensitive medium to a range of doses and dose rates to obtain calibration data and parameters for classifying the behaviour of the radiation sensitive medium; and, d) using the parameters, calibration data and selected optical property model for estimating the radiation dose during use of the radiation dosimeter.

In one instance, the method includes classifying the behaviour of the radiation sensitive medium at short time scales during which the optical property changes at a rate allowing radiation dose to be estimated in real-time.

In one instance, the linear optical property model is selected and the method further includes characterizing the linear optical property model by defining a pre-delivery phase, a delivery phase and a post-delivery phase, each phase being characterized by defining a line, the beginning of radiation delivery being identified by the intersection of the lines indicating the pre-delivery phase and the delivery phase and the end of radiation delivery being identified by the intersection of the lines indicating the delivery phase and post-delivery phase.

In another instance, one of the continuous and increasing optical property model and the non-linear optical property model is selected, and the method further includes characterizing the selected optical property model by defining a pre-delivery phase, a delivery phase and a post-delivery phase, the pre-delivery and post-delivery phases being identified when the time derivative of the optical property has a value comparable to a predefined threshold value representing noise.

In one instance, one of the linear and the continuous and increasing optical property models is selected and the method further includes calibrating the radiation dosimeter prior to use by calculating a sensitivity factor by:

e) irradiating the radiation dosimeter with a single known calibration dose over a time interval;

f) calculating the resulting change in optical density for the single known calibration dose over the time interval;

g) obtaining calibration values including the optical density change near the start and end of the time interval; and, h) fitting a line to the calibration values and calculating the sensitivity factor by determining the slope of the line over the time interval.

In another instance, the nonlinear optical property model is selected and the method includes calibrating the radiation dosimeter prior to use by:

e) irradiating the radiation dosimeter with a known calibration dose taking into account the total accumulated dose that the radiation sensitive medium has been subjected to since first use;

f) calculating the resulting change in optical density over several time intervals during irradiation to the known calibration dose; and, g) calculating a calibration relationship between the time derivative of the change in optical density and the time derivative of the known given dose at the several intervals during the entire exposure to calibration dose.

BRIEF DESCRIPTION OF THE DRAWINGS

For a better understanding of the invention and to show more clearly how it may be carried into effect, reference will now be made, by way of example only, to the accompanying drawings which show exemplary embodiments of the invention and in which:

FIGS. 3a-3f are cross-sectional views of various exemplary embodiments of delivery and return conduits used in the radiation dosimeter of FIG. 2;

FIG. 8c is an exploded view showing the assembly of the test sensor of FIG. 8a;

FIG. 10e is a graph showing a calculation of $\Delta OD$ while tracking the baseline optical density value for the linear radiation sensitive film and uniform dose-rate;

FIG. 11a is a graph of the change in optical density for five pieces of linear radiation sensitive film, each exposed to 381 cGy with 6 MV X-rays at a uniform dose rate of 286 cGy/min;

FIG. 11b is a graph of the average change in optical density for the data of FIG. 11a;

DETAILED DESCRIPTION OF THE INVENTION

It will be appreciated that for simplicity and clarity of illustration, elements shown in the figures have not necessarily been drawn to scale. For example, the dimensions of some of the elements may be exaggerated relative to other elements for clarity. Further, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

Further it should be noted that the term optimum wavelength and optimum change in an optical property is used herein to denote the wavelength at which the measured optical property provides a good predictable relationship, such as linear for example, with the applied radiation dose. In this sense, the optimum wavelength may include the maximum wavelength at which there is a maximum change in the optical property due to the delivered radiation dose and this change provides a good relationship with the applied dose.

Figure 1:
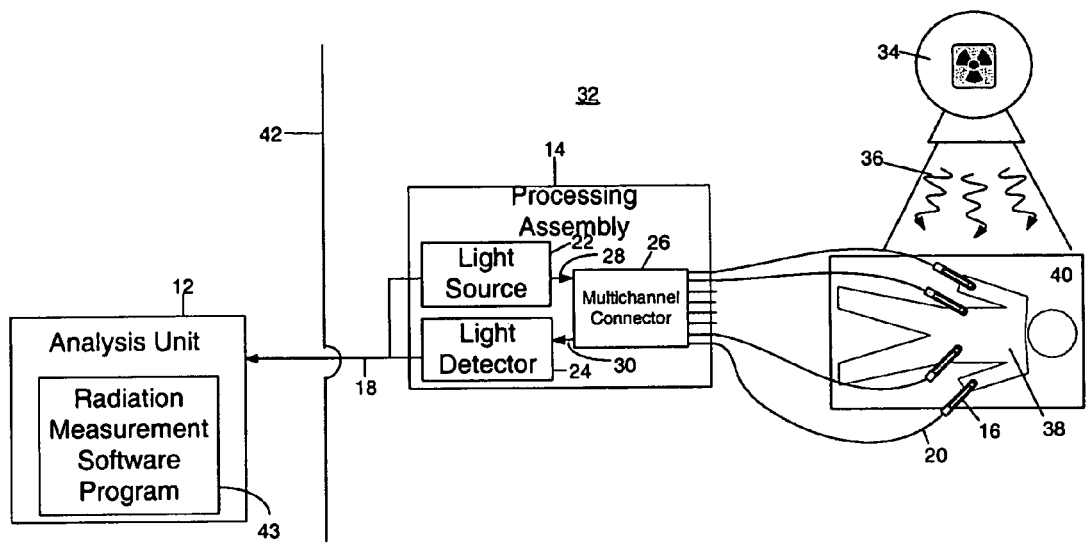
FIG. 1 is a block diagram of an application of an exemplary embodiment of a radiation dosimeter system in accordance with the invention.

Referring first to FIG. 1, shown therein is a block diagram of an application of an exemplary embodiment of a radiation dosimeter system 10 in accordance with the invention. The radiation dosimeter system 10 comprises an analysis unit 12, a processing assembly 14 and at least one radiation dosimeter 16. The analysis unit 12 is connected to the processing assembly 14 by an electrical cable 18 and each radiation dosimeter 16 is preferably connected to the processing assembly 14 via an optical fiber cable 20 (note for simplicity of description only one radiation dosimeter 16 and one optical fiber cable 20 have been labelled). In this exemplary embodiment, the analysis unit 12 may be a computer or other suitable processing device.

The processing assembly 14 includes a light source 22, a light detector 24, and a multi-channel connector 26 connected as shown. In this exemplary embodiment, the light source 22 may be a suitable light emitting diode or the like, and the multi-channel connector 26 may be a suitable optical multiplexing device, as is commonly known to those skilled in the art. The light detector 24 may be a photodiode, a spectrophotometer, a photomultiplier tube with appropriate filter(s) and the like.

The multi-channel connector 26 is optional and may be employed to enable the use of multiple radiation dosimeters 16. The multi-channel connector 26 can switch between individual radiation dosimeters 16, sending and receiving optical signals from each in turn. Alternatively, light from the light source 22 may be provided to all of the radiation dosimeters 16 concurrently, and the multi-channel connector 26 controls the signal going to the light detector 24. Another possibility is the use of a multi-channel spectrophotometer for the light detector 24 which may allow for continuous signal collection for up to eight (and possibly more) radiation dosimeters simultaneously. Several radiation dosimeters 16 may be used if the medical practitioner would like to measure dose in several small volumes within the patient, whether these small volumes are within the volume to be treated (i.e. tumor) or in the peripheral organs (where high dose is to be avoided if unnecessary).

The analysis unit 12 sends a command signal to the light source 22 to generate an optical interrogation signal 28 which is sent to one or more of the radiation dosimeters 16 via the multi-channel connector 26. The radiation dosimeters 16 are located at a suitable location on a patient receiving radiation. The multi-channel connector 26 provides the optical interrogation signal 28 to each of the radiation dosimeters 16 that are in use and receives an optical information signal 30 in return. The transmission of the optical interrogation signal 28 and the reception of the optical information signal 30 is accomplished via the optical fiber cable 20 which includes appropriate transmission optical fibers as discussed in more detail below. The optical information signals 30 are sent to the light detector 24 where they are transduced and converted to corresponding electrical information signals and sent to the analysis unit 12 for analysis.

In use, the processing assembly 14 is placed in a treatment room 32 in which a radiation source 34 provides ionizing radiation 36 to a patient 38. The patient 38 typically lies on a table or "couch" 40 during treatment. The analysis unit 12 is located exterior to the treatment room 32 on the other side of a radiation barrier 42 so that a medical practitioner can interact with a radiation measurement software program 43 on the analysis unit 12 and use the radiation dosimeter system 10 to determine the amount of radiation that is delivered to one or more locations on/within the patient 38 during treatment. The radiation dosimeter system 10 can provide this information in real-time. In an alternative embodiment, the processing assembly 14 may also be located outside of the treatment room 32.

In alternative embodiments, the elements of the radiation dosimeter system 10 may be arranged differently from the arrangement shown in FIG. 1. For instance, the light source 22, light detector 24 and the connector 26 may be separate elements that are not contained within one physical housing. Further, the analysis unit 12 may be contained within the treatment room and may receive and send signals from a computer located outside of the treatment room 32 that is operated by the medical practitioner. In one case, the analysis unit 12 may also be part of the processing assembly 14. Various alternative configurations are available as is well known to those skilled in the art.

Figure 2A:
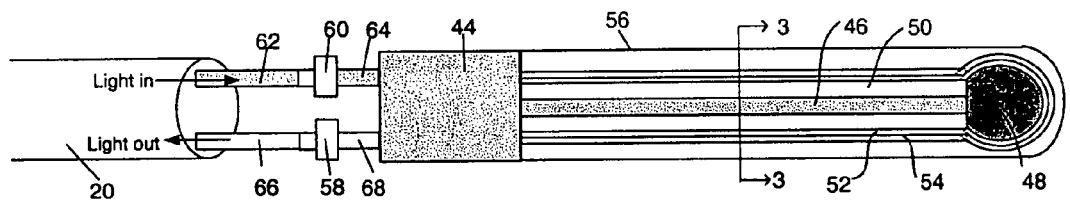
FIGS. 2a and 2b are magnified views of the connection between a radiation dosimeter and a corresponding optical fiber cable used in the radiation dosimeter system of FIG. 1.

Referring now to FIG. 2a, shown therein is a magnified view of one of the radiation dosimeters 16 and the corresponding optical fiber cable 20. The radiation dosimeter 16 is suitable for measuring various optical properties such as optical density, spectroscopy, polarization and the like. The radiation dosimeter 16 includes a connection port 44, a delivery conduit 46 having one or more optical fibers, a radiation sensitive medium 48 and a return conduit 50 having one or more optical fibers. The radiation dosimeter 16 includes a cavity that contains the radiation sensitive medium 48 and a reflective medium 52. The optical fiber(s) in the delivery conduit 46 transmit the optical interrogation signal 28 to the radiation sensitive medium 48. The optical fibers in the return conduit 50 collect the light transmitted through the radiation sensitive medium 48 and reflected from the back surface of the cavity, but not the light that is immediately reflected at the surface of the radiation sensitive medium 48 proximal to the delivery and return conduits 46 and 50.

Various configurations can be used for the optical fiber(s) in the delivery and return conduits 46 and 50 as discussed below. The optical fibers used in the delivery and return conduits 46 and 50 are preferably plastic for cost efficiency reasons since dosimeters may be disposable, and these plastics are preferably chosen such that the delivery and return conduits 46 and 50 provide a response to the ionizing radiation 36 close to that as if they were made of water, and hence would not perturb the delivered or measured dose. For simplicity in description, this property is referred to as being water-equivalent meaning herein that the way in which an element extracts and absorbs energy from ionizing radiation is similar to that of water. This is beneficial since the response of tissue to ionizing radiation is close to that of water. Accordingly, a water-equivalent material will not substantially affect the delivery or measurement of ionizing radiation to tissue. However, there are variations in responses between different types of tissues and within a given volume of tissue. This may make it difficult to select material that truly behaves as the tissue does to the ionizing radiation.

The diameters of the optical fibers used in the conduits 46 and 50 do not have to be the same. For example, the optical fiber(s) in the delivery conduit 46 can have a larger diameter than that of the optical fibers in the return conduit 50, or vice versa.

The delivery and return conduits 46 and 50 and the radiation sensitive medium 48 are encased in the reflective medium 52. The reflective medium 52 may be made from the same material used in the cladding of the optical fibers used in the delivery and return conduits 46 and 50. If a suitable reflective medium cannot be found, a scattering medium, such as $TiO_2$ powder, may be used to perform the same task. In one embodiment, the inside of the cavity containing the radiation sensitive medium 48 may be isotropic, save the flat interface between the delivery and return conduits 46 and 50 and the radiation sensitive medium 48. In other embodiments, the inside of the cavity containing the radiation sensitive medium 48 need not be isotropic as long as the resulting measurements have sufficient quality for the purposes of the invention.

The reflective medium 52 may be encased within a buffer layer 54 which may be made from the same material used in the buffer layer of each optical fiber in the delivery and return conduits 46 and 50. The buffer layer serves to maintain the structural integrity of the fibers contained within it. The entire radiation dosimeter 16 is encased in a casing 56 which may be made from a non-toxic, biocompatible material to permit contact with human tissue or body fluids. Furthermore, it is preferable that the buffer layer does not interfere with applying or measuring radiation doses as is discussed in further detail below.

The radiation sensitive medium 48 is preferably positioned upon the tips of the delivery and return conduits 46 and 50. The shape of the radiation sensitive medium 48 may be quasi-spherical, as shown, or any other shape that enables point-based measurements, with a diameter that may be similar to the inner diameter of the bundle of optical fibers used in the delivery and return conduits 46 and 50 (i.e. not counting the buffer layer 54). For example, in the case where a total of seven optical fibers are used for the delivery and return conduits 46 and 50, the inner diameter of the "overall bundle" is approximately three times the diameter of an individual fiber. If an optical fiber with a 125 μm diameter (including the cladding layer) is chosen, then the diameter of the radiation sensitive medium 48 may be approximately 375 μm. Further, the ends of the optical fibers in the delivery and return conduits 46 and 50 may be flush with the radiation sensitive medium 48. Alternatively, the ends of the optical fibers in the delivery conduit 46 may protrude into the cavity. Various small size shapes can be considered to be point-based and can be used, however, most shapes require precise alignment of fibers. However, in embodiments that use a quasi-spherical design, the issue of precise alignment of the delivery and return conduits 46 and 50 for adequate delivery/reception of an optical signal to/from the radiation sensitive medium 48 is reduced. Having more than one fiber in the return conduit 50 reduces alignment requirements between the radiation sensitive medium 48 and the return conduit 50. In alternative embodiments, other shapes may be used for the radiation sensitive medium 48 although this may have an affect on alignment between the radiation sensitive medium 48 and the delivery and return conduits 46 and 50.

The diameter of the radiation sensitive medium 48 may be as small as the thickness of the fiber bundle (the fiber bundle includes both the delivery and return conduits 46 and 50), hence the dose measurement is point-based. The radiation dosimeter 16 can then be used not only on the surface of the patient 38, but may also be inserted into the patient 38 thus measuring dose at the location of interest, and not only at the skin.

Point-based measurement is beneficial in that it provides a much better spatial resolution of dose distribution than a dosimeter having a radiation sensor with a large volume, where the measurement is an average of the entire volume covered. However, positioning of the radiation sensitive medium 48 is important. Accordingly, the radiation dosimeter 16 may also be manufactured with some sort of marker for image-guided placement, which would preferably have a water-equivalent response as well as being tissue-compatible (i.e. safe to the patient 38), and hence not add any artefacts to either dose distribution or dose measurement. Further the marker is preferably made of material that does not significantly interfere with any imaging that may be performed such as ultrasound, cone-beam CT, MRI, or any other suitable imaging method. The imaging can be used to locate or place the tip of the radiation dosimeter 16 into position.

The connection port 44 connects with the optical fiber cable 20 via a dosimeter-fiber delivery connector 60 and a dosimeter-fiber return connector 58. The delivery connector 60 connects a delivery fiber unit 62 in the optical fiber cable 20 with a dosimeter delivery fiber unit 64. The return connector 58 connects a collection fiber unit 66 in the optical fiber cable 20 with a dosimeter return fiber unit 68. The dosimeter delivery and return fiber units 64 and 68 connect to the delivery and return conduits 46 and 50 of the radiation dosimeter 16 via the connection port 44. These fibres may be made very thick (1.5 mm in diameter for example), to carry a sufficient amount of light power if required. Various configurations are possible for the connection port 44 as is discussed in further detail below.

Figure 2B:
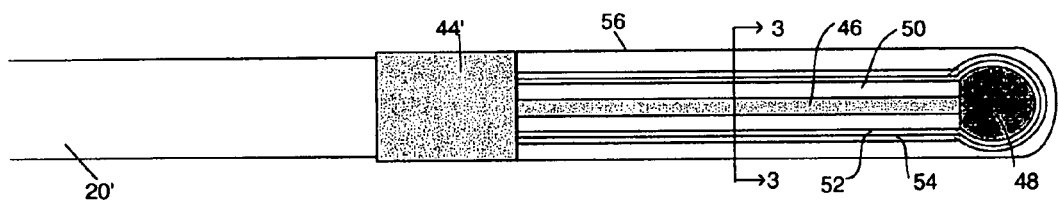

Alternatively, as shown in FIG. 2b, the connection port 44 may be a bundle-to-bundle connector (similar to other snap-on connectors, with the exception that this connects multiple fibers to another set of multiple fibers) and may connect the radiation dosimeter 16 directly to the optical fiber cable 20'. In this case, the optical fiber cable 20' does not contain a delivery fiber unit 62 or a collection fiber unit 66. Instead, the optical fiber cable 20' is itself made up of a fiber bundle which is the same or similar in size as the radiation dosimeter to which it connects. A connection port which transmits the signal from the optical fiber bundle to a single delivery and return fiber may then alternatively be located at the processing assembly 14.

In use, the optical interrogation signal 28 is sent to the radiation sensitive medium 48 via the delivery conduit 46. The optical interrogation signal 28 interacts with the radiation sensitive medium 48 to form the optical information signal 30 and is reflected back to the return conduit 50. At least one optical property of the radiation sensitive medium 48 is changed due to the ionizing radiation 36 that is absorbed by the patient 38 and by the radiation sensitive medium 48 placed within/on the patient 38 during treatment. The change in the optical property of the radiation sensitive medium 48 has an effect on the way in which the optical interrogation signal 28 is reflected or transmitted and this is captured in the optical information signal 30 such that the amount of radiation provided to the patient 38 during treatment can be estimated in real-time. For instance, the optical property may be optical density or reflectance. The use of optical density as the optical property is described in further detail below.

The radiation dosimeter system 10 allows a medical practitioner to estimate the radiation dose delivered to a patient in real-time based on the measurement technique used. The radiation sensitive medium 48 has an optical property that changes due to ionizing radiation. The change in the optical property is captured by the interaction between the radiation sensitive medium and the optical interrogation signal 28. Further, an optical property model can be used to anticipate the fashion in which the optical property changes and to account for any extraneous effects which would otherwise corrupt the measurement of the optical property. The particular optical property that is measured depends on the material used in the radiation sensitive medium and this will have an effect on the structure of the radiation dosimeter. In the exemplary embodiments provided herein, the class of radiation sensitive materials used for the radiation sensitive medium may undergo a change in optical density, a change in shape of absorbance spectrum (i.e. change in wavelength of optimum absorbance, occurrence of new peaks, etc.) or change in light polarization. Depending on the shape of the radiation sensitive medium 48, the radiation dosimeter 16 can be appropriately designed to measure the change in optical density.

The change in the optical property with time when exposed to ionizing radiation may be linear or non-linear depending on the type of radiation sensitive material as well as the dose rate that is used (i.e. constant vs. non-constant dose rate). A linear radiation sensitive material has an optical property that changes in a linear fashion when subjected to ionizing radiation that is radiated at a constant dose rate. Accordingly, the change in the optical property for a linear radiation sensitive material may be described by a linear optical property model for constant dose rate. However, for non-constant dose rates, in some cases, the change in optical property for a linear radiation sensitive material may be non-linear. In these cases a linear calibration model can still be used to quantify radiation dose measurement although the start and end of radiation delivery to a patient is quantified differently for constant and non-constant dose rates. These cases are described in further detail below.

A non-linear radiation sensitive material has an optical property that changes in a non-linear fashion even when subjected to ionizing radiation at a constant dose rate. By extension, it may also behave non-linearly at a non-constant dose rate. The change in optical property for a non-linear radiation sensitive material may be described by a non-linear optical property model with respect to ionizing radiation for both constant and non-constant dose rates. These cases are described in further detail below.

Regardless of linear or non-linear radiation sensitive material and constant or non-constant dose rate, the radiation dose may be estimated at any time during exposure based on measuring the optical property, accounting for baseline values in the optical property and spurious effects such as age of the radiation sensitive material for example, and converting to a delivered radiation dose estimate by using a sensitivity factor obtained during calibration. The radiation dosimeter system 10 can easily provide the estimated dose in a matter of seconds. Based on the optical property model and changes in the measured optical property with time, the beginning of radiation exposure may be sensed as well as the end of radiation exposure. Further, the radiation dose-rate may also be measured in real-time since this value is related to the change in the optical property. The radiation dose-rate may be constantly estimated in real-time. This is beneficial since an unexpected dose-rate may automatically signal an error in the delivery of the radiation. The radiation therapist can pick up on that immediately, without waiting for the radiation fraction to be fully delivered.

Referring now to FIGS. 3a-3f, shown therein are cross-sectional views of various exemplary embodiments of the delivery and return conduits 46 and 50 of the radiation dosimeter 16 taken along line 3-3 in FIGS. 2a and 2b. In each of FIGS. 3a and 3c-3f, only one optical fiber in each conduit 46 and 50 is labeled for simplicity of description and the optical fibers that are part of the delivery conduit 46 are shaded.

FIG. 3a shows a first exemplary embodiment of the radiation dosimeter 16a in which the delivery conduit 46 includes one optical fiber and the return conduit 50 includes several optical fibers. In this exemplary embodiment, the delivery conduit 46 is centered within the body of the radiation dosimeter 16 and the return conduit 50 surrounds the delivery conduit 46 in a uniform fashion. Using several optical fibers in the return conduit 50 does not require strict positioning of the optical fibers in the delivery conduit with respect to the radiation sensitive medium 48. In contrast, if only one fiber was used in each conduit 46 and 50, the geometry must be more precise to sufficiently sample the optical information signal 30.

FIG. 3b shows a cross-sectional view of an individual optical fiber 70 that can be used in either of the delivery and return conduits 46 and 50. The optical fiber 70 includes a core 72, a cladding layer 74 and a buffer layer 76. Various materials can be selected for the core 72 and the layers 74 and 76 as is commonly known to those skilled in the art. As previously mentioned, it is preferable to use materials that provide a water-equivalent response to ionizing radiation. The optical fibre diameter is selected based on the placement of the radiation dosimeter during use. Typically, the optical fiber 70 may range in diameter from 125 μm to as large as approximately 2 mm. For the purposes of using the radiation dosimeter 16 in situ (i.e. within the patient 38), an appropriate diameter is chosen for the individual optical fiber 70 such that the diameter of the radiation dosimeter 16 is as small as possible.

There are two main points where light is reflected within such a setup. A certain amount of the optical interrogation signal 28 is reflected at the interface between a fiber and the surface of the radiation sensitive medium 48 back into the delivery conduit 46 without entering the cavity at all, and hence does not become part of the optical information signal 30. There will also be some light that has been transmitted through the radiation sensitive medium 48 and reflected off the back surface of the cavity into the delivery conduit 46 and, although containing information, is also not part of the optical information signal 30. To reduce the amount of light carrying information reflected back into the delivery conduit 46, the arrangement of optical fibers in the delivery and return conduits 46 and 50 can be changed such that the optical fiber(s) in the delivery conduit 46 are positioned anywhere off-centre with respect to the longitudinal axis of the radiation dosimeter 16. If the optical fiber(s) in the delivery conduit 46 is in the centre of the radiation dosimeter 16, then a large portion of the light containing information will be reflected back into the optical fiber, and not into the return conduit 50.

The optical information signal 30 is the light that is transmitted through the radiation sensitive medium 48, reflected off the back of the cavity and transmitted back through the radiation sensitive medium 48 and accordingly does not contain the light that is reflected at the interface between the delivery conduit 46 and the radiation sensitive medium 48. The light that is reflected at the interface between the delivery conduit 46 and the radiation sensitive medium 48 travels back along the delivery conduit 46 to the light source 22, and is not part of the optical information signal 30. This approach reduces the need to match the index of refraction of the optical fibers in the delivery and return conduits 46 and 50 with the index of refraction of the radiation sensitive medium 48, thereby extending the dynamic range of the optical information signal 30 (the dynamic range is defined as the dose range over which the signal measured is known and is predictable with dose). However, the index of refraction of the reflective medium 52 is preferably chosen so that the critical angle for internal reflection within the cavity is as small as possible to maximize the amount of light that is reflected back towards the optical fibers in the return conduit 50.

FIG. 3c shows another exemplary embodiment of a radiation dosimeter 16b in which the delivery and return conduits 46 and 50 both include several optical fibers. In this exemplary embodiment, the delivery conduit 46 is centered in the radiation dosimeter and the return conduit 50 surrounds the delivery conduit 46 in a uniform fashion.

FIG. 3d shows another exemplary embodiment of a radiation dosimeter 16c in which the delivery and return conduits 46 and 50 both include several optical fibers. However, in this exemplary embodiment, the optical fibers in the delivery conduit 46 are located in a first region of the radiation dosimeter 16c and the optical fibers in the return conduit 50 are located in a second region of the radiation dosimeter 16c and these regions are not concentric.

FIG. 3e shows another exemplary embodiment of a radiation dosimeter 16d in which the delivery and return conduits 46 and 50 both include several optical fibers. However, in this exemplary embodiment, the optical fibers in the delivery and return conduits 46 and 50 are randomly dispersed and "intermingled" within the radiation dosimeter 16d. The purpose of the distribution of optical fibers in this embodiment is to collect as much light from the radiation sensitive medium 48 as possible, and to minimize the amount of light reflected back into the delivery conduit 46 off the back of the cavity.

FIG. 3f shows another exemplary embodiment of a radiation dosimeter 16e in which the delivery and return conduits 46 and 50 both include several optical fibers. In this exemplary embodiment, the optical fibers in the delivery and return conduits 46 and 50 are uniformly distributed in columns in an alternating fashion. Alternatively, the optical fibers in the delivery conduit and return conduits 46 and 50 may be uniformly distributed in rows in an alternating fashion. Once again, the purpose of this distribution of optical fibers in this embodiment is to collect as much light from the radiation sensitive medium 48 as possible, and to minimize the amount of light reflected back into the delivery conduit 46 off the back of the cavity.

Using multiple optical fibers in both the delivery and return conduits 46 and 50 eliminates several issues inherent with using a single optical fiber to both deliver to and collect light from the radiation sensitive medium 48. For instance, the constant base signal of light that is reflected at the interface between the optical fiber and the radiation sensitive medium 48 (if index of refraction is not matched) would decrease the dynamic range over which the radiation dosimeter 16 can be used. However, with the delivery and return conduits 46 and 50 shown herein, the light reflected at the interface travels back along the delivery conduit 46, and is thus not included in the light signal collected by the optical fibers in the return conduit 50. The various fiber-bundle approaches described herein are also an improvement over a two-fiber approach where one fiber is used to deliver light to the radiation sensitive medium 48 and the other is used to collect light from the radiation sensitive medium 48, since the optical information signal 30 would comprise the light detected by numerous collecting fibers instead of just one. Hence the radiation dosimeter 16 is more robust under flexure, or when the near-isotropy of the radiation sensitive medium 48 is disturbed.

Figure 4A:
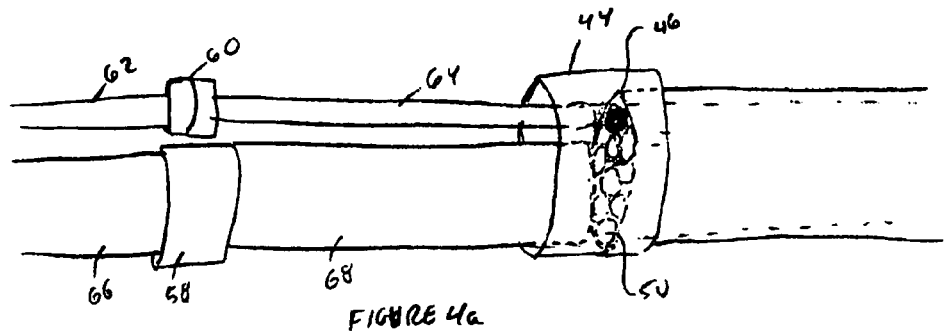
FIGS. 4a, 4b and 4c show partial side views of various exemplary embodiments of the connections made within the connection port of the radiation dosimeter of FIG. 2.
Figure 4B:
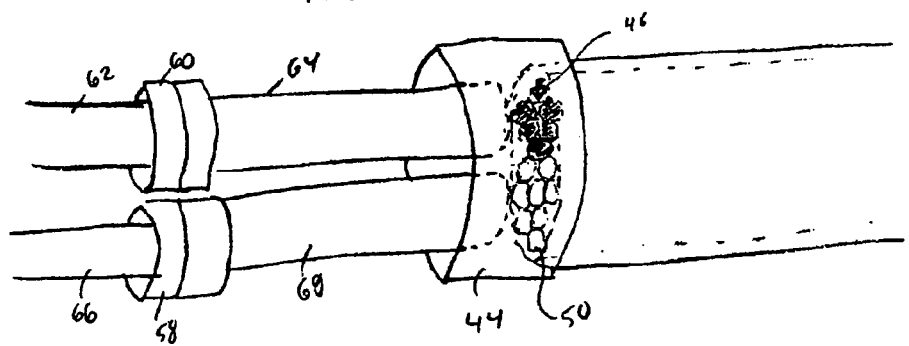
Figure 4C:
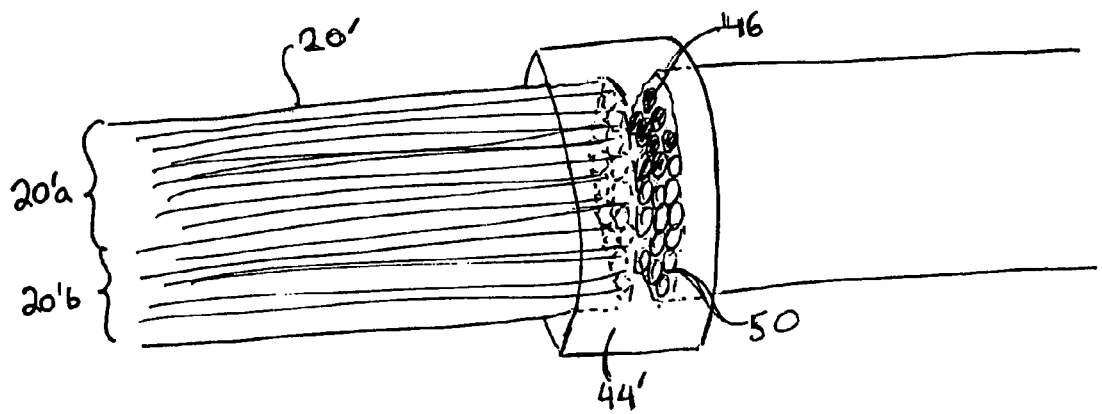
Figure 5A:
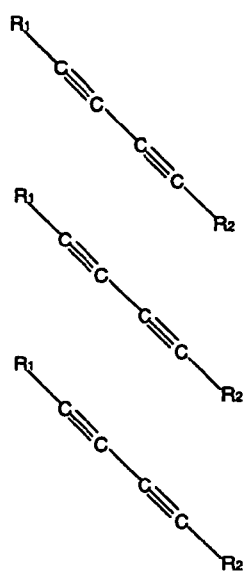
FIG. 5a shows the chemical structure of monomer crystal when radiation sensitive material GafChromic® MD-55 is used for the radiation sensitive medium of the radiation dosimeter.
Figure 5B:
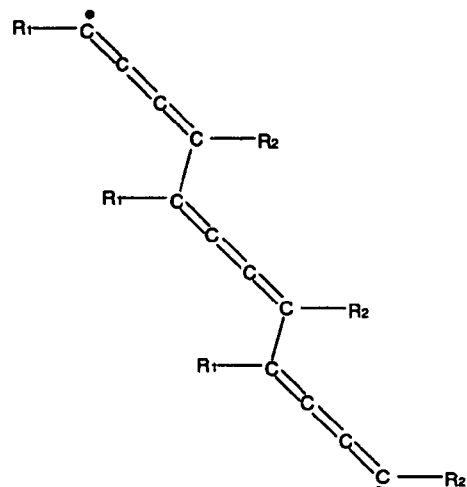
FIGS. 5b to 5d show the chemical structures of the two intermediates and of the polymer within monomer crystal host of the radiation sensitive material GafChromic® MD-55 due to subjection to ionizing radiation.
Figure 5C:
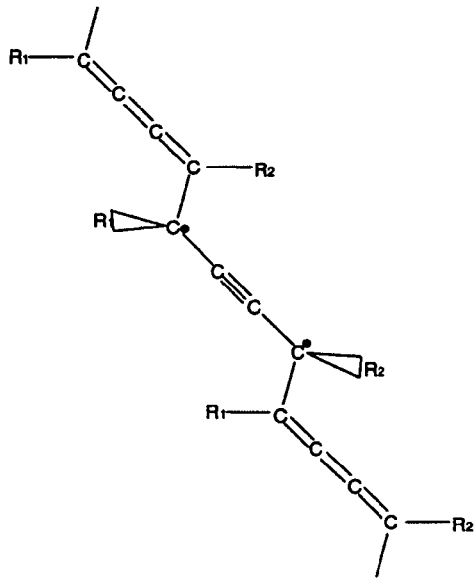
Figure 5D:
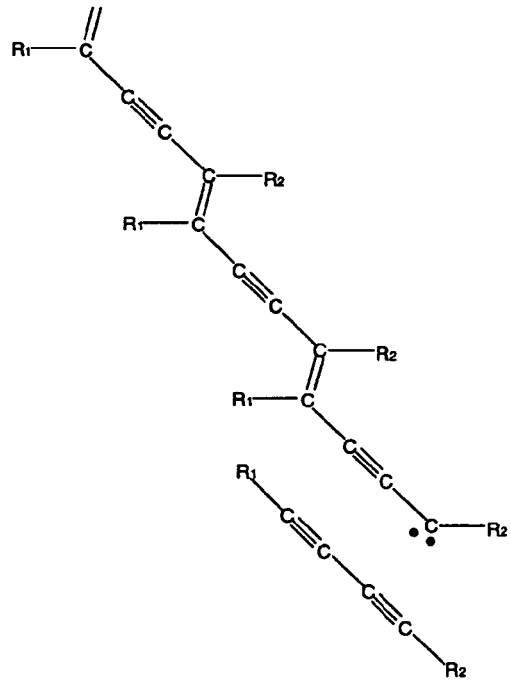

Referring now to FIGS. 4*a*, 4*b* and 4*c*, shown therein are partial side views of various exemplary embodiments of the connections made within the connection port 44 of the radiation dosimeter 16. In each of FIGS. 4*a*, 4*b* and 4*c*, only one optical fiber in each conduit 46 and 50 is labelled for simplicity of description and the optical fiber(s) in the delivery conduit 50 are shaded.

The connection port 44 allows the optical fibers from the delivery and return conduits 46 and 50 to be connected with the optical fiber cable 20. In one case (i.e. FIGS. 4*a* and 4*b*), the delivery and return conduits 46 and 50 are connected with a dosimeter delivery fiber 64 for light delivery and a dosimeter return fiber 68 for light collection. The optical fibers used for the dosimeter delivery fiber 64 and the dosimeter return fiber 68 are preferably made from the same material. Further, the connection port 44 does not need to be water-equivalent, since the remainder of the radiation dosimeter 16 may be long enough so that the connection port 44 is sufficiently distant from the patient 38 so as not to affect the delivery or measurement of the radiation dose given to the patient 38.

The dosimeter delivery fiber 64 is connected to the delivery fiber unit 62 via the connector 60 and the dosimeter return fiber 68 is connected to the collection fiber unit 66 via the connector 58. The delivery fiber unit 62 provides the optical interrogation signal 28 to the radiation dosimeter 16, and the connection fiber unit 66 sends the optical information signal 30 to the processing assembly 14. In another embodiment (FIG. 4*c*), the delivery and return conduits 46 and 50 are connected with the optical fiber cable 20 directly via a connection port 44' which is a bundle-to-bundle connector. In this case, the delivery fiber unit 62 and the collection fiber unit 66 are each composed of several individual fibers.

The length of the radiation dosimeter 16, not including the connection port 44, may be made quite large in comparison to the diameter of the radiation dosimeter 16. In fact, the radiation dosimeter 16 may be up to, or over, 1 m in length, which allows the connection port 44 to be fairly distant from the patient 38 regardless of where the radiation sensitive medium 48 is positioned on or within the body of the patient 38. However, the connection port 44 need not be located outside the body of the patient 38. It may be simpler to locate the connection port 44 outside of the body of the patient 38 since the remainder of the radiation dosimeter system that is located within the treatment room 32 is not necessarily made out of tissue-compatible plastics having a water-equivalent radiation response (i.e. water-equivalent plastics). This is advantageous since making more components of the radiation system 10 out of water-equivalent and tissue-compatible plastics can become expensive.

The connection port 44 may be made out of plastic, just like the core of the fibres used, or out of silica. The inside of the connection port 44 allows light to travel from fibres 64 and 68 to the fiber bundle within the radiation dosimeter 16. The outside of the connection port 44, however does not need to pass light, and hence can be made out of any suitable material (opaque plastic, metals, etc.).

FIG. 4*a* shows a first exemplary embodiment of the connections made in the connection port 44. In this example, the delivery conduit 46 includes one optical fiber in an upper section of the radiation dosimeter 16 and the return conduit 50 includes several optical fibers in a lower section of the radiation dosimeter 16. Since the delivery conduit 46 includes one optical fiber, the same optical fiber may be used for the dosimeter delivery fiber unit 64 and the delivery conduit 46. This is advantageous since there will be no leakage of optical energy in the optical interrogation signal 28.

In this exemplary embodiment, the dosimeter return fiber unit 68 includes one optical fiber with a diameter that is roughly similar to the diameter of the return conduit 50. Further, the optical fibers of the return conduit 50 are cleaved and the longitudinal axis of the return conduit 50 is roughly lined up with the longitudinal axis of the dosimeter return fiber 68. Since many optical fibers in the return conduit 50 are feeding a single optical fiber in the dosimeter return fiber unit 68, there is a superposition of light energy that occurs in the dosimeter return fiber unit 68.

FIG. 4*b* shows another exemplary embodiment of the connections made in the connection port 44. In this example, the delivery conduit 46 includes several optical fibers in an upper section of the radiation dosimeter 16 and the return conduit 50 includes several optical fibers in a lower section of the radiation dosimeter 16. In this example, the dosimeter delivery fiber unit 64 includes one optical fiber. The longitudinal axis of the delivery conduit 46 is roughly aligned with the longitudinal axis of the dosimeter delivery fiber unit 64. The connection for the dosimeter return fiber unit 68 and the return conduit 50 is the same as that shown in FIG. 4*a*.

FIG. 4*c* shows another exemplary embodiment of the connections made in the connection port 44'. In this example, the delivery conduit 46 includes several optical fibers in an upper section of the radiation dosimeter 16 and the return conduit 50 includes several optical fibers in a lower section of the radiation dosimeter 16. Further, the optical cable 20' includes several delivery fibers 20*a* and several return fibers 20. The longitudinal axis of the delivery conduit 46 is roughly aligned with the longitudinal axis of the group of delivery fibers 20*a* in the fiber optical cable 20'. The longitudinal axis of the return conduit 50 is roughly aligned with the longitudinal axis of the group of return fibers 20*b* in the fiber optical cable 20'.

In use, the radiation dosimeter 16 may either be placed onto the patient 38 or within the patient 38. In the former case, the radiation dosimeter 16 may be secured to the skin of the patient 38 via adhesive tape and the like. In the latter case, the radiation dosimeter 16 is inserted into a cavity or tissue of the patient 38 that requires irradiation or adjacent tissues that are to be spared. This may involve using standardized catheter procedures and holding a portion of each radiation dosimeter 16 in place with a suitable adhesive such as a piece of tape.

To accommodate use within the patient 38, the diameter of the radiation dosimeter 16 may be selected according to the size of the location in which the radiation dosimeter 16 will be utilized. For instance, if the radiation dosimeter 16 will be used in a cavity then the diameter of the radiation dosimeter 16 may be larger than the case in which the radiation dosimeter 16 is used interstitially. The diameter of the radiation dosimeter 16 can be altered based on the number of optical fibers used in the delivery and return conduits 46 and 50, the diameters of the optical fibers used, as well as the diameter of the radiation sensitive medium 48. Further, the radiation dosimeter 16 is preferably made from flexible plastic material to reduce discomfort during insertion into various types of cavities (i.e. nasal cavity, sinuses, rectum, airways, etc.).

Operating parameters for the light source 22 are selected based on the type of material that is used for the radiation sensitive medium 48. Typically, the light source 22 provides low-power light with a wavelength range that encompasses the region of the spectrum in which there is an optimum change in the optical property of the radiation sensitive medium 48 being measured due to the absorption of the ionizing radiation 36 during the treatment of the patient 38. The exact amount of light that needs to be provided by the light source 22 depends on the sensitivity of the material in the radiation sensitive medium to the optical interrogation signal 28. The power delivered by the light source 22 may be as low as 10 nW. The wavelength range of the light source 22 is preferably chosen such that it is wide enough to get a sufficient sample of the change in optical properties at and around the wavelength for which the optimum change in the measured optical property occurs but narrow enough to eliminate any unnecessary light thereby increasing the signal to noise ratio in the optical information signal 30 and keeping the optical power delivered to the radiation sensitive medium 48 low.

There are several optical changes in the radiation sensitive medium 48 that can be induced by the ionizing radiation 36 including, but not limited to, a change in absorbance/optical density, polarization, reflectivity, Raman spectra, etc. Such changes can be explored/measured as a function of several variables including wavelength (i.e. for absorbance) and time. Accordingly, processing steps are taken before, during and after exposure of the patient 38 to radiation therapy in order to measure the dose given to the target tissue. The processing steps taken during exposure of the patient 38 to radiation therapy may include monitoring the optical information signal 30 during the entire exposure. The processing steps can be refined/modified to maximize several parameters, including signal-to-noise ratio, accuracy of measured dose, temporal response, etc. The tuning of the processing steps depends on the radiation-sensitive material that is used for the radiation sensitive medium 48.

In the cases where a spectrophotometer is used as the light detector 24, the spectrophotometer may be used to continuously detect the intensity of the optical information signal 30 at each wavelength and therefore cover the range of wavelengths that encompass the region of the spectrum where the optimum change in the measured optical property of the radiation sensitive medium 48 occurs. The analysis unit 12 records the light intensity of the optical information signal 30 at each wavelength and, in one embodiment, uses the light intensity to calculate the change in absorbance of the radiation sensitive medium 48 at each wavelength. The change in absorbance at each wavelength is defined according to equation 1:

$$\Delta A \equiv \log_{10}\left(\frac{I_{os} - I_D}{I_s - I_D}\right) \quad (1)$$

where $\Delta A$ is the change in absorbance, $I_{os}$ is the initial intensity, $I_s$ is the measured light intensity, and $I_D$ is the dark signal (background signal) all measured for a given wavelength.

The change in optical density may be calculated by averaging the change in absorbance over a spectral window of interest, which is determined during a calibration procedure performed prior to using the radiation dosimeter system 10 during treatment. The change in optical density may be defined according to equation 2:

$$\Delta OD \equiv \frac{1}{\lambda_1 - \lambda_n} \times \sum_{i=1}^{n-1}\left(\frac{\Delta A_i + \Delta A_{i+1}}{2}\right) \times (\lambda_i - \lambda_{i+1}) \quad (2)$$

where $\Delta OD$ is the change in optical density and $\lambda_1$ to $\lambda_n$ are the wavelengths that span the spectral window of interest with $\lambda_1$ defining the lower bound of the spectral window and $\lambda_n$ defining the upper bound of the spectral window.

Calibration is preferably routinely done since the sensitivity of each radiation dosimeter 16 may vary, depending on the sensitivity of the radiation sensitive material used for the radiation sensitive medium 48, the exact optical geometry of the radiation dosimeter 16, the length of time that the radiation dosimeter 16 has been stored for prior to usage, exposure history, etc. The calibration procedure is preferably performed shortly prior to the first use of the radiation dosimeter 16, and then possibly as often as daily, if the radiation dosimeter 16 is used daily, until the radiation dosimeter 16 is disposed of. Calibration includes monitoring the magnitude and rate of $\Delta OD$ of the radiation sensitive medium 48. Calibration also preferably involves minimizing the amount of radiation that the radiation dosimeter 10 is exposed to since repeated exposures, in time, will reduce the sensitivity of the radiation sensitive medium 48. Accordingly, calibration may be done using a few data points to define the calibration line in the calibration plot. Calibration can be done during one exposure, since the data is collected for the entire exposure period. Calibration will differ for the linear and non-linear radiation sensitive materials as discussed in further detail below.

For both linear and non-linear radiation sensitive media, the calibration procedure may be performed from 5 minutes to 1 to 2 days before the radiation dosimeter 16 is used. The calibration procedure includes continuously measuring the intensity of the optical information signal 30 that is detected at each wavelength while exposing the radiation dosimeter 16 to a known dose. In the case where the changing optical property is optical density or absorbance, initial intensity values are used to calculate the change in absorbance for the radiation sensitive medium 48. Since the change in absorbance for each wavelength is measured, the wavelength where the optimum change in absorbance occurs during exposure is determined. The spectral window of interest that is used for measuring the radiation dose given to the patient 38 is then selected such that it is covering the wavelength of optimum change in absorbance. Various sizes may be used for the spectral window of interest. However, if too large of a window is used then too much averaging is performed and wavelengths are included that do not exhibit a high response, hence decreasing the sensitivity of the measurement. Conversely, if the size chosen for the spectral window of interest is too small, then the measurement may be based on too few values which can result in a noisy measurement. The spectral window of interest may be 5-10 nm wide, for example. For cases in which absorbance or optical density is the optical property that is being monitored, the size of the spectral window of interest might change depending on how sharp the absorbance peak is. The location of the spectral window of interest is selected to account for any variations in the wavelength of the optimum change of the measured optical property (either real, or noise). With regards to noise, the measurement of the optical information signal 30 includes noise which may cause the wavelength of optimum absorbance to fluctuate slightly. With regards to a real change in the wavelength of optimum change in absorbance, the chemistry of the radiation sensitive medium 48 undergoes various changes, due to interaction with ionizing radiation, that may yield cumulative changes in an optical property (i.e. $\lambda_{max}$ or $\lambda_{opt}$), as in the case of GafChromic MD-55® (a linear material). The latter is also a function of temperature and total dose applied for GafChromic MD-55®. So as the dose is applied to the radiation sensitive medium 48, the $\lambda_{opt}$ shifts at a somewhat slow pace that may be important if one is measuring a large radiation dose of several Gy. The dependency of $\lambda_{opt}$ on total dose applied is much less than the dependency of $\Delta$OD on total dose applied, but could still introduce errors if not dealt with properly. One way to deal with this is to track the $\lambda_{opt}$, and move the location of the spectral window of interest accordingly. For GafChromic® MD-55 radiation sensitive material, which is described in further detail below, the spectral window of interest may be approximately 10 nm in width for the typical applied radiation doses that are used in fractionated external beam radiation therapy.

For a linear radiation sensitive material, using change in optical density as the ionizing radiation induced change in optical property, calibration further includes calculating the change in the optical density of the radiation sensitive medium 48 ($\Delta OD_c$) due to the calibration dose ($D_c$) using the optical density measured before and after radiation exposure, and further using the known calibration dose to determine a sensitivity factor ($F_s$) which is defined as being the applied dose in cGy per unit change in optical density for the specific radiation dosimeter 16 that is undergoing calibration (see equations 3 and 4).

$$G = \frac{\Delta OD_c}{D_c} \quad (3)$$

$$F_s = G^{-1} = \frac{D_c}{\Delta OD_c} \quad (4)$$

The parameter G defines the slope of the curve defining the change in the optical density with respect to delivered dose as the radiation sensitive material is subjected to ionizing radiation that is being radiated at a constant dose rate. Once the calibration plot has been completed for the linear radiation sensitive material, it can be used for constant and non-constant dose rates by first calculating the change in optical density $\Delta OD$ and then multiplying by the sensitivity factor $F_s$.

Figure 6A:
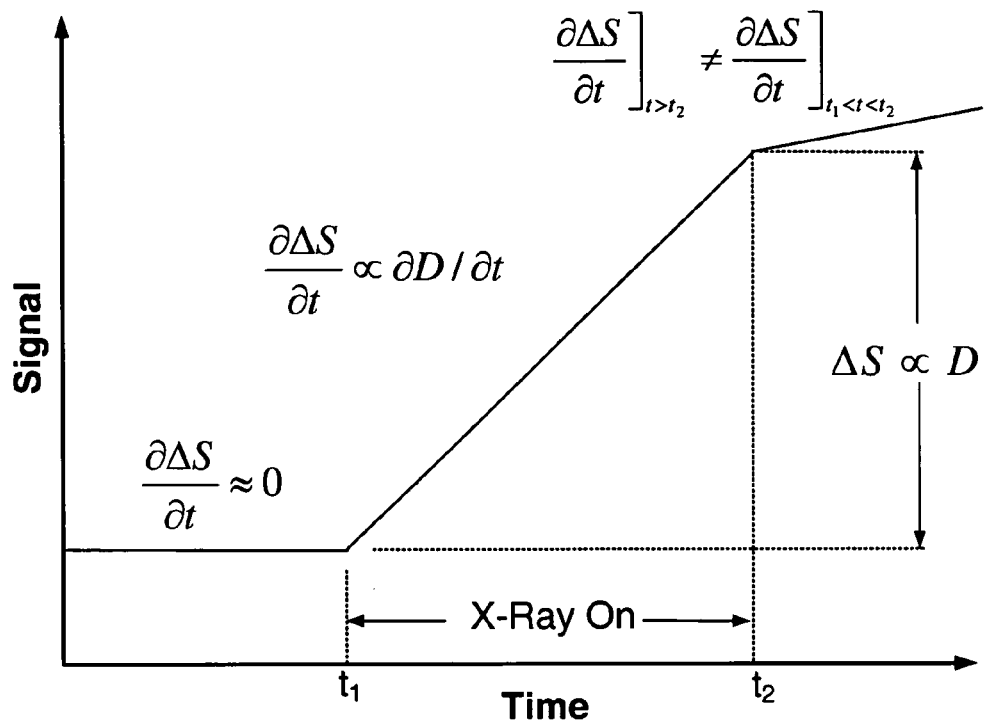
FIG. 6a is a graph showing a linear optical property model describing the change in the signal of the linear radiation sensitive medium versus time when the radiation sensitive medium is irradiated at a uniform dose rate.
Figure 6B:
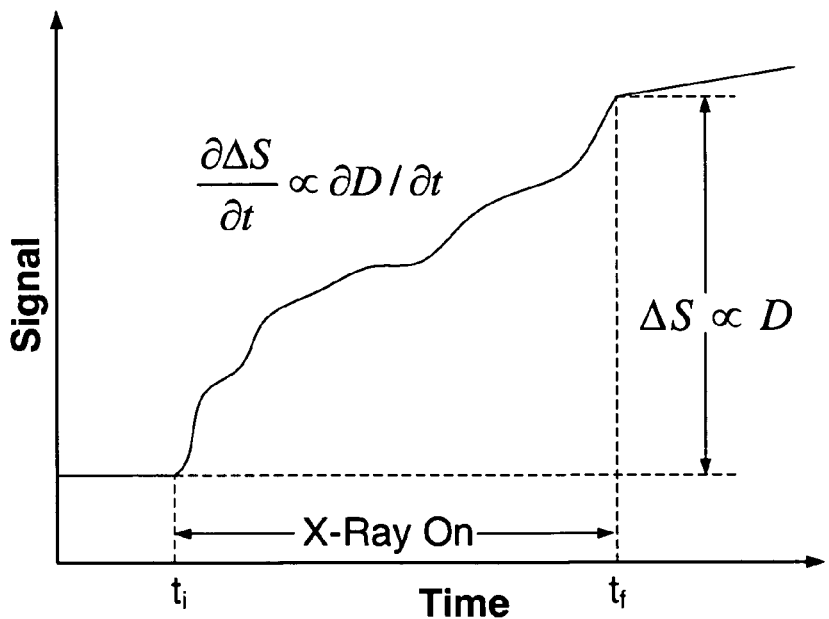
FIG. 6b is a graph showing a continuous and increasing optical property model describing the change in the signal of the linear radiation sensitive medium versus time when the radiation sensitive medium is irradiated at a non-uniform dose rate.

The radiation sensitive medium 48 is made from a radiation sensitive material that has one or more optical properties that change due to the ionizing radiation 36 that is applied to the patient 38 such that the radiation dosimeter system 10 can provide real-time estimates of the ionizing radiation dose 36. Further, the radiation sensitive material has one or more optical properties that change due to the amount of ionizing radiation 36 delivered to the patient 38. In this regard, the inventors have realized that it is advantageous, in one embodiment, to select a linear radiation sensitive material that has a radiation sensitive optical property with response characteristics as shown in FIGS. 6a and 6b. In another embodiment, the inventors have realized that it is possible to use a non-linear radiation sensitive medium that has a radiation sensitive optical property with response characteristics as shown in FIGS. 23, 28, 29a and 29b for example. In both cases, the optical information signal that results that encodes changes in the optical property of the radiation sensitive medium has properties where it is distinguishable between pre-exposure, exposure and post-exposure. This allows for easy monitoring (no second dosimeter is needed to sense the beginning or end of exposure). Further, for the linear radiation sensitive medium, the change in the optical signal that occurs over the exposure to ionizing radiation is proportional to dose. In addition, in both the linear and non-linear radiation sensitive medium cases, the change in the optical signal of the radiation sensitive medium is adequately fast to allow real-time measurement of radiation dose down to a few cGy. In this invention, real-time can be on the order of milliseconds or several seconds. However, times longer than several seconds are still advantageous over the conventional measurement techniques which require much longer time for processing the radiation sensitive medium.

A particular class of radiation sensitive materials that may be used for the radiation sensitive medium 48 having a substantially linear response characteristic is described in U.S. Pat. No. 4,734,355, U.S. Pat. No. 4,784,934 and U.S. Pat. No. 5,002,852, of which GafChromic® MD-55 is one particular example. Other radiation-sensitive media whose optical properties change in a similar fashion upon exposure to ionizing radiation may also be used.

With a linear radiation sensitive material, the beginning of radiation exposure of the radiation dosimeter 16 is marked by an increase in the rate of $\Delta$OD of the radiation sensitive medium 48. During radiation exposure, the rate of $\Delta$OD of the radiation sensitive medium 48 is proportional to the dose-rate being given to the patient 38 at the spot where the dosimeter is located. For the dose-rates and doses typically delivered during external beam radiation therapy, the $\Delta$OD is proportional to the dose. The end of irradiation is typically marked by a sharp decrease in the rate of $\Delta$OD of the radiation sensitive medium 48. The $\Delta$OD of the radiation sensitive medium 48 at any time during exposure, and immediately after the end of exposure, can be converted to dose using the sensitivity factor that is determined during the calibration procedure. The behaviour of non-linear response radiation sensitive media is described in more detail below.

Both linear and non-linear radiation sensitive material are capable of being exposed to ionizing radiation a multitude of times, where each exposure is marked by an abrupt increase in the rate of $\Delta$OD of the radiation sensitive material, followed by a decrease in the rate of $\Delta$OD once the exposure is complete. There is no specific time that needs to elapse between exposures in order for the $\Delta$OD of the radiation sensitive material to show these properties. Once the radiation sensitive medium is subjected to ionizing radiation, polymerization occurs and the material does not de-polymerize. Extra exposures will simply build onto the existing polymers, and the absorbance will keep increasing but the change in absorbance per given dose will decrease due to loss in sensitivity which is similar to the loss of sensitivity that occurs due to aging.

The wavelength of optimum $\Delta$OD (and optimum absorbance) of the linear radiation sensitive material shifts as the total accumulated radiation dose absorbed by the radiation sensitive material increases. Therefore, successively exposing the radiation sensitive material in several treatments has an effect on the measurement which is why calibration is done periodically for the same radiation dosimeter 16. Accordingly, the spectral window of interest can be shifted after each fraction of dose (i.e. each treatment), assuming that the wavelength of optimum absorbance is recorded during the previous fraction, as is done during the calibration procedure. A characteristically large shift in the wavelength of optimum absorbance (i.e. down to approximately 665 nm at 20° C. for GafChromic® MD-55 material) may indicate that the radiation dosimeter 16 is at the end of its lifetime at which point the radiation dosimeter 16 may be replaced. For non-linear radiation sensitive media, there is a change in sensitivity with repeated exposure to ionizing radiation, so calibration should be periodically done as well.

GafChromic® MD-55 is manufactured as a film material consisting of seven layers, three of which are identified as polyethylene terephthalate, with a total thickness of approximately 0.25 mm. Two of the layers are radiosensitive, approximately 16 μm thick and consist of a colourless gel with substituted-diacetylene monomers in a crystalline formation (average size of 2 μm×2 μm, with unknown depth) dispersed through out [Klassen N. V., 1997]. The film is produced in square sheets having dimensions of 5"×5" but may be cut into smaller shapes.

The spatial form of the radiation sensitive material can be designed to provide appropriate sensitivity or optimized to reflect the trade-off between sensitivity and spatial resolution. For example, a range of different diameter spherical radiation sensitive elements may be developed for application in a range of dose rates.

The GafChromic® MD-55 has response characteristics within 5% of water and striated muscle for photons in the range of 0.1-10 MeV, and electrons in the range of 0.01-30 MeV [McLaughlin et al., (1991)]. Upon exposure to heat, ultraviolet (UV) light, and high-energy photons and electrons, the monomers polymerize to create a blue polymer that provides an absorbance spectrum with two peaks at approximately 675 and 615 nm [McLaughlin, 1991, 1996]. The manufacturer of GafChromic® MD-55 indicates that there is less than a 5% difference in net change in absorbance of the material when it is exposed to a radiation dose of 10 Gy at dose rates of 0.034-3.422 Gy/min.

The change in absorbance for GafChromic® MD-55 is a linear function of the absorbed dose [McLaughlin et al., 1994], although the dynamic range of this function depends on the wavelength at which the measurements are obtained [Saylor et al., 1988; Muench et al., 1991; Chiu-Tsao et al., 1994; Reinstein & Gluckman, 1997]. GafChromic® MD-55 has been reported to be used to measure as much as a 50 Gy radiation dose using Nuclear Associates Radiochromic Densitometer Model 37-443 optimized to measure the 671 nm absorption peak [ISP Technologies Inc.]. Higher radiation doses may be measured if using other wavelengths [Saylor et al., 1988; Muench et al., 1991; Chiu-Tsao et al., 1994]. However, measurements may be difficult due to the shift in the wavelength at which the optimum change in absorbance occurs to lower wavelengths as the radiation dose increases [Saylor et al., 1988; Chu et al., 1990; McLaughlin 1991, 1995; Mack Et al., 2003]. GafChromic® MD-55 is reported to provide radiation measurements down to 1.5 Gy with a precision of 5% or better (ISP Technologies Inc.). The inventors have been able to measure as low as 0.48 Gy with an average percentage error of 3±2%.

The absorbance of un-irradiated GafChromic® MD-55 film does not increase considerably with time when kept in the dark at normal room temperature. An increase in optical density per hour of $1.52 \times 10^{-3}$ ΔOD/h, which corresponds to a dose of 3.4 cGy of x-rays, is reported when GafChromic® MD-55 is exposed to light produced by four regular 40 W fluorescent tubes at a distance of approximately 2.5 m [Meigooni A. S. et al., 1996]. GafChromic® MD-55 is sensitive to UV light causing the same polymerization observed due to ionizing radiation [McLaughlin W. L. at al., (ACS, Washington: 1996)]. Hence, if a broadband densitometer is used for continuous monitoring of the absorbance, the UV wavelengths should be filtered out.

The effect of temperature on the absorbance of GafChromic® MD-55 is complicated. An increase in temperature during irradiation was reported to correspond to a decrease in absorbance and a shift of the wavelength of optimum change ($\lambda_{opt}$) in absorbance to a lower wavelength ($\lambda_{opt}$=677.5 nm at 18.6° C., 673 nm at 28.0° C. for 6.9 Gy) [Klassen N. V., 1997; McLaughlin et al., 1991], with the latter effect being reversible Accordingly, a $\lambda_{opt}$ shift due to temperature is reversible but a $\lambda_{opt}$ shift due to irradiation is not. However, increasing temperature so that it induces polymerization causes an irreversible shift of $\lambda_{opt}$ [McLaughlin et al., 1991]. Others report an increase in absorbance with an increase in temperature [Chu et al., 1990; Reinstein & Gluckman, 1999]. This discrepancy is likely due to a choice of wavelength for absorbance measurements, since the $\lambda_{opt}$ depends on temperature, and also due to the range of temperatures sampled. The sensitivity of this film to temperature underlines the importance of keeping the optical power of the light source 22 low. It has been shown that a He—Ne laser operating at as low as 0.1 mW will cause an increase in absorbance of GafChromic® MD-55 in five minutes, with this effect being stronger for films given smaller doses [Sullivan et al., 2000]. Above 60° C. the color changes abruptly from blue to red, as the crystals become completely polymerized and the initial crystal structure of the monomer reorients to a lower energy configuration of the polymer [McLaughlin W. L. et al., 1996]. For this reason, the absorbance measurements should be performed using low optical powers to prevent polymerization due to the heat produced by the optical interrogation signal 28. In addition, Chu et al., [1990] reported a dependence of GafChromic® MD-55 absorbance on the relative humidity, with an increase from 35% to 100% humidity resulting in a decrease in sensitivity by approximately 14% when irradiated from 5-40 kGy.

McLaughlin et al. [1996] reported that pulsed-electron-induced propagation of polymerization of GafChromic® MD-55 has a $1^{st}$-order rate constant with a magnitude of $10^3$ $s^{-1}$ measured at approximately 670 nm, and that the propagation of the polymerization is complete within 2 ms of a single 20 Gy, 50 ns pulse. It is unclear, however, if the polymerization occurred mostly due to ionizing radiation or heat (the authors of that paper achieved full polymerization after a single dose of only 20 Gy, whereas the film is manufactured to go to doses much higher than that). There is literature showing that there is a continuous increase in absorbance even after irradiation is complete [Chu et al., 1990; Mack Et al., 2003], with the change in absorbance being a function of a logarithm of elapsed time [Klassen et al., 1997]. Hence, it has generally been understood and recommended to perform the measurements 24 hours [manufacturer, McLaughlin, 1991] to 48 hours [Klassen N. V. et al., 1997] after the GafChromic® MD-55 has been irradiated to measure the amount of radiation that it has been subjected to.

Referring now to FIGS. 5a to 5d, the active component of GafChromic® MD-55 is a double-substituted diacetylene monomer with one polar end [Dr. David Lewis], organized into a crystal [McLaughlin et al., 1991, 1997; Klassen et al., 1997] (see FIG. 5a). It has been shown that a similar diacetylene monomer, upon exposure to heat, X-rays, gamma-rays or photons in the UV region, polymerizes into a butatriene structure polymer [Sixl H., 1985] (see FIG. 5b). For this particular monomer, this structure is stable in short chains (for example, $n \leq 6$ where n is the number of units in a polymer chain). Once the polymer chains propagate longer (i.e. n>6), polydiacetylene undergoes reformation via an intermediate (see FIG. 5c) into an acetylene structure (see FIG. 5d) with two radical electrons at each end of the chain. The acetylene structure is of a lower energy configuration [Sixl, 1985], and any additional monomer will attach to the chain with a double bond. As the number of polymers increases, the absorbance of the polymer-monomer mixture increases due to an increase in the conjugated chains [Sixl & Warta, 1985]. The shape of the absorbance spectrum is very similar to that of GafChromic® MD-55 film, and is said to be typical of a guest diacetylene polymer in a monomer crystal [Sixl 1985; Sixl & Warta, 1985].

Most of the energy to be transferred to surrounding media of the radiation sensitive medium 48 (monomer crystals) will be done so within $10^{-3}$ seconds of a passage of high-energy electrons initiated by the ionizing radiation 36 [Principles of Radiation Chemistry]. The transferred energy will initiate a new polymer chain, increasing the absorbance at approximately 675 nm due to an increased number of polymer chains with conjugated double and triple bonds. Although the radical species at the end of the growing polymer chains are highly reactive, the reaction will slow down as the separation between the polymer chain and the next available monomer increases due a transition in the structure of the diacetylene backbone and shrinking of the polymer [Tsibouklis et al., 1993], producing slower increase in optical density that contributes to post-exposure development. This post-exposure growth in $\Delta OD$ of the radiation sensitive medium 48 is asymptotic in nature [Klassen et al., 1997], and generally makes up only a fraction of the overall $\Delta OD$. Accordingly, as shown in FIG. 6a, the rate of $\Delta OD$ of the radiation sensitive medium 48 is proportional to the dose-rate, and the net $\Delta OD$ is therefore proportional to absorbed dose. The post-exposure development occurs right after each fraction of dose in a pulsed irradiation. This model should hold true assuming the dose is small and the dose-rate is large. For larger delivered doses, or for doses delivered at low dose-rates, the post-exposure development from each pulse of irradiation may introduce errors to dose estimates if one is not cautious during measurement. These errors can be avoided using the optical property models of the invention to determine the performance bounds of the radiation sensitive material that is being used.

To facilitate the measurement of the ionizing radiation dose for liner radiation sensitive media, an intersection method is proposed based on the linear optical property model shown in FIG. 6a. In particular, three lines are produced, using the least-squares-method for example, which represent $\Delta OD$ as a function of time prior to irradiation, during irradiation, and after irradiation. The average $\Delta OD$ value immediately after the intercept of the second and third fitted lines provide the final $\Delta OD$ at the termination of the irradiation (see FIG. 10c).

The linear optical property model shown in FIG. 6a enables one to make more accurate dose measurements. It is an improvement on simply taking a $\Delta OD$ measurement and converting to a dose value since such measurements may not be stable and the measurements contain "noise components" due to various factors such as noise, age of the radiation sensitive medium, ongoing polymerization effects after radiation exposure has been completed and the like.

The linear optical property model allows one to know when the beginning of radiation exposure has occurred and when the end of exposure has occurred, and which data values may be inflated due to polymerization after-effects. Simply relying on a $\Delta OD$ measurement and not determining in which phase measurement was taken, and then converting it to a radiation dose estimate is erroneous since there are other effects which need to be taken into account (routinely performing calibration also helps with this). The linear optical property model provides us with an expected shape of the $\Delta OD$ versus time which depends on the radiation sensitive medium. We can also collect data throughout the whole time during which radiation is being delivered, and account for post-exposure effects by using only the first few $\Delta OD$ readings from this phase, eliminating errors that would otherwise be present if we used any measured $\Delta OD$.

While the linear optical property model of FIG. 6a applies to linear radiation sensitive material that is being subjected to ionizing radiation at a constant dose rate, FIG. 6b shows a continuous and increasing optical property model which applies to linear radiation sensitive material that is being subjected to ionizing radiation at a non-constant dose rate. In this case, the change in optical density is an increasing function with respect to time and increases at a greater rate for certain time periods when a greater dose rate is used.

To determine the applied dosage, the calibration plot developed for the linear optical property model may be used for the continuous and increasing linear optical property model since in this case the calibration plot shows the overall change in optical density that is related to the overall cumulative dose applied to the radiation sensitive material. Accordingly, one calculates the change in optical density and then multiplies by the sensitivity factor $F_s$.

However, to determine the start and end periods of irradiation, the linear intersection method is not used. Rather, the derivative method may be used which is shown in FIG. 10b. Although FIG. 10b shows results for a linear radiation sensitive medium being subjected to ionizing radiation at a constant dose rate, similar results occur for ionizing radiation at a non-constant dose rate. Accordingly, the start of the irradiation period can be found by determining when the derivative of the change in optical density exhibits a sharp increase from that expected due to noise or signal drift. The initial value before irradiation may not be zero, and can be determined through experimentation and then used as a threshold during radiation measurement.

It should be noted that the shape of the optical property model will likely change depending on the material used for the radiation sensitive medium as well as the particular optical property that is being measured. However, the general shape of the optical property model will allow one to determine the beginning and end times for irradiation. For instance, non-linear radiation sensitive medium have a non-linear response curve with discernible pre-exposure, during exposure and post-exposure periods (see FIG. 23 for example).

Figure 7:
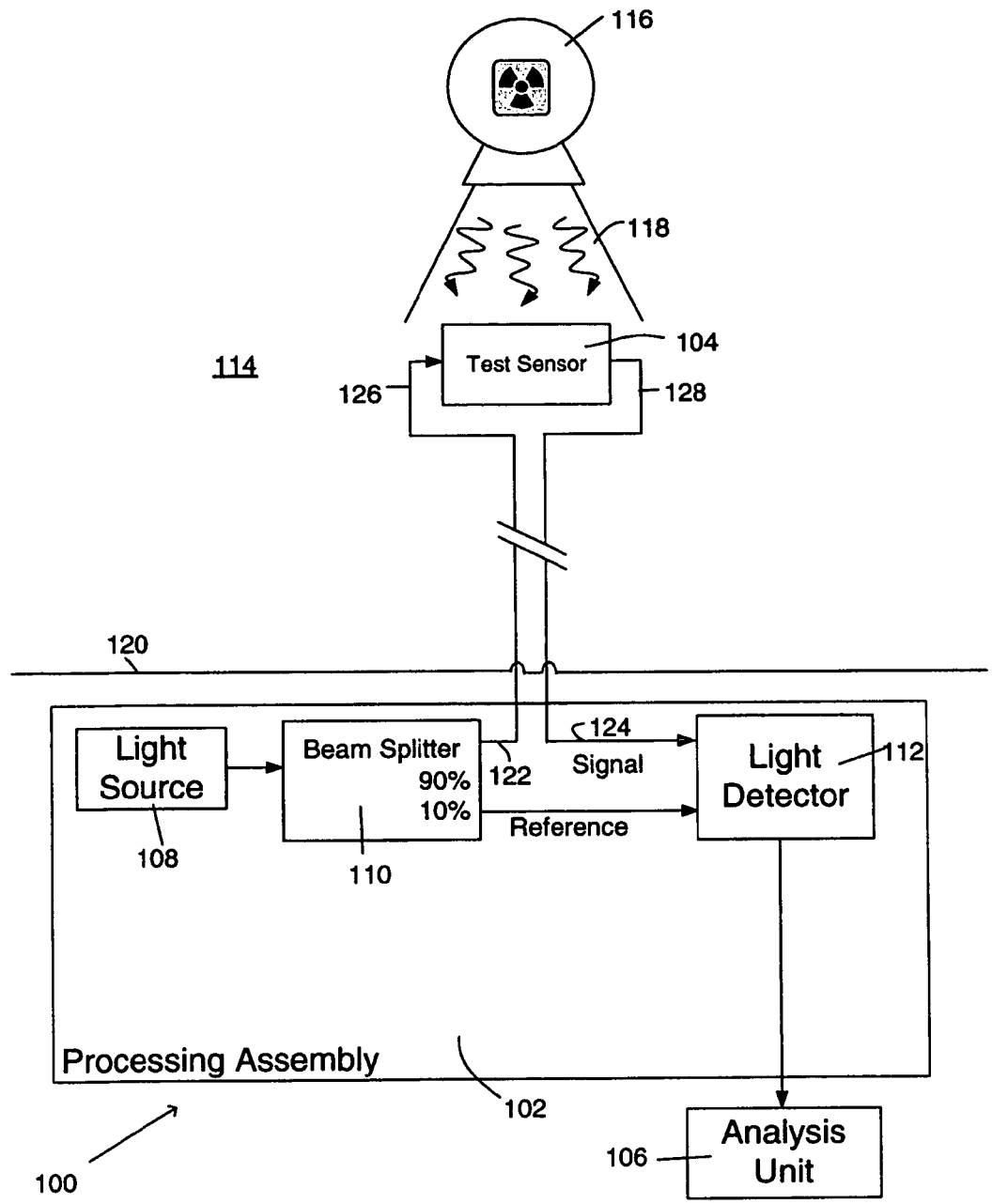
FIG. 7 is a block diagram of an experimental setup used to evaluate the radiation sensitive material GafChromic® MD-55 for use as a radiation sensitive medium.

In order to evaluate the performance of GafChromic® MD-55 for use in the radiation sensitive medium 48, experiments were conducted using an experimental setup that is similar to the radiation dosimeter system 10. Referring now to FIG. 7, shown therein is a block diagram of the experimental setup 100 for testing GafChromic® MD-55. The experimental setup 100 includes a processing assembly 102, a test sensor 104 and an analysis unit 106. The processing assembly 102 includes a light source 108, a beam-splitter 110, and a light detector 112. The test sensor 104 is placed in a treatment room 114 in which a radiation source 116 provides ionizing radiation 118 to the test sensor 104. The processing assembly 102 and the analysis unit 106 are on the other side of a radiation barrier 120 to protect the person conducting tests on the test sensor 104. The light source 108 and beam splitter 110 provide an optical test signal 122 to the radiation sensitive medium 48 within the test sensor 104 which undergoes a transformation during irradiation, to form an optical test result signal 124 which is then detected by the light detector 112 and analyzed by the analysis unit 106.

In the experimental tests, a Roithner Lasertechnik light-emitting diode with a peak emission wavelength of 670 nm was used as the light source 108 and was connected to a multimode optical fiber (600/630 0.39 NA) leading to an OZ Optics Ltd. non-polarizing 90:10 (sample: reference at 680 nm) beam splitter. The optical test signal 122 traveled through 17 m of optical fiber to a 50/125 0.12 numerical aperture (NA) delivery fiber 126 which illuminated a spot approximately 650 μm in diameter within the test sensor 104 and was transformed into the optical test results signal 124. A return fiber 128 then carried the optical test result signal 124 to another piece of optical fiber, which was 17 m long, and fed the optical test results signal 124 into the signal channel of an Ocean Optics Inc. SD2000 dual-channel spectrophotometer which was used as the light detector 112. The 10% reference beam from the beam splitter 110 was attenuated using a 2.00 OD neutral density Melles Griot filter, and was monitored on the second spectrophotometer channel to measure fluctuations in the output from the light source 108 during evaluation of the effect of ionizing radiation on the OD of the radiation sensitive film. The spectrophotometer software used was Ocean Optics Inc. OOIBase32™. Data from the detected optical test results signal 124 was processed using a custom Matlab® v6.1 software program on the analysis unit 106.

The radiation source 116 was a linear accelerator (LINAC) and the test sensor 104 was placed on the couch upon which a patient lies during radiation treatment, as is commonly known to those skilled in the art. The LINAC was calibrated using recommendations from Task Group 51 [Almond P. et al., 1999], and its performance was monitored using an ion chamber [Martell E., et al., 1986] over the same period during which the experiments were performed (60 days). The standard deviation of the LINAC output during the tests was found to be approximately 0.2%.

Figure 8A:
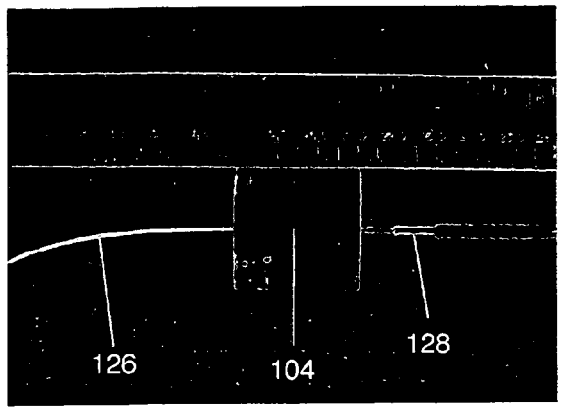
FIG. 8a is a top view of the test sensor used in the experimental system of FIG. 7.

Referring now to FIGS. 8a-8d, shown therein are views of the test sensor 104. The test sensor 104 is a cylindrical Solid Water™ phantom (Solid Water™ is a plastic with similar response characteristics to 6 MV X-rays as that of water). FIG. 8a shows a top view of the test sensor 104 connected to the delivery fiber 126 and the return fiber 128. The delivery fiber 126 and the return fiber 128 pass through the longitudinal axis of the cylindrical body of the test sensor 104. In this example, the cylinder has a length of 3.0 cm and a radius of 1.5 cm.

Figure 8B:
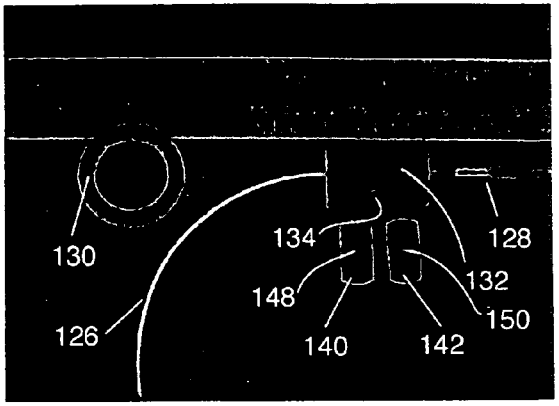
FIG. 8b is a top view of the test sensor of FIG. 8a when disassembled.

FIG. 8b shows a top view of the test sensor 104 when disassembled. The test sensor 104 includes an outer hollow cylinder 130, and an inner cylinder 132 with channels 134, 136 and 138. The channel 134 is sized for receiving first and second plates 140 and 142 having slots 144 and 146 and apertures 148 and 150, respectively. The slots 144 and 146 receive the radiation sensitive material, GafChromic® MD-55, in the form of a film. The apertures 148 and 150 receive the ends of the delivery and return fibers 126 and 128. In this example, the inner cylinder 132 has a radius of 1.0 cm, the outer ring 130 has an inner radius of 1.0 cm and the plates 140 and 142 have a height of 2.5 mm, a length of 2 cm and a width of 1 cm. The slots 144 and 146 have a height of 0.125 mm, a length of 1 cm and a width of 1 cm.

Figure 8C:
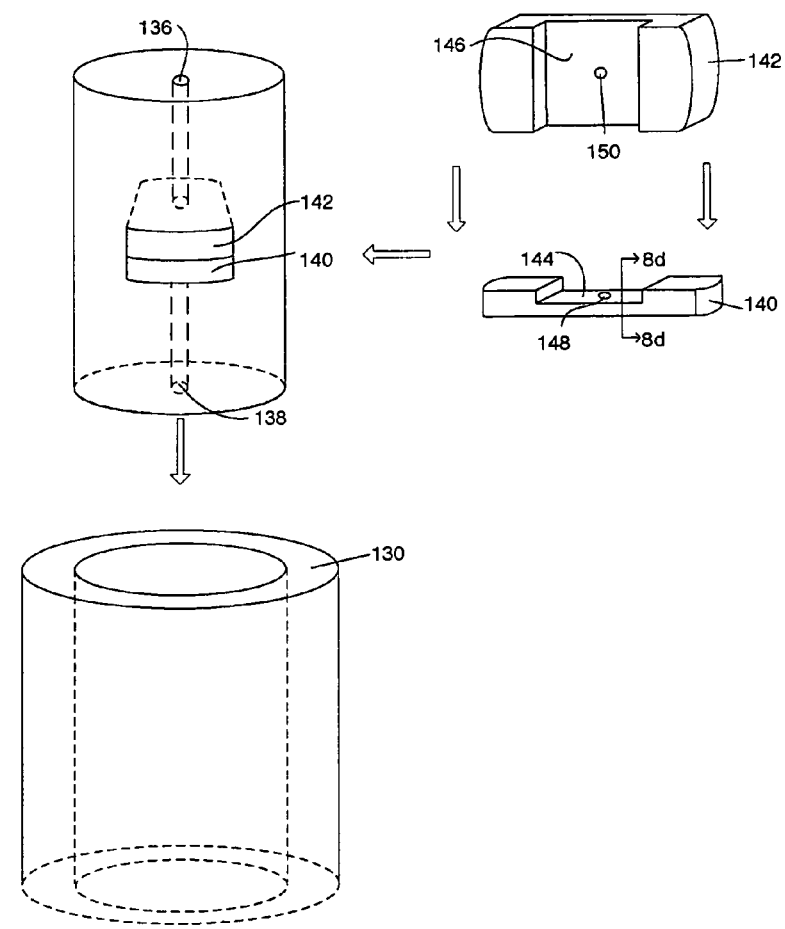

FIG. 8c is an exploded view of the components of the test sensor 104 and shows how the test sensor 104 is assembled. Radiation sensitive film 152 is placed within the slots of one of the plates 146 and 144. The plates 140 and 142 are then placed on top of one another and slid into the channel 134 within the inner cylinder 132. The inner cylinder 132 is then slid within the outer hollow cylinder 130. The delivery and return fibers 126 and 128 are positioned in the channels 136 and 138 of the inner cylinder 132 so that the fibers 126 and 128 are flush with the apertures 150 and 148 present in the plates 142 and 140.

Figure 8D:
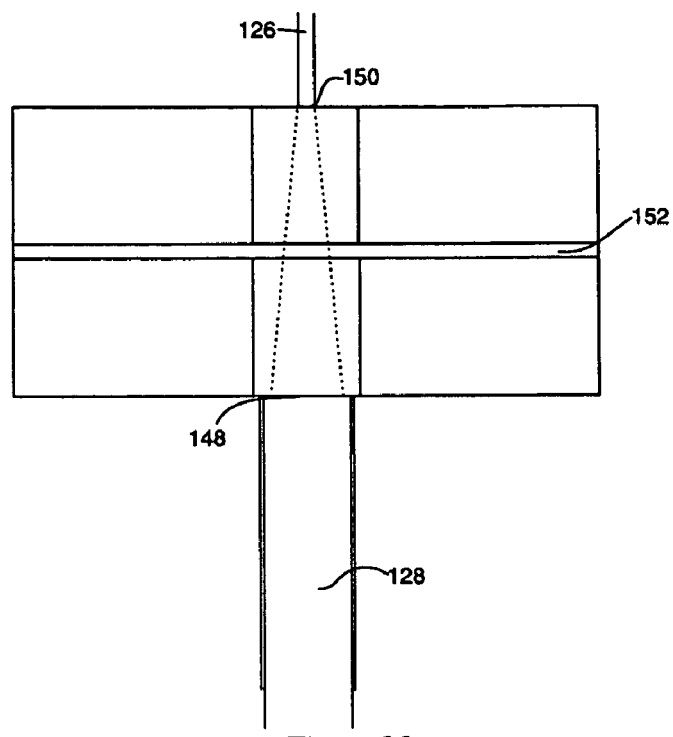
FIG. 8d is a cross-sectional view of two plates used in the test sensor to house the radiation sensitive material.

FIG. 8d shows a cross-sectional view of the two plates 140 and 142 that are used in the test sensor 104 taken along line 8d-8d in FIG. 8c. In this example, the diameter of the apertures 148 and 150 are 1.78 mm and the film 152 is approximately 0.25 mm thick. FIG. 8d also shows the relative sizes of the delivery fiber 126 and the collection fiber 128. In this example, the delivery fiber 126 has an overall diameter of 0.25 mm and a numerical aperture of 0.12 and the collecting fiber 128 has an overall diameter of 1.59 mm and a numerical aperture of 0.39.

Since heat from the light source 108 has the potential to induce polymerization in the radiation sensitive film 152 within test sensor 104 and alter the measurement of the change in optical density, the power of the optical test signal 122 delivered to the radiation sensitive film 152 within the test sensor 104 was kept at a low level. To measure the approximate power delivered to the radiation sensitive film 152 within the test sensor 104, a Newport 840-C power meter, a Newport 818-SL detector, an ORIEL Instruments Radiometric Power Supply, an ORIEL 250 W Quartz-Tungsten-Halogen (QTH) lamp in ORIEL Housing 66881, and an optical bandpass filter with 678±10 nm FWHM (Full Width at Half Maximum) were used that replicated the bandpass of the LED described above but permitted greater accuracy in determining light transfer. The light source 108 was operated at 30 mA, and its optical output power was measured. The output power of a filtered output of the QTH lamp and the power delivered to the radiation sensitive film 152 within the test sensor 104 were also measured, and the drop in power calculated. The drop in power was then applied to the LED output power to estimate the actual power that was delivered to the radiation sensitive film when an LED is used as the light source. It was found that the light source 108, when provided with 30 mA, outputs approximately 43 μW of light power, and the power of the optical test signal 122 at the test sensor 104 was approximately 7 nW.

The experimental setup was used to look at the effect of delivering 7 nW of light power to the radiation sensitive film 152 within the test sensor 104 after exposure to roughly 4 Gy of ionizing radiation. The amount of light passing through the radiation sensitive film 152 within the test sensor 104 was recorded every 30 s over a period of one hour. The light intensity at the reference channel of the spectrophotometer was collected simultaneously, and the procedure was repeated 6 times. Two sets of data were obtained; one from the reference channel and the other from the signal channel of the spectrophotometer. The rate of change in optical density (ΔOD/s) for the radiation sensitive material in the 670-680 nm range was plotted against time and the average slope calculated for each channel in the six trials. For the signal channel, the ΔOD/s was $(-3\pm5)\times 10^{-6}$ s$^{-1}$, and for the reference channel the ΔOD/s was $(-2\pm2)\times 10^{-6}$ s$^{-1}$. Analysis of variance, using type I error of 5% was then performed and no significant difference between the two slopes was found.

The couch under the LINAC was positioned such that the center of the GafChromic® MD-55 film 152 inside the test sensor 104 was at the isocenter, 100 cm from the radiation source 116, with the plane of the film parallel to the ionizing radiation beam axis. Using a 10 cm×10 cm field, the radiation sensitive film 152 within the test sensor 104 was irradiated with 6 MV X-rays. The change in absorbance (ΔA) was calculated according to equation 1, where $I_{os}$ is the average intensity of five spectra taken before the irradiation source 116 is turned on, $I_s$ is the sample light intensity, and $I_D$ is the average of the signal obtained over a period of 15 minutes without a light source. The doses and dose rates quoted herein are those delivered to a small volume of water in the centre of the test sensor 140, if the film was to be removed and replaced by water. The experiment assumes that the test sensor 104 and the optical fibers 126 and 128 are water equivalent in response to 6 MV X-rays, and that small air-filled spaces within the test sensor 104 have a negligible effect on the dose and dose rate.

Figure 9:
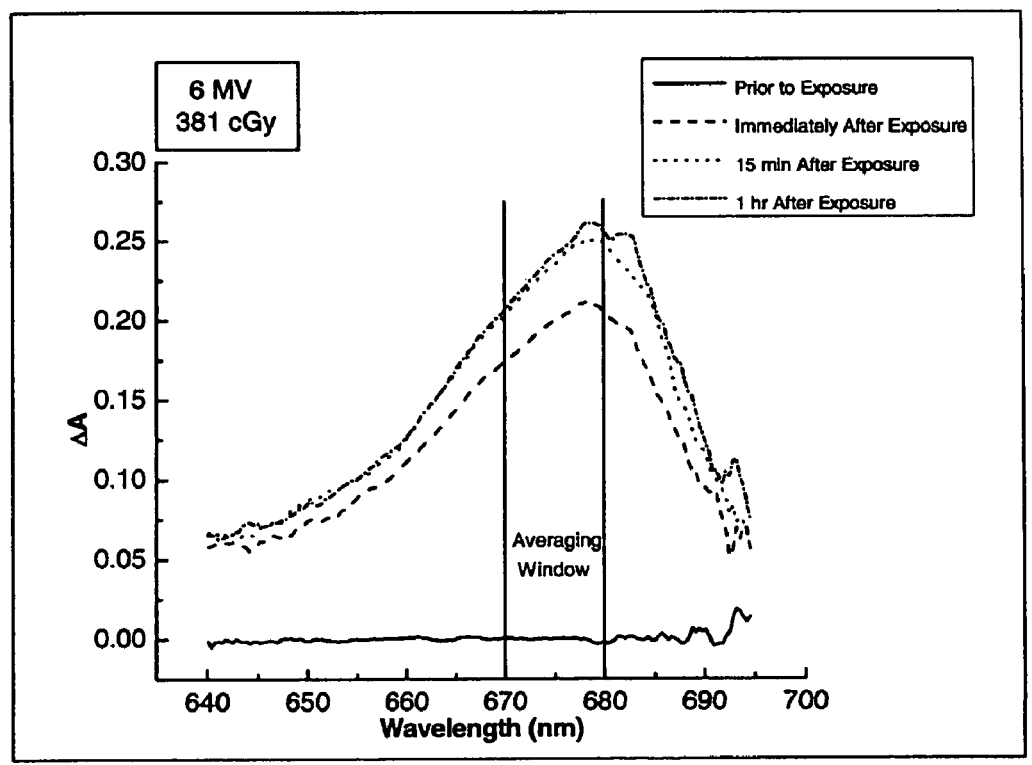
FIG. 9 is a graph of the change in absorbance versus wavelength for the test sensor measured under various conditions.

Referring now to FIG. 9, shown therein is a graph of the change in absorbance versus wavelength for the linear radiation sensitive material within the test sensor 104 measured under various conditions. The change in absorbance is shown prior to exposure, immediately after exposure to 381 cGy at 286 cGy/min, and at several intervals after the completion of exposure. The spectral window of interest for calculating the change in optical density was a 10 nm window close to the main peak (670-680 nm).

The light intensities were collected starting 5-10 seconds prior to the commencement of exposure. The spectrophotometer integration time was set at 125-750 ms, depending on the experiment performed. The data was recorded at 1-2 Hz.

Figure 10A:
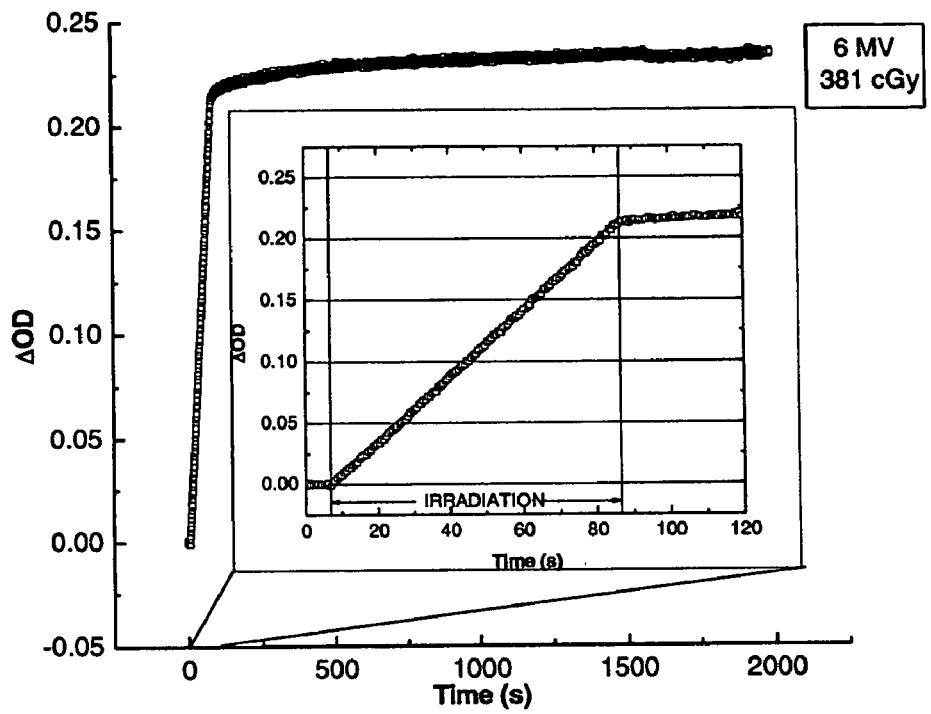
FIG. 10a is a graph of the change in optical density of the linear radiation sensitive material in the test sensor versus time for uniform dose rate.
Figure 10B:
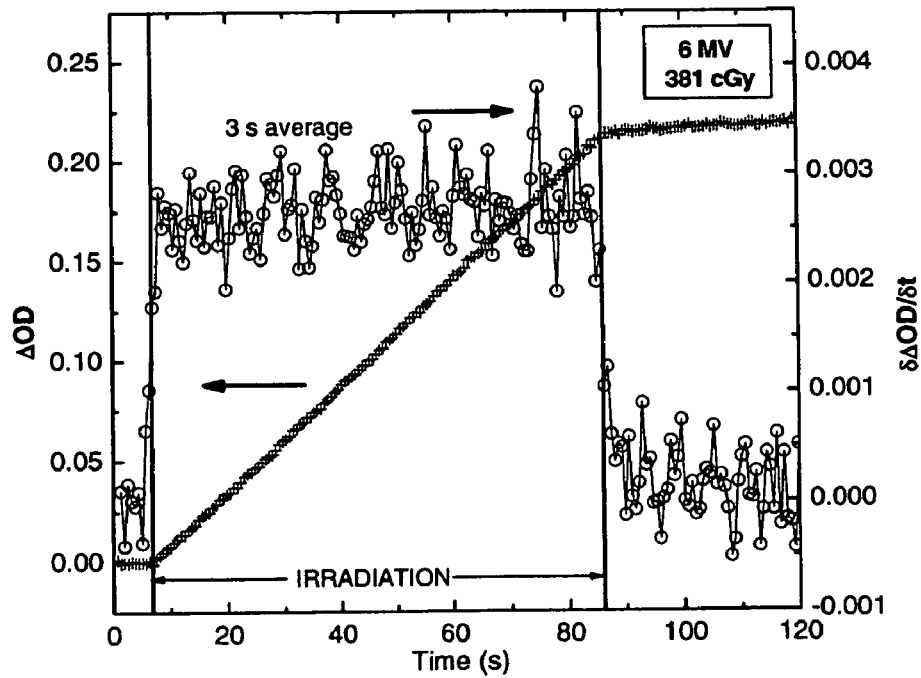
FIG. 10b is a graph of the change in optical density of the linear radiation sensitive material in the test sensor versus time, and the corresponding time derivative of the change in optical density for uniform dose rate.
Figure 10C:
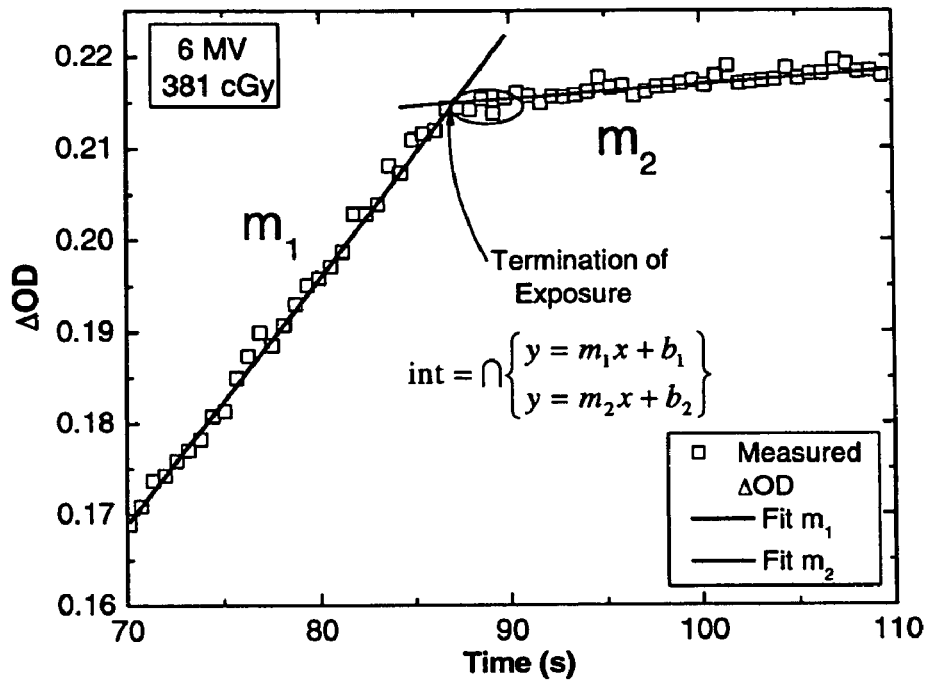
FIGS. 10c and 10d are examples of the process of using fitted lines to estimate initial and final optical density before and after exposure respectively, and change in optical density for an applied dose for the linear radiation sensitive medium at uniform dose rate.
Figure 10D:
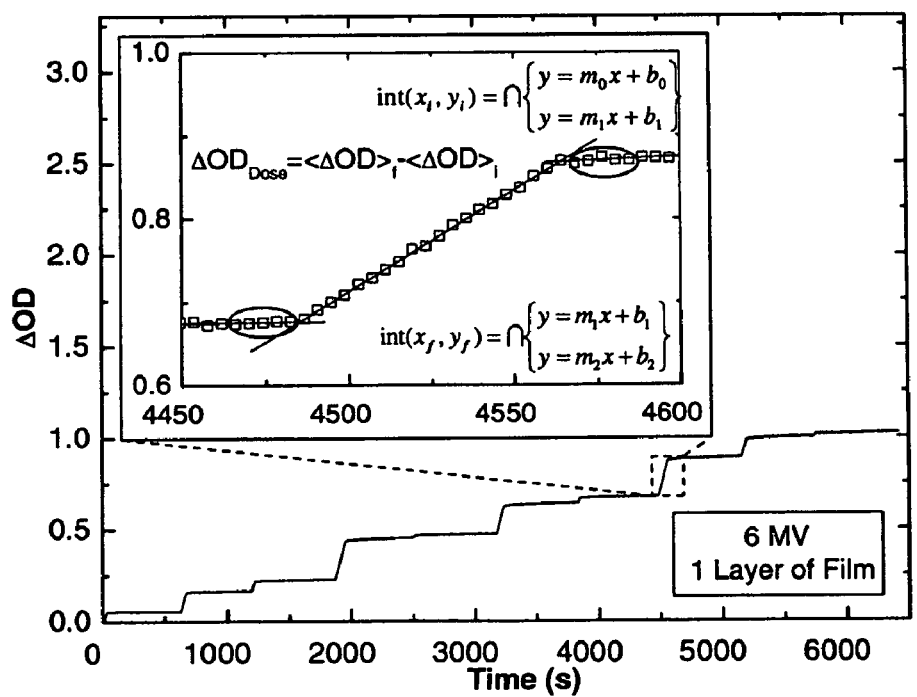

Referring now to FIGS. 10a-10e, shown therein are graphs of $\Delta OD$ of the linear radiation sensitive material in the test sensor 104 versus time. FIG. 10a shows a graph of $\Delta OD$ versus time for a radiation dose of 381 cGy delivered at 286 cGy/min. The post-exposure development appears to be logarithmic, while the $\Delta OD$ growth during radiation exposure (marked with the label IRRADIATION) seems linear. FIG. 10a shows the sharp change in rates of $\Delta OD$. To investigate the appropriateness of GafChromic® MD-55 as the radiation sensitive medium 48 for real-time dosimetry, $\Delta OD$ was measured before, during and after exposure for various doses in the 0-4 Gy range. Since no other measuring device was used, the delivered dose can only be known once the irradiation is complete. This event is marked by an abrupt change in $\Delta OD$ increase, and can be assumed to occur when the $\delta OD/\delta t$ is half of the average $(\delta OD/\delta t)_{irrad}$. Values of $\delta OD/\delta t$ for this data are shown in FIG. 10b. The average of the first five measurements after this abrupt change can be taken as the net change in OD for a given dose. This is referred to as the derivative method of determining the radiation dose because one looks for an abrupt change in the derivative $\delta OD/\delta t$ to determine when irradiation starts and stop.

The derivative method was unable to distinguish when the irradiation was completed when low dose-rates, such as 95 cGy/min for example, were used because the data was too noisy; this method may perform better with better experimental equipment or data smoothing techniques. Hence, the intersection method was used to determine the radiation dose. In this method, the data is linearly fitted using the least-squares-method or another appropriate curve fitting technique. The curve fitting technique that is used depends on the dose-rate provided by the radiation source 116. If the average dose rate is kept relatively constant, then linear curve fitting may be used. Otherwise, a derivative method described above may still be used.

For the intersection method, assuming that the first fitted line represents the baseline of approximately $\Delta OD=0$ and that the intercept between the first and second fitted lines is also zero, within experimental error, the average $\Delta OD$ as given by five points, for example, following termination of irradiation may be used as $\Delta OD$ for a given dose. This assumption is false if the signal is not 'zeroed' before every new fraction (i.e. los reset to the new amount of light intensity received even though a dose might have been applied recently), and/or if a large dose has been applied (~10 Gy) recently (baseline may no longer be approximately zero). In the former case, the $\Delta OD$ can still be easily measured by using the y-values of the intercepts of the first and second fitted lines and taking the difference (see FIG. 10d). Accordingly, the $\Delta OD$ for a given dose may be the average $\Delta OD$ measured immediately after the intercept of the second and third fitted lines minus the average $\Delta OD$ measured immediately prior to the intercept of the first and second fitted lines. For the latter case, the data processing requires modeling the baseline over the period of exposure, predicting the baseline $\Delta OD_i$ at the time exposure is complete, and then subtracting that estimate of baseline from the $\Delta OD$ measurement (see FIG. 10e).

Tests were conducted to determine the effect of various radiation doses on $\Delta OD$ for GafChromic® MD-55. The radiation sensitive film 152 within the test sensor 104 was irradiated at single doses of 0, 24, 48, 95, 190, 286 or 381 cGy at a dose rate of 286 cGy/min, with 3-6 films per dose (all of the non-zero doses were done 6 times and a dose of 0 Gy was done only 3 times). Optical density measurements were made starting 5-10 seconds prior to exposure. Data for the test case in which the radiation sensitive film 152 within the test sensor 104 was exposed to 381 cGy was collected over a period of one hour. Data from the other test cases were collected for a period of 1-10 min. The $\Delta OD$ for each irradiation test was calculated using the intersection method. These values were then averaged for a given dose and used to create a Dose versus $\Delta OD$ calibration plot. The data in the calibration plot may be curve-fit using the least-mean-squares method. The equation of the calibration plot (see equation 5 below) provides a sensitivity parameter (i.e. the slope), and also an offset (i.e. the y-intercept). The parameters and their errors are calculated using an appropriate choice for type I error (i.e. 5%).

$$D(cGy)=(1\pm2)+(1863\pm22)\Delta OD \tag{5}$$

Figure 12:
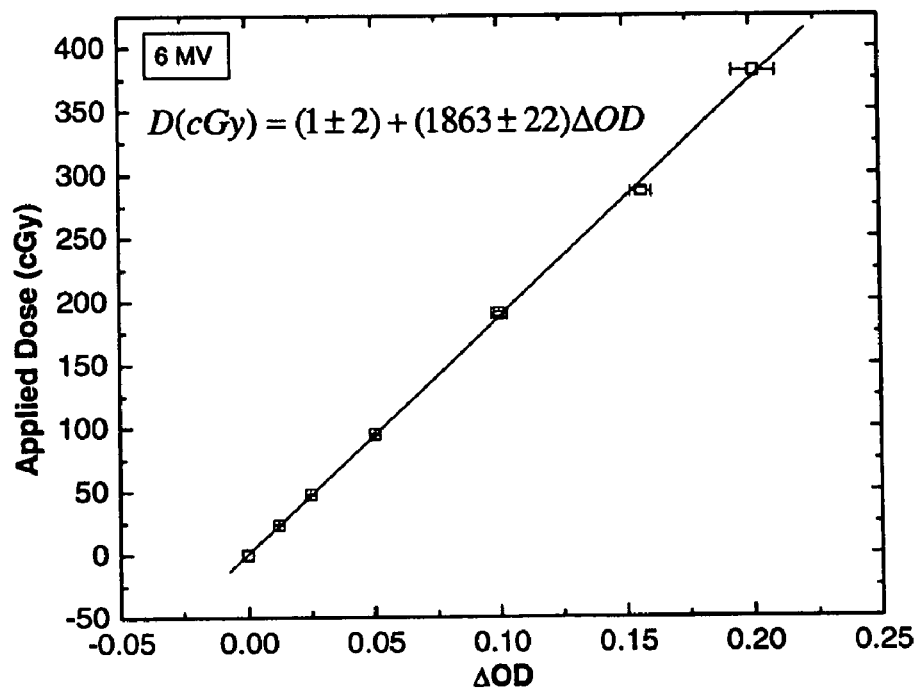
FIG. 12 is a graph of the calibration plot relating applied Dose to ΔOD for a linear radiation sensitive medium and uniform dose rate.

FIG. 12 shows an exemplary calibration plot. Previously unexposed pieces of the radiation sensitive film from either the same sheet of material, or another sheet of material within the same batch, were then each irradiated to a single known dose in the 0-333 cGy range, with several individual films used per dose. The $\Delta OD$ measurements obtained for each exposure were then used with the calibration equation 5 to obtain an estimate for the applied Dose delivered in the test. All estimated doses for a given test condition were then averaged and compared to the actual ionizing radiation dose that was delivered. This calibration plot can be used with linear radiation sensitive media that is subjected to ionizing radiation at uniform and non-uniform dose rates.

An alternative method of calibration based on pre-exposure with a known radiation dose was also investigated. A single 1 cm×1 cm piece of radiation sensitive film was first exposed to a dose of 95 cGy at a dose rate of 286 cGy/min. Then at five minute intervals between irradiations, the radiation sensitive film was exposed to 48 cGy eight times at the same dose rate. Similarly, another piece of radiation sensitive film was pre-exposed to 95 cGy, and then exposed to 190 cGy eight times. Change in OD for each irradiation to 48 and 190 cGy was calculated using the intersection method, and the radiation dose was estimated using both the calibration plot and the pre-exposure sensitivity obtained from the 95 cGy exposure.

FIG. 11a shows a graph of $\Delta OD$ versus time for five pieces of GafChromic® MD-55 film, each exposed to 381 cGy with 6 MV X-rays. As the irradiation time and delivered dose increase, the deviation of $\Delta OD$ across the different pieces of GafChromic® MD-55 film increases as well. FIG. 11b shows a graph of the average $\Delta OD$ taken from the data of FIG. 11a.

As can be seen from FIGS. 11a and 11b, the radiation sensitive film has a variation in sensitivity as high as 8% within a single film. Accordingly, even if calibration information for a certain batch is used, there will still be a potential for a high error. However, performing a pre-exposure calibration for each individual dosimeter should eliminate this error.

Figure 13:
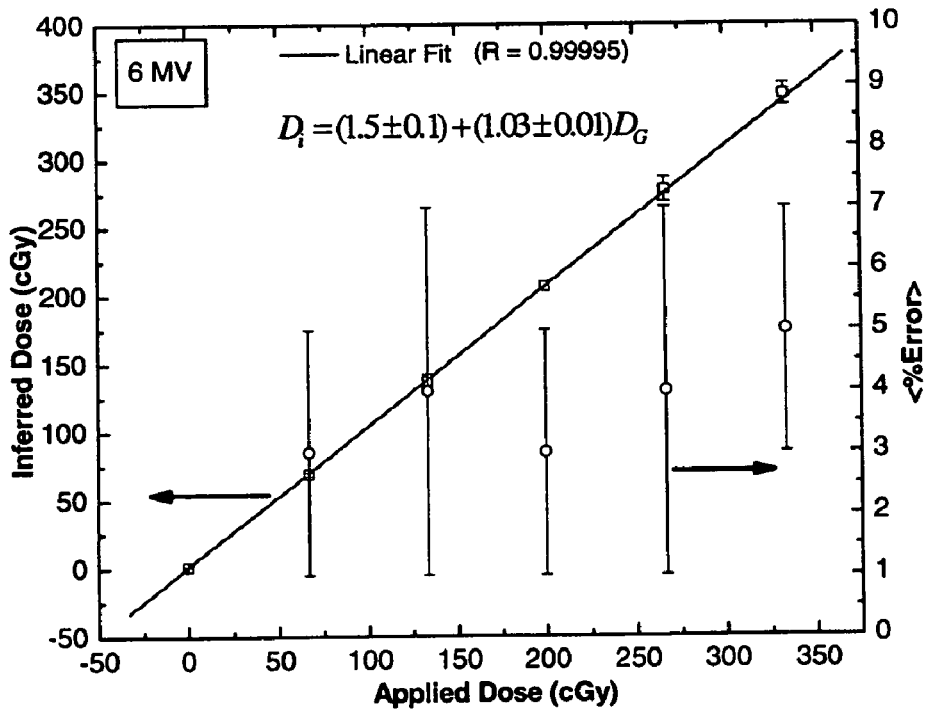
FIG. 13 is a graph comparing the applied dose and the estimated dose based on using measured ΔOD and the calibration plot for a linear radiation sensitive medium and uniform dose rate.

Referring now to FIG. 13, shown therein is a graph comparing the applied dose and the inferred dose, which was found using the $\Delta OD$ for a new set of freshly irradiated film and the calibration plot. The least-mean squares linear fit of the inferred dose (r>0.9999) yielded an intercept of 1.5±0.1 and a slope of 1.03±0.01, with 95% confidence. This is a good linear fit with a y-intercept of nearly zero and a slope close to 1.00, indicating that the estimated or inferred dose is quite close to the applied dose and that the radiation measurement method of the invention is quite accurate.

Figure 14:
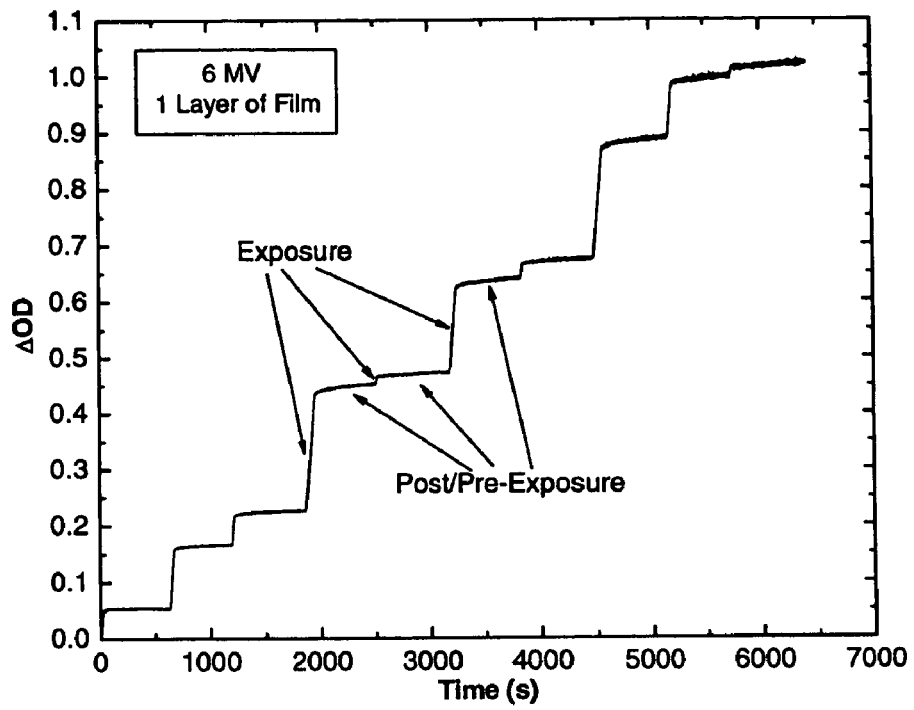
FIG. 14 is a graph of the change in optical density for the test sensor versus time for a single piece of linear radiation sensitive film that was exposed to ionizing radiation multiple times at uniform dose rates.

Referring now to FIG. 14, shown therein is $\Delta OD$ versus time for a single piece of linear radiation sensitive film that was exposed multiple times. The sharp increases in $\Delta OD$ correspond to periods of irradiation to random doses, and the flatter regions correspond to data collected between irradiations. Using the ability of film to be exposed more than once and the pre-exposure calibration technique, inferred doses for 48 and 190 cGy irradiations were calculated. Table 1 compares the two calibration methods.

TABLE 1

| Dose | Calibration Plot | | | Pre-Exposure Calibration | | |
|---|---|---|---|---|---|---|
| (cGy) | $Dose_i$(cGy) | % Error | % \| Error \| | $Dose_i$(cGy) | % Error | % \| Error \| |
| 48 | 48 ± 2 | 0.52 | 3 ± 2 | 47 ± 2 | −0.54 | 3 ± 2 |
| 190 | 175 ± 7 | −7.8 | 8 ± 4 | 182 ± 7 | −4.5 | 4 ± 4 |

Table 1 compares the two calibration methods to infer radiation dose. With the former method, the inferred dose for 48 cGy tends to be overestimated on average, producing a mean error of 3%±2%. While using the pre-exposure calibration produces the same mean percent error, on average the inferred doses are underestimated. The errors in measured $\Delta OD$ were generally 0.0002-0.0007 units, which according to the calibration plot, corresponds to an error of 1-2 cGy or approximately 2 to 4%. The deviations on $\Delta OD$ measurements for 190 cGy irradiations were $5 \times 10^{-4}$ to $2 \times 10^{-3}$ units, corresponding to a dose error of 2 to 5 cGy or 1 to 3%. Both estimation methods underestimated the dose, but the pre-exposure calibration technique came closer to the actual delivered dose, and also decreased the mean percent error of the estimates by a factor of two. The pre-exposure technique described may also be useful to account for change in sensitivity as the dosimeter ages, since $\Delta OD$ increases with storage time [Klassen N. V., et al 1997], and the response of the radiation sensitive film with dose depends on the total dose applied or total $\Delta OD$ to date [Ali et al., 2003]. Accordingly, for a clinical dosimeter using a radiation sensitive medium such as GafChromic® MD-55, the pre-exposure calibration method may be used to extend storage time, by enabling calibration for changes in the radiation sensitive film due to aging thereby allowing the radiation dosimeter 16 to give accurate results.

Tests were conducted to determine the effect of thickness of the radiation sensitive film on $\Delta OD$ for GafChromic® MD-55. It has been previously shown [Cheung T., 2001] that increasing the number of layers of the GafChromic® MD-55 increased the sensitivity for measuring the $\Delta OD$. The same should hold true for real-time $\Delta OD$ measurements. Two more sets of plates for the test sensor 104 were created with one set of the plates having slots large enough to hold two pieces of radiation sensitive film and the other sets of plates having slots large enough to hold four pieces of radiation sensitive film. Test sensors 104 with one, two, or four stacked pieces of radiation sensitive film were then continuously exposed at 286 cGy/min. This was repeated three times with previously unexposed pieces of GafChromic® MD-55 film. To estimate the sensitivity of the radiation sensitive film 152 within the test sensor 104, $\Delta OD$ values above 2.5 were removed, due to non-linearity of the optical system, and irradiation time converted to dose based on the assumption of constant dose-rate. Data for the $\Delta OD$ was measured for the first approximately 1100 cGy delivered to the test sensors having one and two pieces of radiation sensitive film and then curve fit using the least mean-squares method. For the test sensor having four radiation sensitive films, data for the first 700 cGy delivered to the test sensor was used. The slope of the linear regression line is referred to as the signal gain, or sensitivity of the test sensor. For each test sensor, the measured gain values were averaged to obtain average gain values for the one, two and four radiation sensitive film cases.

Figure 15:
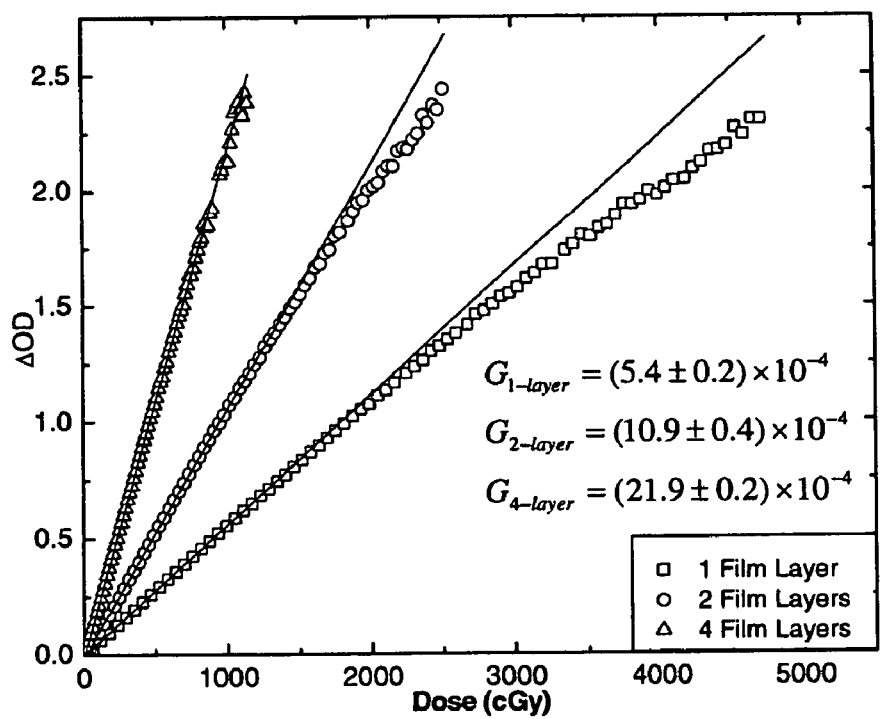
FIG. 15 is a graph of the change in the optical density of the linear radiation sensitive material versus dose applied at a uniform dose rate for one, two and four layers of stacked radiation sensitive film.

Referring now to FIG. 15, shown therein is a graph of $\Delta OD$ as a function of dose for one, two and four layers of stacked 1 cm×1 cm pieces of radiation sensitive film. The average gain values for the test sensors having one, two and four layers of radiation sensitive film were $(5.4 \pm 0.2) \times 10^{-4}$, $(10.9 \pm 0.4) \times 10^{-4}$, and $(21.9 \pm 0.2) \times 10^{-4}$ respectively. These correspond to an increase in sensitivity of 2.0±0.1, 2.01±0.08 and 4.1±0.2 for $G_{2\text{-}layer}$:$G_{1\text{-}layer}$, $G_{4\text{-}layer}$:$G_{2\text{-}layer}$ and $G_{4\text{-}layer}$:$G_{1\text{-}layer}$ respectively, which are all within error of theoretical increase of 2 and 4 times.

Based on the test results, it is apparent that there is an increase in sensitivity when increasing the thickness of the linear radiation sensitive material. This property is also true for nonlinear radiation sensitive material as well. However, unless the light intensity, integration time or number of averages taken is increased, the signal reaches the saturation level quicker for a test sensor having an increased number of layers of radiation sensitive material. A positive side effect of increasing layer thickness is also seen in reduced deviation of $\Delta OD$ measurements from linearity over the usable $\Delta OD$ range. It is known that GafChromic® MD-55 film has a range of linear response for $\Delta OD$ versus dose, which depends on wavelength of measurement [Saylor et al., 1988; Muench et al., 1991; Chiu-Tsao et al., 1994; Reinstein & Gluckman, 1997]. Near the peak of maximum absorbance (~675 nm), this range is the shortest, likely due to shift of $\lambda_{opt}$ with dose [McLaughlin et al, 1995], and some loss of sensitivity as the polymer-to-monomer ratio within the crystal increases. This effect is seen for the $\Delta OD$ versus dose curve for a single layer of film, but not seen for four layers of film. The simple explanation is that by the time saturation for this optical system is reached (i.e. $\Delta OD>2.5$), the dose absorbed by each of the layers in the test sensor having four-layers of radiation sensitive film is much less than the dose absorbed by the test sensor having one layer of radiation sensitive film at the same ΔOD value. Hence, the response of the radiation sensitive film to ionizing radiation dose does not substantially deviate from linearity.

It is possible to increase the dynamic range of a test sensor having multiple-layers of radiation sensitive film by using a spectrophotometer with a larger absorbance range, and by increasing the amount of incident light in the appropriate wavelength range. However, implementing a new detection device and light source with this film must always be done with caution, especially if continuous measurements are performed, as was done for the experiments described here. Therefore, it is important to establish a usable range of the radiation dosimeter while using the lowest power of light possible in order to prevent ΔOD increase due to heat polymerization from the light source itself.

Tests were conducted to determine the effect of various dose rates on ΔOD for GafChromic® MD-55. The radiation sensitive film 152 within the test sensor 104 was exposed to a given dose at three different rates: 95 cGy/min, 286 cGy/min and 571 cGy/min with approximately five minutes between irradiations. This was repeated five more times for the same dose, each time with a different permutation of dose-rates, and similarly for other doses of 24, 48, 95, 190, 286 or 381 cGy. The mean ΔOD and δΔOD/δt were calculated for each dose at the three different dose-rates, and the values compared.

Figure 16:
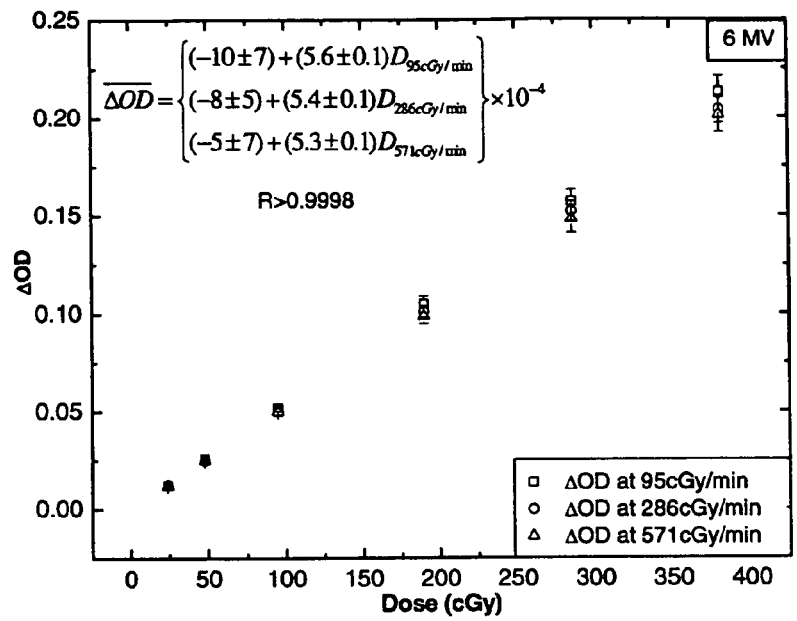
FIG. 16 is a graph of the average change in optical density of the linear radiation sensitive material versus dose for radiation doses delivered at different uniform dose-rates.
Figure 17:
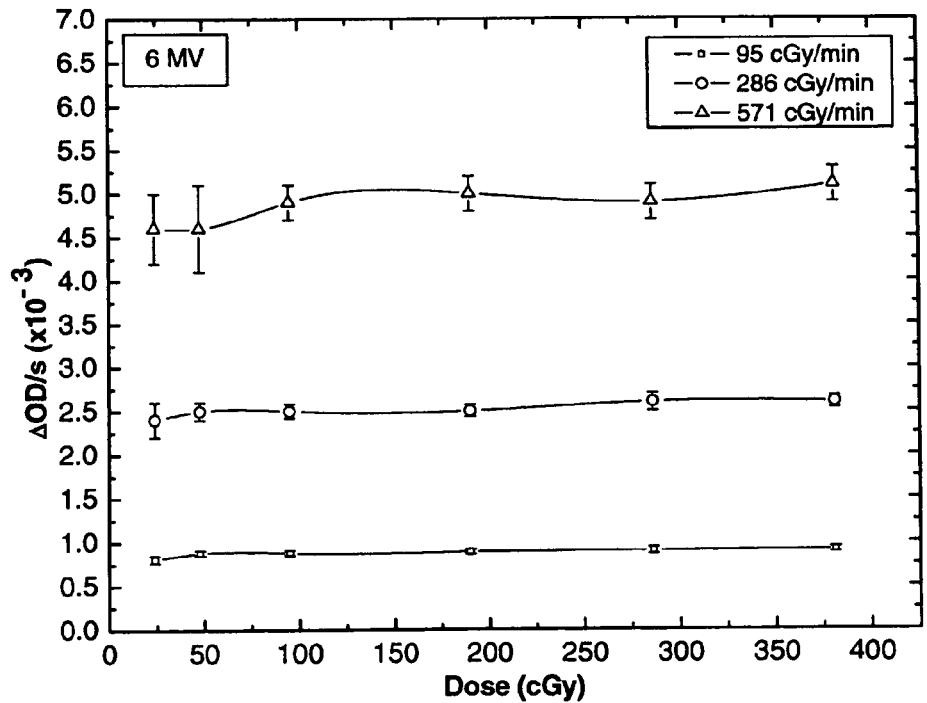
FIG. 17 is a graph showing the variation in the rate of change of the optical density of the linear radiation sensitive material versus dose for different uniform radiation dose delivery rates.

Referring now to FIG. 16, shown therein is a graph of average ΔOD measurements for a given dose delivered at different dose-rates. Analysis of variance was performed on all measured ΔOD for a given dose. For 190 cGy, a difference in ΔOD measurements was found using a 95% confidence interval. All of the sets of data were within 99% confidence of each other. Nonetheless, a trend can be seen in the ΔOD versus dose slopes calculated at each dose-rate, where the deviations quoted are those for 95% confidence interval. The slopes of ΔOD/s as calculated by the intersection method were also investigated (see FIG. 17). For a given dose-rate, the slopes are within error of each other for doses in the 24-381 cGy range, even though the trend is for a higher slope estimate to appear at higher doses. An analysis of variance showed that there was a significant difference (95% confidence level) between ΔOD/s estimates for different doses delivered at 95 cGy/min and 571 cGy/min, but not at 286 cGy/min. At 99% confidence level, only ΔOD/s estimates for 95 cGy/min exhibited a significant difference between given doses.

Each fraction of ionizing radiation causes a fast increase in ΔOD of GafChromic® MD-55 medium, followed by a logarithmic increase in ΔOD due to the fact that radical-induced solid-state polymerization within the monomer crystals does not stop immediately. If one waits 24-48 hours after irradiation as is generally accepted and practiced by those skilled in the art, then most of the post-exposure development will have been completed. However, if the measurements are done immediately after the end of irradiation, as is described and made possible by the invention described herein, the amount of post-exposure development that has occurred for a given dose depends on the time it took to give that dose, or the dose-rate. The test results show that ΔOD measurements for a given dose at three different dose-rates of 95 cGy/min, 286 cGy/min and 571 cGy/min are indistinguishable (99% confidence) for all doses up to 381 cGy. Doses less than 95 cGy showed no dose-rate dependence (95% confidence), but those greater than 190 cGy either exhibited dose-rate dependence or were close to the critical F value. The results do not imply that there is no dose dependence at low doses typical of those given in a single beam in fractionated external beam radiation therapy. This merely means that with the experimental setup used and the errors observed in ΔOD measurements, the differences between sets of measurements obtained for different dose-rates may be mostly due to fluctuations within the measurements themselves. At higher doses, the difference in ΔOD for various dose-rates may introduce a substantial error.

The slopes (ΔOD/s), as given by the linear fit of each curve, on average showed a higher estimated value at higher doses. This is consistent with the notion of a slow-kinetics asymptotic increase in ΔOD after every fraction of dose that occurs because the polymerization reaction does not stop immediately after irradiation is terminated. For a given dose-rate, the higher dose will have a longer irradiation period, and hence there will be greater post-exposure development due to the number of fractions of the overall given dose. This extra ΔOD will result in a higher slope ΔOD/s when linear curve fitting is performed during the calculation of ΔOD for the given dose. An analysis of variance shows that there is a significant difference (95% confidence level) between ΔOD/s estimates for different doses delivered at 95 cGy/min and 571 cGy/min, but not at 286 cGy/min. The discrepancy in ΔOD/s estimates for the lowest dose-rate can be easily explained. The time difference between delivering 286 cGy and 381 cGy is a full minute, and hence the larger the dose given, the greater ΔOD due to post-exposure development that has occurred. The linear regression performed during the intersection method will then take these higher values of ΔOD into account, giving a larger ΔOD/s estimate.

Figure 18:
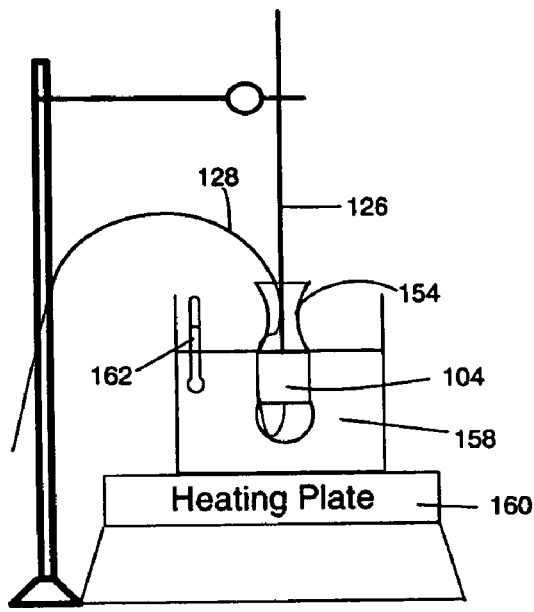
FIG. 18 shows the test setup used for testing the effect of temperature on the change in optical density of the linear radiation sensitive material.

Tests were conducted to determine the effect of temperature on ΔOD for GafChromic® MD-55. The test sensor 104, with a single piece of the radiation sensitive film, was inserted into a waterproof Endocavity Latex Ultrasound Transducer Cover 154 (B-K Medical Systems Inc.). The test sensor 104 was then inserted into a 1 L PYREX beaker 156, and filled with ice water 158 to the top flat surface of the test sensor (see FIG. 18). The beaker was positioned on a Corning Glass Works PC 351 heating plate 160. The LINAC gantry was rotated to 90°, and the centre of the radiation sensitive film 152 within the test sensor 104 was placed at the isocentre of the LINAC. The temperature reported is that of the water bath 158, which was controlled using the heating plate 160 and monitored with a thermometer 162. Once the desired temperature was reached, the test sensor 104 was given approximately 15 minutes to equilibrate.

Figure 19:
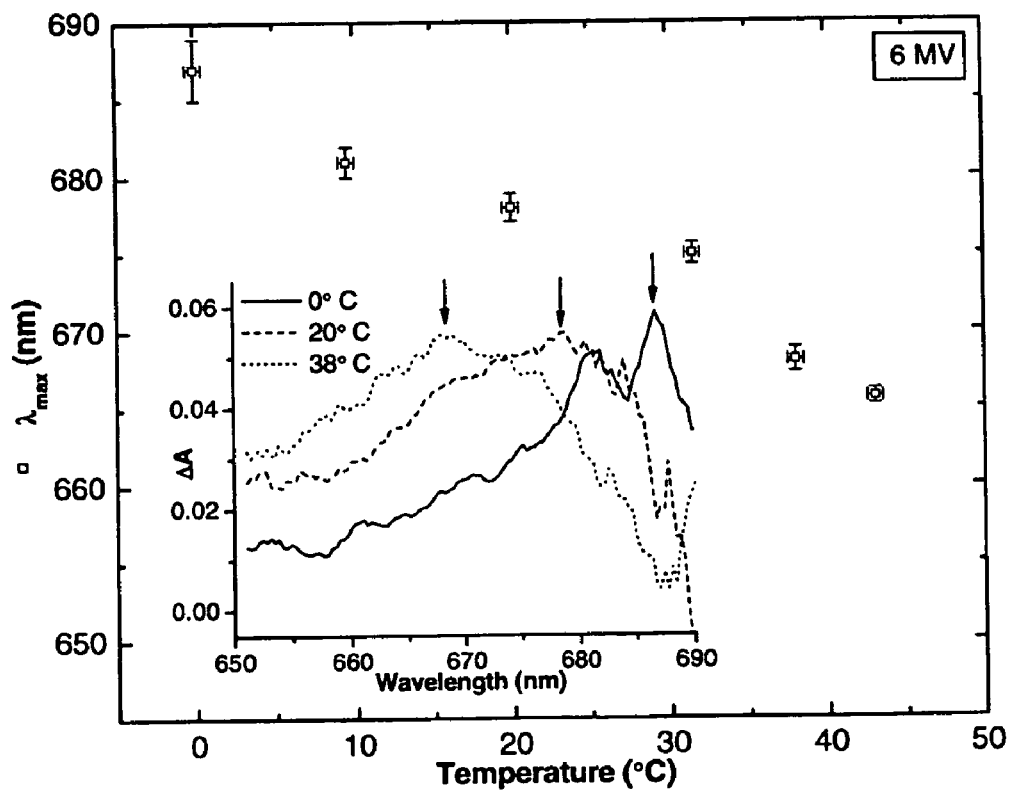
FIG. 19 is a graph showing the change in absorbance versus wavelength of the linear radiation sensitive material at several temperatures and the wavelength at which maximum or optimum change in absorbance occurs versus temperature.
Figure 20:
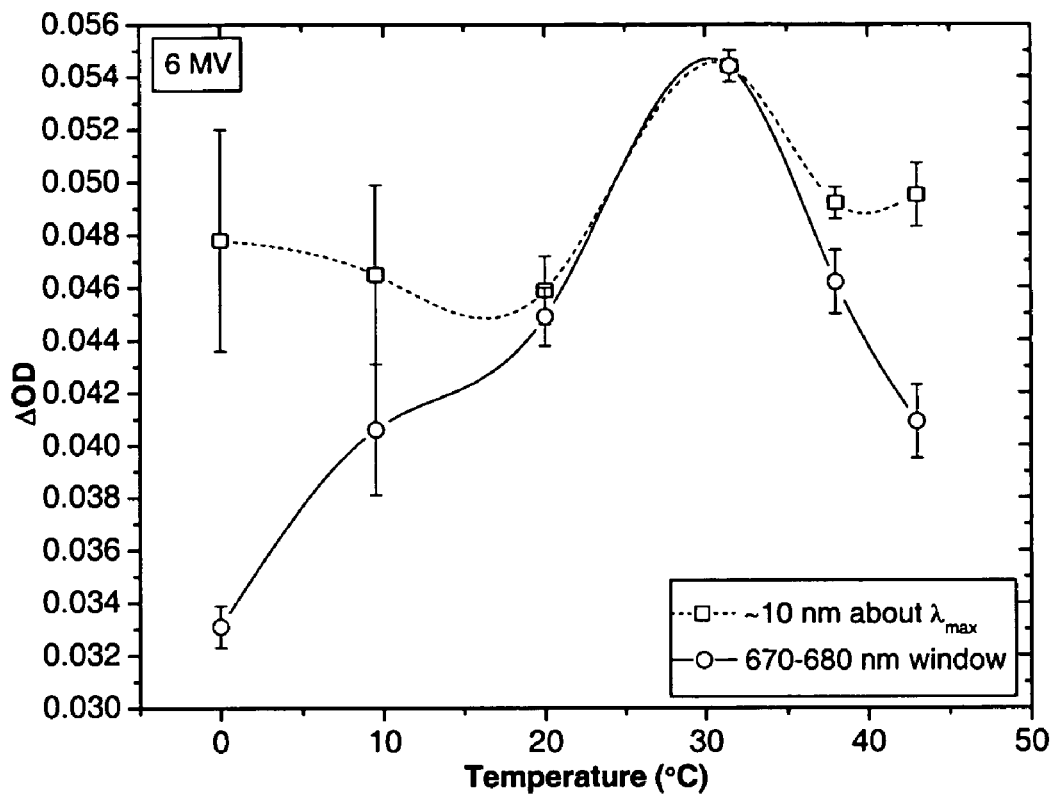
FIG. 20 is a graph of the change in optical density of the linear radiation sensitive material versus temperature for measurements taken using different spectral windows of interest.

Using a spectral window of interest in the range of 670-680 nm, the ΔOD was measured for a range of temperatures while the radiation sensitive film 152 within the test sensor 104 was provided with a 95 cGy radiation dose delivered at a rate of 286 cGy/min. The mean ΔOD increased from 0.0331±0.0008 at 0.0±0.5° C., to 0.0544±0.0006 at 31.5±0.5° C., and then decreased to 0.041±0.001 at 43.0±0.5° C. FIG. 19 shows a decrease in $\lambda_{opt}$ to lower values with increasing temperature. To accurately assess the temperature effect by taking into account that opt shifts due to temperature change, the average $\lambda_{opt}$ was found for each irradiation at a given temperature, and the ΔOD was recalculated with the 10 nm spectral window of interest centered about the average $\lambda_{opt}$ or $\lambda_{max}$ (see FIG. 20). Averaging of ΔOD about $\lambda_{opt}$ instead of a fixed window increases the average measured ΔOD for a given dose when $\lambda_{opt}$ was on the periphery or outside of a static spectral window of interest.

The test results show an overall decrease in ΔOD for a given dose as the temperature of the radiation sensitive material increases from approximately room temperature to over 40° C. This is consistent with previously published data. Part of the sharp decrease once temperature increases over 32° C., and the large fluctuations within the temperature range are due to the position of $\lambda_{opt}$ in the spectral window of interest and the choice of wavelengths used in the light source 108. The wavelength of optimum absorbance decreases with temperature increase, and the $\lambda_{opt}$ observed at 20 and 32° C. are similar to those reported earlier by Klassen [1997]. Performing the averaging of $\Delta$OD about $\lambda_{opt}$ instead of a fixed spectral window increases the average measured $\Delta$OD for a given dose if $\lambda_{opt}$ is on the periphery or outside of a static spectral window of interest. However, even if the $\lambda_{opt}$ shift is taken into account, there is an increase in $\Delta$OD with an increase in temperature between 0 and 30° C., followed by a decrease in $\Delta$OD. The latter can be explained by a change in monomer crystal structure in the radiation sensitive material that occurs as temperatures close to 60° C. are approached. The imperfect alignment of the monomers may alter unit cell parameters within the crystal and decrease the chance of polymerization [Baughman, 1978].

It is clear that drastic changes in temperature of the radiation sensitive material may introduce new errors that are not accounted for by using either the calibration plot or the pre-exposure calibration method described previously. Some of the errors may be eliminated if the spectral window of interest used for measuring $\Delta$OD is the 10 nm window centered about $\lambda_{opt}$. This tracking of $\lambda_{opt}$ might also reduce some of the error of using a GafChromic® MD-55 based radiation dosimeter that has been stored for a long period of time or for a radiation dosimeter that has been exposed to several large doses of radiation, since $\lambda_{opt}$ varies with storage time and cumulative radiation dose exposure [Meigooni 1996; Saylor 1988; Chu 1990; McLaughlin 1991, 1995; Mack 2003].

Tests were also conducted to determine the effect of continuous versus pulsed irradiation on $\Delta$OD for GafChromic® MD-55. The test sensor 104, having a single piece of radiation sensitive film, was positioned with an 81.5 cm surface-to-axis distance (SAD) under a Cobalt 60 unit. Using a 10 cm×10 cm field, and a dose rate of 85 cGy/min, the test sensor 104 was exposed to 85 cGy six times, with approximately five minutes between exposures. Using a LINAC, another piece of film from the same sheet was exposed at 85 cGy/min for a period of 1 min (85 cGy dose) six times, with approximately five minutes between exposures.

Using the intersection method, both the intra-exposure slope and $\Delta$OD were calculated. The values were then compared between the two methods of irradiation. The mean regression slope and $\Delta$OD obtained for a film irradiated to 85 cGy at 85 cGy/min with Cobalt-60 are $(7.34\pm0.12)\times10^{-4}$ s$^{-1}$ and $0.0447\pm0.0012$ respectively. The mean regression slope and $\Delta$OD obtained for a film irradiated to 85 cGy at 85 cGy/min with a LINAC are $(7.47\pm0.15)\times10^{-4}$ s$^{-1}$ and $0.0447\pm0.0012$ respectively. The ratio of the average slope obtained on a LINAC to average slope obtained on a Cobalt-60 unit is $1.02\pm0.03$. The ratio of the average $\Delta$OD obtained on a LINAC to average $\Delta$OD obtained on a Cobalt-60 unit is $1.00\pm0.04$. Both ratios are within error of 1.00. Hence no difference in slope and $\Delta$OD values between the two modes of dose delivery was found for a given dose delivered at the same dose rate.

Overall, the experimental results show that the change in optical density of GafChromic® MD-55 as a function of time shows a quick increase during exposure, with a rate that is proportional to the applied dose-rate. The end of exposure is marked by an abrupt decrease in the rate of $\Delta$OD, with the $\Delta$OD increasing thereafter logarithmically with time approaching a value that would typically be measured 24-48 hours later, as is conventionally done, and related to total dose. It was found that $\Delta$OD measured immediately at the end of exposure, which can be easily identified, is also proportional to dose in the tested range of 0 to 4 Gy. Performing such measurements can predict the applied dose immediately at the end of exposure within average error of 5%. This is in direct contrast to currently established methods of measuring radiation exposure on the radiation sensitive film.

Further, the test results showed that calibrating each radiation dosimeter prior to its use can decrease errors in the estimated delivered dose. The sensitivity of the radiation dosimeter can be increased by increasing the thickness of the linear or nonlinear radiation sensitive material to increase the accuracy of estimated radiation dose for small amounts of radiation.

Varying radiation dose rate between 95 cGy/min and 570 cGy/min, it was found that measurements of $\Delta$OD immediately after the end of exposure did not suffer from dose-rate dependence for low doses (i.e. $\leqq100$ cGy), typical of those delivered in a single beam during fractionated external beam radiation therapy. Higher doses (i.e. $\geqq2$ Gy) exhibited some dose-rate dependence. The $\Delta$OD measurements performed immediately at the end of exposure also exhibited significant temperature dependence in the clinically relevant range of 20-40° C. Part of the dependence can be explained by the shift of wavelength of optimum absorbance to lower values with increase in temperature, hence decreasing measurement accuracy if the spectral window of interest is not shifted to account for the temperature effect on $\lambda_{opt}$.

As mentioned, non-linear radiation sensitive materials may also be used in the radiation dosimeter. One example of a nonlinear radiation sensitive medium or material is GafChromice EBT film (made by International Specialty Products (ISP) of Wayne, N.J., USA). This material was created for use in external beam dose verification, albeit not for real-time applications, and may be more sensitive than both GafChromic® HS and MD-55 films. This makes it potentially useful for low dose verification, such as doses delivered in each IMRT (Intensity-Modulated Radiation Therapy) segment. The EBT material may also improve some of the real-time dosimetry issues, including stability of wavelength of maximum absorbance ($\lambda_{max}$), and decreased extent of post-exposure darkening.

Graf Chromic® EBT also may address the requirement for a small radiation sensitive volume with improved water-equivalency compared to GafChromic® MD-55, increased sensitivity to low doses, and faster polymerization kinetics, resulting in a stable response shortly after exposure. The experimental set-up and method previously used in the real-time investigations of GafChromic® MD-55 (see FIG. 7) was employed and slightly modified.

Figure 21:
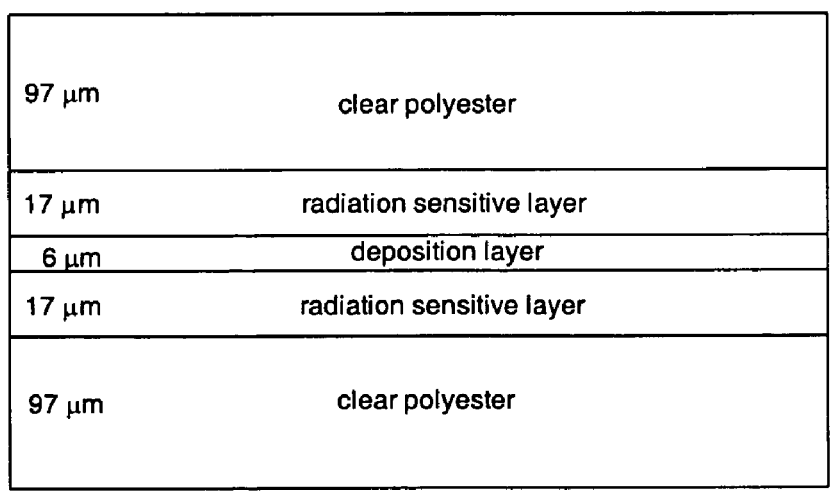
FIG. 21 is a schematic of the layers in EBT material which is an example of a non-linear radiation sensitive medium that can be used in the radiation dosimeter of the invention.

The experimental setup described previously was modified by removing the beam splitter 110 and using a light emitting diode as the light source 108 (HLMP-ED25-TW00, Agilent Technologies, Palo Alto, Calif., USA) with an emission peak of approximately 633 nm and a bandwidth of approximately 25 nms for interrogating the greater of the two absorbance peaks of the EBT material. The EBT film that was tested consisted of five layers (see FIG. 21), where the clear polyester was assumed to be Mylar as employed in the MD-55 film [Klassen et al., 1997]. The overall atomic composition of this configuration is: 42.3% C, 39.7% H, 16.2% O, 1.1% N, 0.3% Li, 0.3% Cl [ISP product information].

The test setup operated with 13.55±0.01 mA power supply driving light output from the light emitting diode. A dark spectrum ($I_D$) and a reference spectrum ($I_{OS}$) were collected prior to each radiation exposure. The reference spectrum $I_{OS}$ at a given wavelength is proportional to the radiant power of the light transmitted through the unirradiated piece of EBT film (measured over ~0.33 mm$^2$). Irradiation of the film was initiated shortly (typically <3 s) after starting the collection of the sample spectra (Ihd Sl ). The spectrometer integration time ranged from 8-10 ms, depending on the study performed, and each spectrum was recorded. The change in absorbance ($\Delta A$), at any measurement interval, for each wavelength was calculated using equation 1.

The EBT material likely undergoes interactions with interrogating light other than absorption. However, the optical scattering is assumed to be negligible, and the fraction of light reflected from both the clear polyester layer and from the sensitive layer is assumed to be independent of dose. Hence, the change in absorbance as measured by light transmission is assumed to be entirely due to a radiation induced increase in concentration of absorbers within the sensitive layers of the film.

Figure 22:
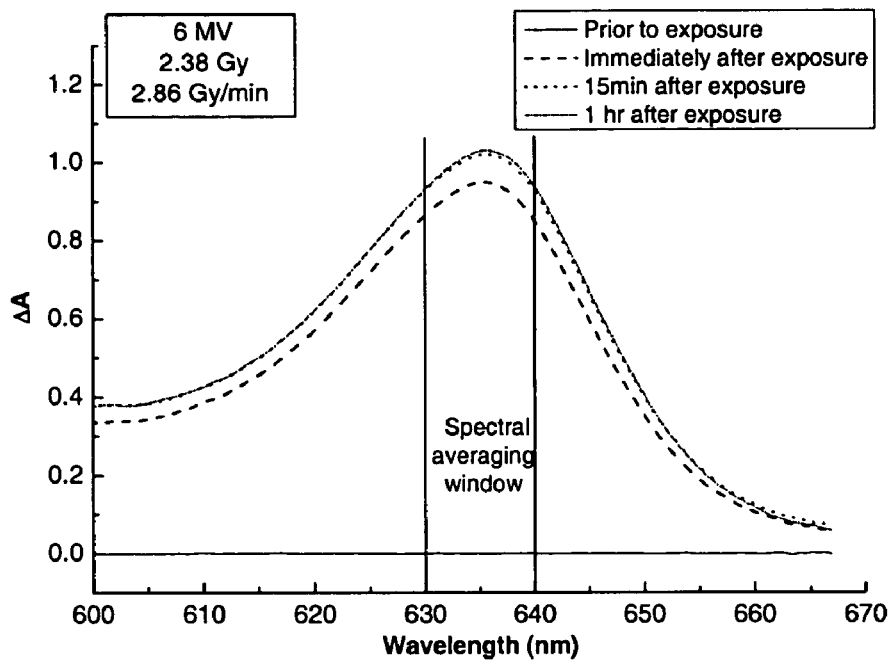
FIG. 22 is a graph showing the change in absorbance of EBT material over a range of wavelengths measured before exposure, immediately after exposure and two time points post-exposure.

Referring now to FIG. 22, shown therein is a graph of the change in absorbance of a single piece of EBT film prior to exposure, immediately after exposure to 2.38 Gy at 2.86 Gy/min, and at 15 and 60 minutes after the completion of exposure. The spectral window of interest, or range for optical density calculation, is a 10 nm band around the main peak (630-640 nm). However, in some cases, other bandwidths may also be used for the spectral window. The change in optical density ($\Delta OD$) can be calculated as defined in equation 2 where the wavelengths that span the window of interest in the spectrum are sampled roughly every 0.33 nm.

The light power incident on a ~650 μm diameter spot of the film within the holder was measured at about 75±10 nW (using a 840-C power meter and 818-SL detector, Newport, Mountain View, Calif., USA). The effect of this power level of interrogation light on the EBT material was investigated by monitoring the $\Delta OD$ for an unexposed piece of the material over a period of one hour on eight separate occasions. The average increase in OD was 0.001±0.002, and considered statistically insignificant (type I error of 5%).

One experiment on radiation exposure looked at the change in optical density ($\Delta OD$) of the EBT material versus time. In this experiment, five 1 cm×1 cm pieces of EBT film were exposed to 9.52 Gy at an average dose rate of 2.86 Gy/min. The transmitted spectra were collected during exposure, and for approximately one hour after completion of exposure. The $\Delta OD$ values were calculated according to equation 2 and plotted versus time.

Figure 23:
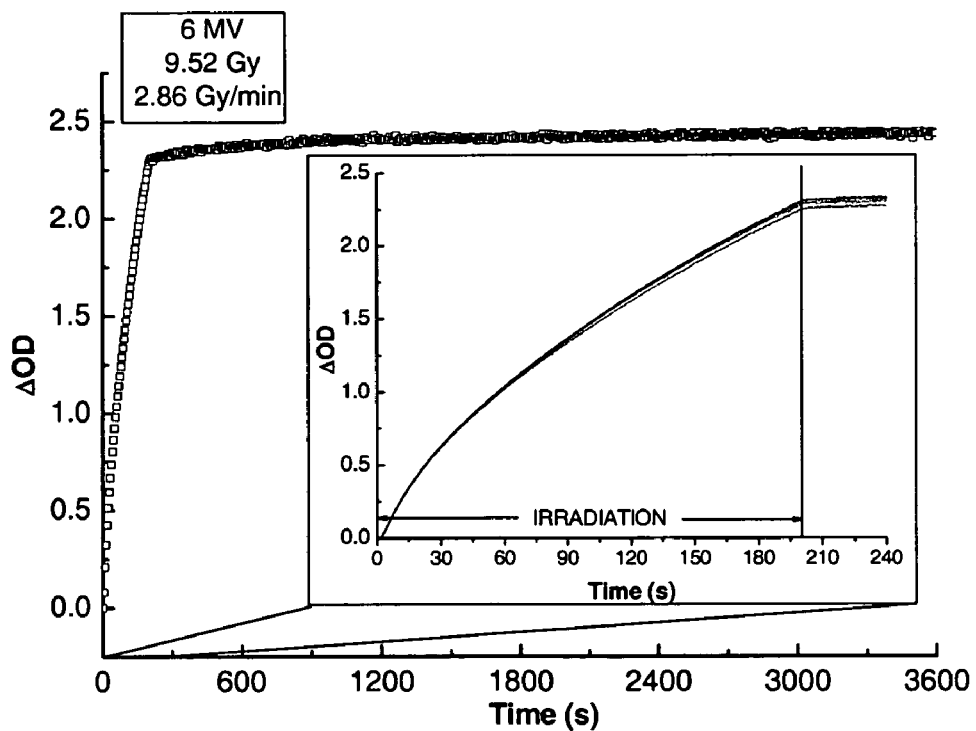
FIG. 23 is a graph showing the change in optical density for a single piece of EBT film and the inset shows the change in optical density for five pieces of EBT film on a reduced time scale (in both cases the ionizing radiation source was turned on at zero seconds and turned off at 200 seconds and applied at a uniform rate)

If radiochromic substances are to be used in real-time dosimetry, errors due to post-exposure darkening have to be understood and accounted for. The simplest way to eliminate a substantial fraction of post-exposure darkening is to limit measurements to those obtained during exposure. This requires knowing when the radiation is present. FIG. 23 shows $\Delta OD$ versus time during exposure to 9.52 Gy (at 2.86 Gy/min) and for approximately one hour after exposure for a single piece of EBT film. A distinct difference in darkening rates between exposure and post-exposure (intra- and inter-exposure, respectively) can be seen, and duration of radiation exposure can be easily deduced from the measured optical information signal.

The rate of change in optical density during exposure is related to dose rate, as is seen for MD-55 film. It is likely that the $\Delta OD$ increase between intra- and inter-exposure are indistinguishable at low dose rate and therefore a separate radiation detector can be used to signal the end of radiation dose delivery. This limiting dose rate may need to be established if the radiation sensitive medium of EBT film is to be used as a real-time in vivo dosimeter. The inset in FIG. 23 illustrates $\Delta OD$ versus time for five pieces of film, each exposed to 9.52 Gy at 2.86 Gy/min. The measurements obtained for the same average dose rate is reproducible, yielding a 1.0% standard deviation in $\Delta OD$ at the end of exposure. This 1.0% standard deviation includes errors due to possible spatial variation in film response, which may be similar to that observed in MD-55, [Meigooni et al., 1996] measurement errors in the spectrophotometer results, light source intensity fluctuations, and deviations introduced due to variations in the assembly of the film holder and the phantom in the test setup which may have occurred when the film was replaced.

Figure 24:
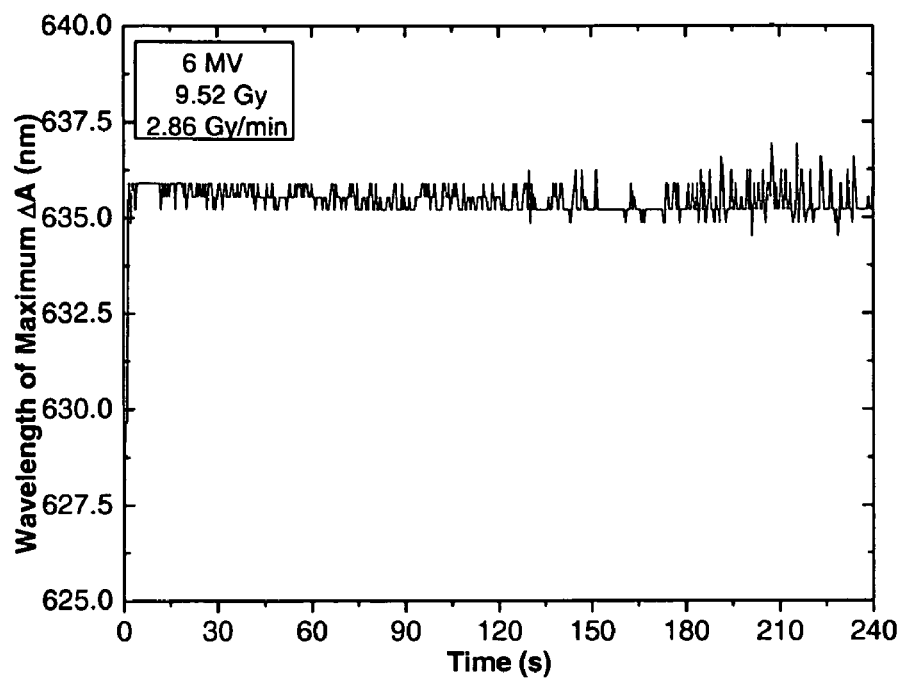
FIG. 24 is a graph showing the wavelength of maximum absorbance for EBT versus time during and after exposure to 9.52 Gy at 2.86 Gy/min with 6 MV X-rays (the ionizing radiation beam was on from 0 to 200 seconds)

The results show that $\Delta OD$ is slightly non-linear with time (and hence with dose). The non-linearity is not due to a shift in wavelength of maximum absorbance ($\lambda_{max}$) which was found to be quite stable over the entire 200-second exposure to 9.52 Gy (see FIG. 24). The average $\lambda_{max}$ for all exposures was calculated to be 635.6±0.7 nm (where the reported uncertainty is two times the standard deviation).

Figure 25:
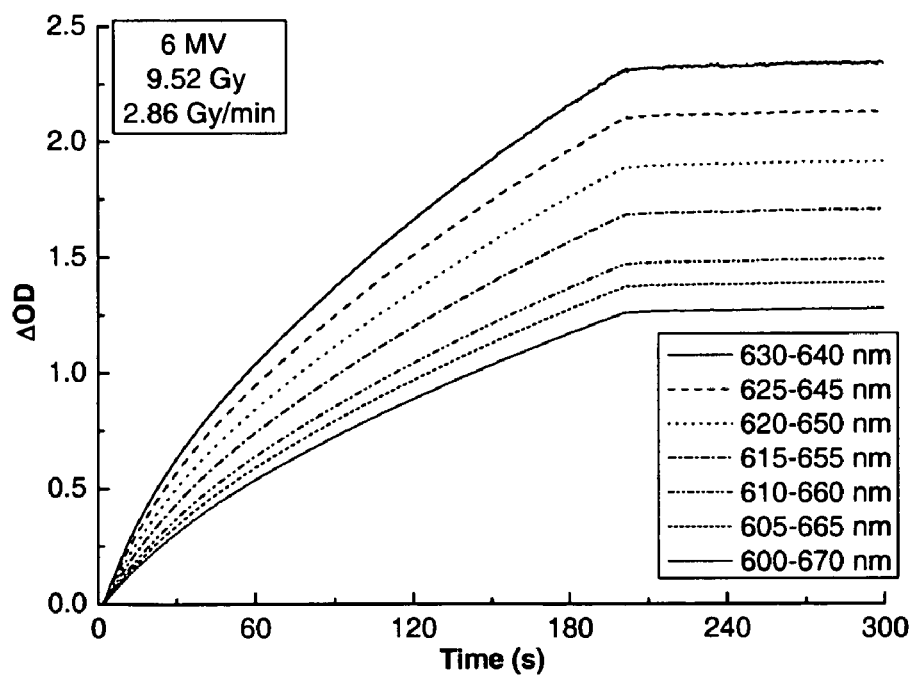
FIG. 25 is a graph showing the change in optical density versus time for various spectral windows for EBT material.

The effect of changing the wavelength range of the spectral averaging window on $\Delta OD$ is shown in FIG. 25, illustrating that increasing the spectral range from 10 nm to 70 nm still showed a similar non-linear effect, albeit less pronounced. The non-linearity may be due to a decrease in polymerization rate with dose, or saturation of carbon-carbon double and triple bonds in the polymer. The sensitive medium of EBT film is a modified version of that used in GafChromic® MD-55 and HS films. The optical density of these films is based on the increase in the number of chains with conjugated double and triple bonds that form during radiation induced polymerization. The EBT film may be used for real-time in vivo dosimetry, provided that the total delivered dose is kept track of and the curves are insensitive to fluctuations in dose-rate and temperature that are typical of in vivo conditions. If so, a correction function may be used to obtain a one-to-one correlation between $\Delta OD$ and dose.

In another test, one 1 cm×1 cm piece of EBT material and four stacked 1 cm×1 cm pieces (to increase optical signal and minimize error due to small fluctuations in light signal) [Cheung et al., 2001] of MD-55 (lot #L1906MD55) were each exposed to a dose of 1.9 Gy. The MD-55 film was optically interrogated with a 680 nm light emitting diode (Roithner Lasertechnik, Vienna, Austria), using the modified test setup of FIG. 7, and the same spectral range as in the previous tests for MD-55 (i.e. 670-680 nm). The 33.0±0.3 nW of power delivered to a ~650 μm spot on the previously un-irradiated film was shown to have a small effect on $\Delta OD$ (0.0034 over 24 hours), but was tolerated in order to keep the signal intensity and integration time on the spectrophotometer sufficient for real-time measurements. For both types of radiochromic film, spectra were obtained during exposure and for approximately 19 hours following exposure without disturbing the experimental setup. The data obtained for MD-55 film was divided by four (corresponding to the factor of 4 increase in sensitivity anticipated for the 4 layers used in this test) in order to obtain the average $\Delta OD$ increase for each individual layer of MD-55 film. To compare stability between the two types of films, the post-exposure measurements were normalized by the change in optical density measured immediately at the end of exposure.

Figure 26:
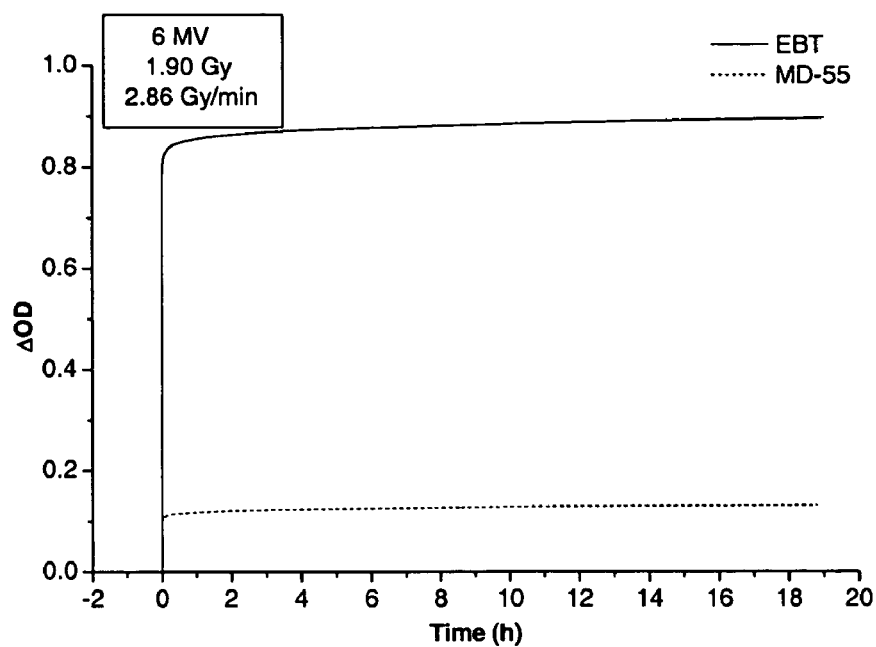
FIG. 26 is a graph showing the change in optical density for EBT and MD-55 films during and after exposure to 1.9 Gy using 6 MV X-rays at a uniform rate.

The relationship between $\Delta OD$ and time for the two types of films due to a 1.9 Gy exposure with 6 MV X-rays is shown in FIG. 26. The measurements were not normalized by the thickness of radiation sensitive layer (each of EBT's radiation sensitive layers is 1 μm thicker than that of MD-55). Comparing or correcting for the thickness difference between MD-55 and EBT films is not particularly relevant; the two films have different radiation sensitive media, and their suspensions (both concentration and distribution) within the active layers are likely not the same. However, if a dosimeter were to be designed for a specific thickness, correcting for thickness differences is useful in predicting the performance that could be achieved with each of these media.

Figure 27A:
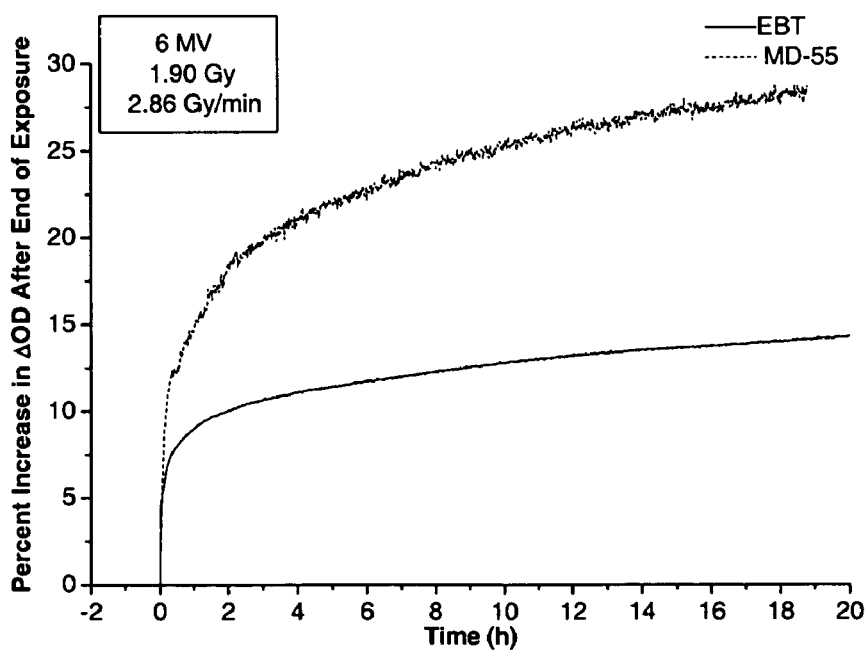
FIG. 27a is a graph showing the percent increase in the change in optical density for EBT and MD-55 material after exposure, calculated with respect to the change in optical density at the end of exposure.

The results show that the EBT film is about 7.7 times (as measured immediately at the end of exposure) more sensitive than MD-55 film when exposed to approximately 2 Gy with 6 MV X-rays. The sensitivity increase is defined here as the ratio of the optical densities for a given dose, although other definitions (such as the ratio of doses required to achieve a certain optical density) can be used and may give a slightly different sensitivity value. Difference in sensitivity between MD-55 and EBT film depends on the energy at which the exposures to radiation are performed, since EBT is supposed to be more sensitive to low kV energy photons than MD-55 (International Specialty Products (ISP) product information). This makes EBT's response to ionizing radiation closer to that of water, potentially broadening the energy range over which it can be used in an in vivo dosimeter. Furthermore, since the optical density of EBT (measured near the absorbance peak) is not linear with dose, the increase in sensitivity between EBT and MD-55 is also dose dependent. The percent increase in $\Delta OD$ following exposure, calculated with respect to the value measured immediately at the end of exposure from the data of FIG. 26, is shown in FIG. 27*a*.

The percent increase for EBT film is nearly two times less than that of MD-55, and the signal begins to plateau earlier. At 18 hours after exposure, the $\Delta OD$ of EBT film has increased by roughly 12.5%, whereas the increase for MD-55 film is more than 25%. The decreased post-exposure darkening of EBT film, compared to that of MD-55 film, suggests that the polymerization kinetics occurring within the radiation sensitive medium are quicker, likely due to a different structure and packing of the sensitive material within the radiation sensitive layer. This is important for real-time radiation dosimetry applications of the invention. Accurate real-time dose measurements during the latter part of exposure will be possible without extraneous errors due to 'post-exposure' darkening of the dose delivered at the onset of exposure.

Figure 27B:
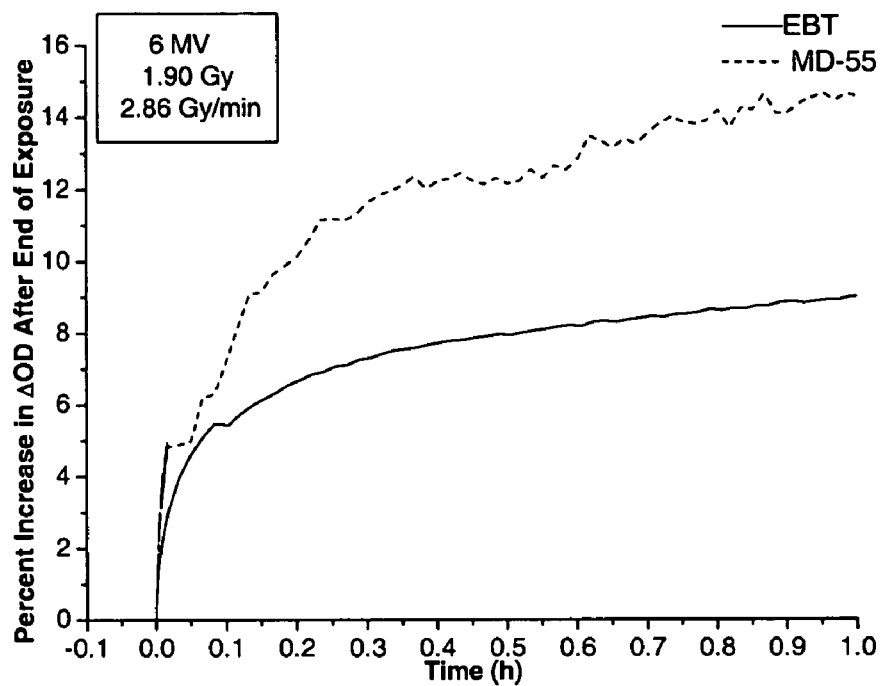
FIG. 27b is a graph showing the percent increase in change in optical density for EBT and MD-55 material measured within one hour after exposure.

The percent increase in $\Delta OD$ reported here for MD-55 is high due to comparing the increase in optical density to the value measured immediately after exposure. This data shows that a large portion of growth in $\Delta OD$ occurs within the first few minutes (see FIG. 27*b*) (this is not assessed in more conventional methods of measuring optical density for these films). It should be noted that the $\Delta OD$ drift values reported here are valid for the dose-rate of 2.86 Gy/min, and may differ if another dose or dose-rate is used [Ali et al., 2003].

In another test, the dose rate dependence of $\Delta OD$ measurements performed during, or immediately at the end of, radiation exposure was investigated by irradiating EBT film to the same total dose of 9.52 Gy at one of two different dose-rates (5.71 Gy/min or 0.95 Gy/min). Five films in total were exposed at each dose rate. The $\Delta OD$ as a function of time was converted to a function of dose during exposure, using the average dose rates that were just mentioned. The values recorded immediately at the end of exposure were compared (a statistical analysis of variance test using type-I error $\alpha$=0.01 was used).

Figure 28:
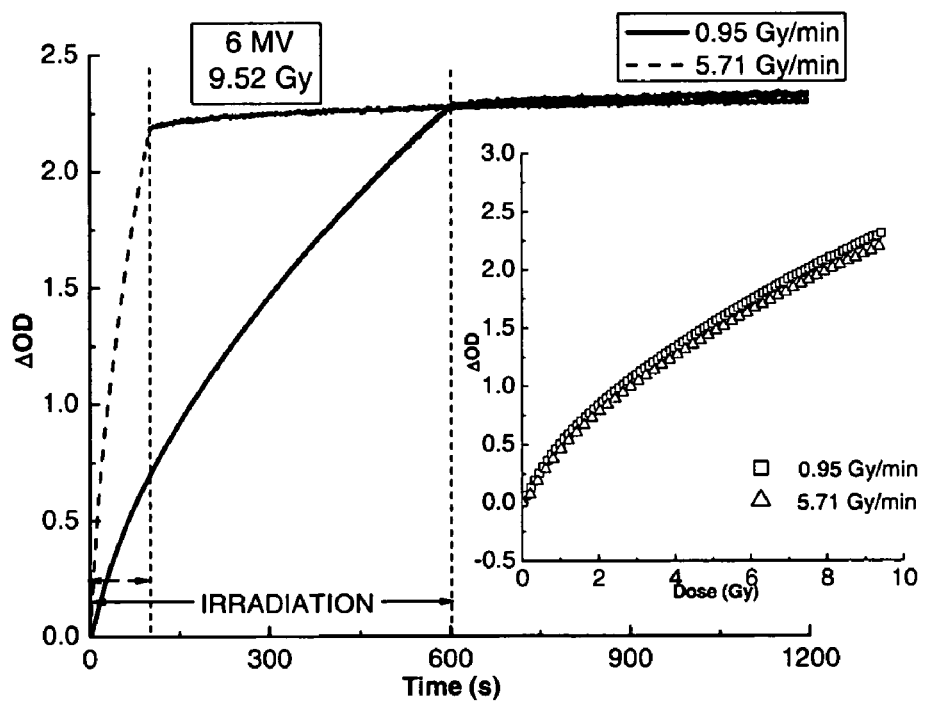
FIG. 28 is a graph showing the change in optical density for EBT material exposed to 9.52 Gy, delivered with 6 MV at 0.95 Gy/min and 5.71 Gy/min (the inset shows the change in optical density normalized to dose during the same exposure to 9.52 Gy)

The change in OD versus time for a 9.52 Gy exposure delivered at two different dose rates (0.95 Gy/min and 5.71 Gy/min) is shown in FIG. 28. With the time axis converted to dose (see the inset in FIG. 28), the data obtained during exposure superimpose well. However, analysis of variance of the $\Delta OD$ values as measured at the end of exposure revealed a statistical difference between the two groups, and hence a dose rate dependence for real-time measurements. The percent standard deviation (with respect to the mean) increased from 0.9% to 1.8% when both sets of data were included. Depending on the desired accuracy of dose estimate, this small dose rate dependence of real-time measurements may be tolerable. However, dose and dose rate ranges over which dose rate variations do not introduce extraneous errors in real-time measurements should be established. The dose rates used in this investigation (0.95 Gy/min and 5.71 Gy/min) are applicable to external beam (linear accelerator output range of 100-600 MU/min, with treatments typically delivered at 300 MU/min), and high dose rate brachytherapy [Nath, 1995].

The GafChromic® EBT film is more sensitive to ionizing radiation dose and exhibits less post-exposure darkening than GafChromic® MD-55 film. It shows a distinction between inter- and intra-exposure rates of $\Delta OD$ increase, which allows easy identification of the end of exposure, but $\Delta OD$ during exposure is not linear with dose. Since $\lambda_{max}$ is stable over the entire exposure to 9.52 Gy, increasing the spectral window of interest does not correct non-linearity. This non-linearity is thus likely due to the actual polymer chemistry that occurs in the sensitive medium of the film (such as depletion of monomers available for polymerization). This is not a deterrent against real-time dosimetry, as long as the correction function is stable against dose rate and temperature fluctuations. A small dose rate dependence in real-time measurements, yielding an increase in standard deviation from 0.9% to 1.8%, is seen for a dose of 9.52 Gy and a dose rate range between 0.95 and 5.71 Gy/min. For EBT film to be useful in real-time in vivo dosimetry, dose and dose rate ranges, at which dose rate dependent errors are not seen, need to be established. Dependence of $\Delta OD$ measurements and $\lambda_{max}$ on temperature also need to be investigated. Since there is no shift of $\lambda_{max}$ with dose, it is very likely that there is no shift in $\lambda_{max}$ for age and the same may hold true for temperature due to the structural properties of EBT. However, the sensitivity of the EBT material appears to change with age and this may be captured by using pre-calibration—i.e. performing calibration before each use—and carefully monitoring the total dose delivered to the dosimeter thus far. Calibration up to a day before use may be sufficient. Although further investigations are required, GafChromic® EBT's increase in sensitivity and rates of polymerization, and decreased post-exposure darkening may allow it to be used as a radiation sensitive medium for real-time in vivo radiation dosimetry.

Figure 29A:
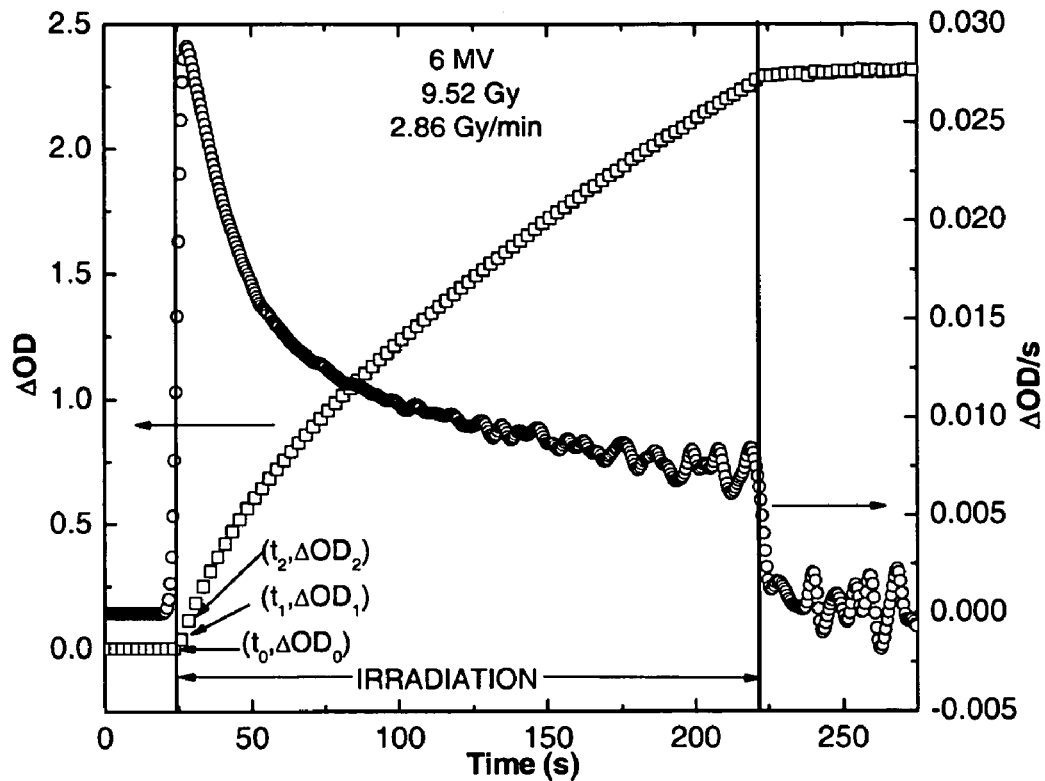
FIG. 29a is a graph showing the change in optical density for a non-linear radiation sensitive medium versus time when the radiation sensitive medium is irradiated at a uniform dose rate and the derivative of the change in optical density with respect to time.

Referring now to FIG. 29*a*, shown therein is a graph of the change in optical density of the non-linear radiation sensitive EBT material versus time when EBT is irradiated at a uniform dose rate. FIG. 29*a* also shows the derivative of the change in optical density with respect to time. The irradiation segment can be easily identified by looking at the values for the derivative of the change in optical density ($\Delta OD/s$) with respect to time. As previously mentioned, a threshold value that distinguishes between $\Delta OD/s$ values expected during irradiation and $\Delta OD/s$ values due to noise can be used to determine the beginning and end of the irradiation period. The non-irradiation segments can also be identified by substantially linear lines which are almost horizontal before and after the irradiation (i.e. non-linear segment) of the $\Delta OD$ versus time curve.

Figure 29B:
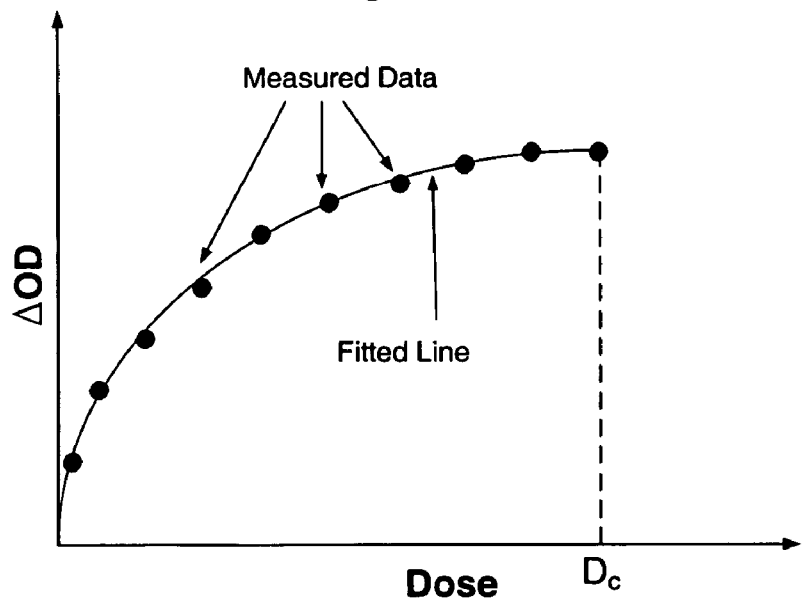
FIG. 29b is an exemplary calibration plot relating applied Calibration Dose to ΔOD for a non-linear radiation sensitive medium and uniform dose rate; and, FIG. 29c is a plot of the change in ΔOD with respect to time versus total applied Dose for a constant dose delivery rate.

During calibration for a non-linear radiation sensitive material, one generates a plot of the change in optical density ($\Delta OD$) versus dose when applying a known total calibration dose ($D_c$) at a constant dose rate. An example of a calibration curve generated under these conditions is shown in FIG. 29*b*. In general, this curve will have a similar non-linear shape as that shown for $\Delta OD$ versus time in FIG. 29*a* (for this particular medium). After the calibration, the amount of radiation that the radiation sensitive material has been subjected to during the calibration procedure needs to be recorded for future use, as described in detail below.

Figure 29C:
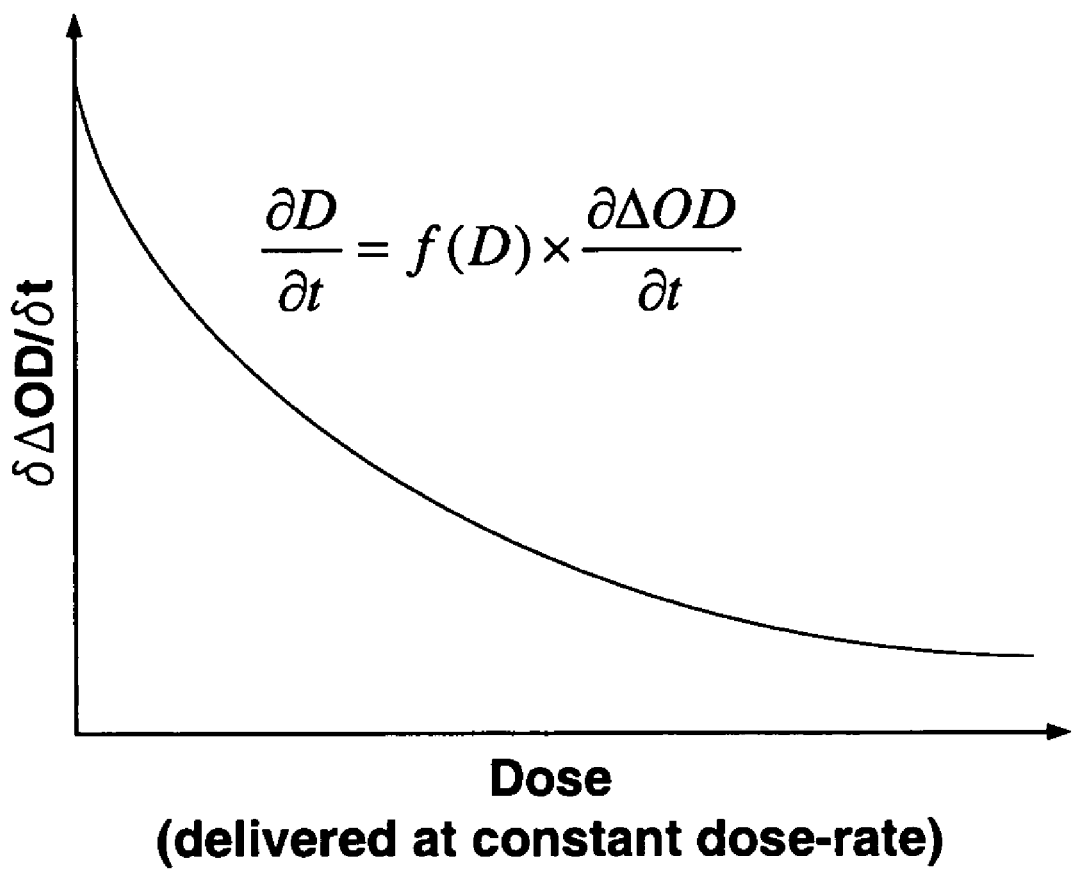

Referring now to FIG. 29c, shown therein is a plot of the time derivative of the change in optical density versus the dose, obtained from knowledge of how ΔOD changes with dose at a given constant dose-rate for a given thickness of the nonlinear radiation sensitive medium (this data is obtained prior to the calibration of an individual dosimeter). The calibration data then serves to scale the f(D) appropriately, since f(D=0) is a function of thickness of the radiation sensitive medium. This calibration plot can be defined by equation 6:

$$\frac{\partial D}{\partial t} = f(D) \times \frac{\partial \Delta OD}{\partial t} \quad (6)$$

where f (which is a function of total delivered dose, and can thus be written as f(D)) is an equation that describes the relationship between $$\frac{\partial D}{\partial t} \text{ and } \frac{\partial \Delta OD}{\partial t}.$$

The equation f(D) can be curve-fit to (δD/δt)+(δΔOD/δt) versus dose (delivered at constant dose-rate δD/δt) data using an appropriate curve-fitting program as is well-known to those skilled in the art. Parameters that define the curve f(D) can then be stored and used during the operation of the radiation dosimetry system to calculate the delivered radiation dose. Alternatively, one can create a look-up table that defines values for the function f(D) based on certain total dose ranges. For a non-linear medium such as EBT, which decreases in sensitivity with total delivered dose, the function f(D) is an increasing function.

During measurement, the function f(D) or the look-up table defining the function f(D) can be used to calculate the applied dose during the application of both uniform and non-uniform dose rates. At the very beginning of exposure, this is done by taking the previous cumulative radiation dose value ($D_0$) that the radiation sensitive material was subjected to (such as the total calibration dose $D_c$ delivered during the pre-calibration of the dosimeter), calculating or looking up $f(D_0)$, calculating $$\frac{\partial \Delta OD}{\partial t}$$

during exposure over a small time interval between $t_0$ and $t_1$ (which can be a fraction of a second for example), and then multiplying $$\frac{\partial \Delta OD}{\partial t}$$

by the value of $f(D_0)$ and the time interval between the measurements ($t_1-t_0$). This is shown in equations 7 to 10 with respect to the change in optical density between times $t_1$ and $t_0$ (i.e. $\Delta OD_1$ and $\Delta OD_0$ represented by $\Delta OD_{1,0}$) and equations 11 to 14 with respect to the change in optical density between times $t_2$ and $t_1$ (i.e. $\Delta OD_2$ and $\Delta OD_1$ represented by $\Delta OD_{2,1}$). See FIG. 29a for the locations of $\Delta OD_0$, $\Delta OD_1$ and $\Delta OD_2$ and $t_0$, $t_1$ and $t_2$.

$$\frac{\partial \Delta OD_{1,0}}{\partial t} \approx \frac{\Delta OD_1 - \Delta OD_0}{t_1 - t_0} \quad (7)$$

$$\frac{\partial D}{\partial t} = f(D_0) \cdot \frac{\partial \Delta OD_{1,0}}{\partial t} \quad (8)$$

$$D_1(t_1) = f(D_0) \cdot \frac{\partial \Delta OD_{1,0}}{\partial t} \cdot (t_1 - t_0) \quad (9)$$

$$D_{tot}(t_1) = D_1 \quad (10)$$

In a likewise fashion for $t_2$:

$$\frac{\partial \Delta OD_{2,1}}{\partial t} \approx \frac{\Delta OD_2 - \Delta OD_1}{t_2 - t_1} \quad (11)$$

$$\frac{\partial D}{\partial t} = f(D_0 + D_{tot}(t_1)) \cdot \frac{\partial \Delta OD_{2,1}}{\partial t} \quad (12)$$

$$D_2(t_2) = f(D_0 + D_{tot}(t_1)) \cdot \frac{\partial \Delta OD_{2,1}}{\partial t} \cdot (t_2 - t_1) \quad (13)$$

$$D_{tot}(t_2) = D_2 + D_{tot}(t_1) \quad (14)$$

This measurement method may be called the derivative measurement method. If the dosimeter is used again for a different exposure, then the f(D) is calculated by setting D to the total dose delivered thus far, which would include calibration dose (if pre-calibration was performed) and the dose delivered during the first exposure, $D_{tot}$ as calculated above.

The portion of the radiation dosimeter 16 that is in close proximity to the patient 38 is preferably made of water-equivalent material. This is beneficial since materials that do not react to ionizing radiation in a water-equivalent manner may alter the radiation actually delivered to the treatment site, possibly significantly, as well as the measurement of this radiation. Electronic components include metals that have a high atomic number and consequently are not water-equivalent. Accordingly, metallic components are preferably avoided in the radiation dosimeter 16. An example of this is the use of optical fibres rather than electrical wires to transmit signals to and from the radiation dosimeter 16. Further, the use of passive, non-hazardous components increases the safety of the radiation dosimeter 16 and allows for use in vivo (i.e. orifice or in tissue via a catheter).

It should be understood by those skilled in the art that there are not many materials that are truly water equivalent. Accordingly, the reference to water equivalent materials herein is meant to refer to materials that provide a response that is within an acceptable range to the response of water when irradiated. It should be noted that water-equivalency depends on the energy of the ionizing radiation so it may be difficult to find a material that is water-equivalent over a wide range of operating conditions.

In addition, the radiation dosimeter 16 employs a passive means for estimating the radiation dose delivered to the patient 38 that can be employed while the radiation dosimeter is still being irradiated. The passive means of measurement also does not change the signal that is being measured.

The calibration methods described herein can be used to calibrate the radiation dosimeter 16 shortly before use and therefore one does not have to rely on the calibration that is done when the radiation sensitive material is manufactured. This is advantageous because some radiation sensitive material, such as those described herein, can age, where the optical density increases with time and the sensitivity decreases with time. Using a dosimeter that was calibrated during its manufacturing, and which was stored for a period of time after purchase prior to its use may produce an erroneous reading of dose. More specifically, with a decrease in sensitivity with age, the measured dose would underestimate the actual dose. Accordingly, the mathematical parameters applicable when the radiation sensitive material was manufactured might not be correct after a period of storage, such as six months for example.

With the calibration methods described herein, even if the radiation dosimeter has been stored for a period of time after purchase, it can still be calibrated within a short period of time prior to its use. Thus the measured dose no longer relies on calibration factors measured during manufacturing. This allows for more accurate measurements, and a decrease in cost due to extended shelf life. Furthermore, results of the calibration will be stored in a computer file or another storage medium.

The radiation measurement technique described herein also differs from those previously used in the art since a measured change in an optical property, of which optical density is an example, is analyzed using a model (see FIGS. 6a and 29a) of the material-specific response to estimate dose immediately following or during irradiation. The optical property can be measured quickly based on the response of the radiation sensitive material used in the radiation sensitive medium. Further, the optical property can be measured at any time during radiation exposure, and not only after the end of exposure. This allows for on-line monitoring of actual radiation dose delivered to the treatment area on/within the patient 38, providing opportunity for therapists to stop treatment if the dose being delivered to the treatment area is greater than what is expected, hence increasing the safety of the patient 38. The inventive methods described herein also differ in that the radiation dosimeter 16 does not have to be removed from, or out of, the patient 38 to estimate the delivered dose and hence a dose can be estimated for each delivered fraction with the radiation dosimeter being 16 in the same position. This saves time and eliminates error due to having to reposition the radiation dosimeter 16 between fractions performed on the same day.

With regards to using optical density as the measured optical property, the radiation dose can be estimated any time during or immediately after irradiation. These events can also be detected by observing changes in the rate of change in optical density and shape of optical density curves, both of which can be easily monitored. The change in optical density measured for doses and dose-rates typically used in external beam radiation therapy do not need to be corrected even though the measurements are obtained in real-time. This is in contrast to prior art measurement methods which involved a wait period of 24 to 48 hours to obtain a measurement, or measuring earlier than 24 hours and applying a correction factor based on the delay in the time at which the material was measured to when it was exposed. Further, because the measurements may be performed in real-time, a distinction can be made in the response of the radiation dosimeter in terms of inter and intra-exposure to ionizing radiation.

The radiation sensitive materials discussed herein provide a number of benefits. However, the invention is not limited to the radiation sensitive materials discussed herein, and can be used with other media having optical qualities which change upon exposure to ionizing radiation in a reasonably quick fashion to enable real-time measurements. Any long-term (i.e. slow) responses can be dealt with as explained previously.

The radiation sensitive materials discussed herein enable repeated use of the radiation dosimeter 16. However, there is a dose beyond which the radiation dosimeter 16 cannot be re-used due to the total accumulated radiation that the radiation dosimeter 16 has been subjected to. The criteria for determining when the radiation dosimeter can no longer be used may include a medium-dependent protocol. For example, if GafChromic® MD-55 is used, a criterion for deciding that the radiation dosimeter 16 is no longer usable may be if the wavelength of optimum absorbance is below a certain value or if the sensitivity factor is below a certain value.

In addition, the technique proposed herein to estimate delivered dose is simple and can be performed by clinical staff, which decreases cost. The radiation dosimeter system 10 can be used to estimate radiation doses down to several cGy. In addition, the radiation treatment performed often creates a complex three-dimensional dose distribution; the radiation dosimeter 16 is small enough to evaluate the steep dose gradients that may be found in such a distribution. Based on the type of radiation sensitive material used, the radiation dosimeter 16 can provides readings that are somewhat independent of the dose rate in the range typically used in the clinic. The measurable response of the radiation dosimeter 16 is approximately linear with (or a simple known function of) total applied dose in the 1-1000 cGy range, delivered at uniform dose rate, such as seen for EBT. Further, the response of the radiation dosimeter 16 is available within seconds of dose delivery without any need for traditional processing steps and waiting times thereby providing real-time information on the order of millisecond to a few seconds. The radiation dosimeter is also non-toxic and robust both during therapist handling and insertion/removal into the patient. The radiation dosimeter is also disposable and sterilizable.

The radiation dosimeter of the invention is robust in signal and mechanical terms under difficult electromagnetic environments that can be encountered in radiation treatment rooms. The radiation dosimeter of the invention also does not interfere (exclude or throw artefacts) with other medical procedures that the patient may undergo if implanted with a radiation dosimeter and then undergoes MR imaging for example, CT imaging, etc.

It should be understood that the description is not to be considered as limiting the scope of the invention, but rather as merely providing a particular preferred working embodiment thereof. Further, various modifications can be made to the embodiments described and illustrated herein, without departing from the invention.

For instance, the optical interrogation signal may interact with the radiation sensitive medium in a number of different ways thereby allowing for different optical properties of the radiation sensitive medium to be measured and used to estimate radiation dose (this also depends on the particular radiation sensitive medium that is used). With regards to the embodiment shown in FIG. 2, the optical interrogation signal interacts with the radiation sensitive medium and is reflected back towards the return conduit due to the shape of the radiation sensitive medium and the cavity in which the radiation sensitive medium is contained. In other instances, different shapes may be used for the radiation sensitive medium as well as different material such that a different optical property is measured. For example, if the radiation sensitive medium contained in a cavity has transmittance, polarization or other parameters that depend on light actually traveling through the medium, as its ionizing radiation dependent property, then the optical interrogation signal may be transmitted through the radiation sensitive medium and reflected at an edge of the cavity and transmitted back to the return conduit. This configuration cannot be used with a radiation sensitive medium whose changing optical property is reflectance when the medium is subjected to ionizing radiation. Instead, the signal containing optical information would have to be collected through the same conduit as that providing the optical interrogation signal.

In addition, any radiation sensitive material having optical properties that change in a relatively consistent fashion when subjected to ionizing radiation may be used. However, the structure of the radiation dosimeter may have to be modified to measure the particular optical property that changes for the radiation sensitive material for which one example was given above.

Further, it should be noted that GafChromic MD-55 film, and possibly other related films, are also robust under conditions of varying cumulative total dose as well. Cumulative total dose is the sum of total radiation doses that have been delivered to the radiation sensitive medium since the radiation sensitive material was first used. This robustness is reflected in the fact that the optical signal obtained for a given total dose at the beginning of life of the radiation dosimeter has the same quality of that obtained several fractions later. Furthermore, the dynamic range varies depending on the type of GafChromic film that is used in the radiation sensitive medium (i.e. MD-55 vs HS, vs HD-810, etc.), and on the wavelength of the optical interrogation signal. Further, although EBT material does have a cumulative dose effect, this can be accounted for by using the derivative measurement method described herein.

In addition, a measurement can be performed that will indicate whether the radiation dosimeter can still be used. This measurement can occur either during the calibration procedure or in the previous measurement. For example, during the previous measurement, a criterion for disposal may be that the age or the usage of the radiation sensitive medium does not affect the measurement. This may be determined by using wavelength tracking, as can be done for linear radiation sensitive media discussed herein. For instance, for a radiation dosimeter that uses MD-55, if the wavelength of optimum absorbance (i.e. the absorbance peak) drops below a certain value (i.e. below 665 or 660 nm for example), then the radiation dosimeter should not be used for the next fraction, but this last measured fraction is valid. During the calibration procedure, the choice of criteria is a little bit more broad, since the applied dose is known. Accordingly, one can use absorbance peak location as well as check the sensitivity. In fact, for both linear and non-linear radiation sensitive media, if the sensitivity has decreased below a certain value, then the radiation dosimeter should be replaced with a new one. The minimum sensitivity value will depend on the accuracy that is desired for the measurements. For example, if it is desired to be able to measure 10 cGy with an accuracy of 2%, then the sensitivity must be such that with all the system noise, one can still perform this measurement. So if the noise is 0.0005 OD units, then that must correlate to 2% (i.e. 0.2 cGy), which means that the sensitivity can be no less than 0.2 cGy per 0.0005 OD units, or 400 cGy/OD unit.

Further, the radiation dosimeters do not need to be all the same. The radiation dosimeters can vary in the medium used (i.e. the type of medium, the linearity of the medium, the thickness of the medium, etc.) and in the design of the actual dosimeter (i.e. the number of fibres within a fiber bundle, etc.). The radiation dosimeter system is also flexible so that the user may select values for a few parameters based on what it is they want to use the radiation dosimeter system for. The optical property model used for calculation may also depend on these parameters. For example, if the user wishes to give a fraction to the patient, where the treatment target is the prostate, the tissue to be spared are the rectal walls and the bladder walls. So during this treatment, the radiation therapist may place two radiation dosimeters: one in the prostate, where 100% of the desired dose is to be delivered, and one on the rectal wall, where the dose is not to be greater than a certain allowed percentage of the maximum. The dosimeter placed in the prostate will be exposed to a significantly higher dose and dose rate than the dosimeter placed in the rectum (sizes may differ as well). Because of this, the sensitivity of the dosimeter in the prostate does not need to be as great as the dosimeter used in the rectum (i.e. an older, less sensitive radiation dosimeter can be used in the rectum and still provide sufficient results). The radiation therapist can then make a choice to use two dosimeters with differing sensitivities, and hence differing models, and still obtain accurate and precise dose readings in both measurement regions.

Another situation in which the radiation dosimeter system provides flexibility in use is in the dose range over which the radiation dosimeter is to be used. For example, if one wishes to use the radiation dosimeter on a patient that is receiving 54 Gy in only 6 fractions (this is an incredibly high dose to be delivered in such a short time), one needs to ensure that the dynamic range can cover the 9 Gy dose. The thickness of the radiation sensitive medium (and/or sensitivity) may be selected to enable the dynamic range to cover a 9 Gy dose. The radiation therapist can thus pick the right radiation dosimeter based on the needs of this specific irradiation. However, if the measurement was being conducted in situ, and the radiation dosimeter was inserted via a catheter and left there for the entire 6 fractions, the radiation dosimeter should preferably be able to cover all 54 Gy. Once again, the therapist may select an appropriate radiation dosimeter with a dynamic range and sufficient sensitivity may be chosen from several radiation dosimeters that are available.

Fluoroscopy is a procedure performed with low-energy X-rays (i.e. in the kV range like CT imaging) to guide an object through a patient or see something move within a patient. An example would be inserting an object through a vein/artery of the patient (for example, some procedures require an insertion of an object through an artery/vein near the groin and have it guided all the way to the heart). Fluoroscopy may also be used to watch movement in real time (i.e. blood flow using contrasting agent). Surgical guidance is another example where fluoroscopy may be employed. So, because X-rays are used, some dose is delivered to the patient. Although it does not generally happen, some patients can receive radiation burns during particularly long procedures. A dosimeter is useful in this case, because it can be inserted/positioned into/onto the patient, and the dose can be monitored to make sure the patient is not overexposed. A dosimeter, such as that proposed herein, is suitable for the energy range of the X-rays in which it would be used. Current dosimeters generally have metallic components that would introduce artefacts into the fluoro-image, and render it near-useless. This problem does not occur for the radiation dosimeter of the subject invention.

FULL CITATIONS FOR REFERENCES REFERRED TO IN THE SPECIFICATION

1. ICRU Report 24, 1976.
2. Klassen N. V., van der Zwan L., Cygler J., *GafChromic MD-55: Investigated as a precision dosimeter*, Med Phys 24(12): pp. 1924-1934, 1997.
3. McLaughlin W. L. et al., *Sensitometry of the response of a new radiochromic film dosimeter to gamma radiation and electron beams*, Nuclear Instruments and Methods in Physics Research A302 (1991).
4. McLaughlin W. L., Al-Sheikhly M., Lewis D. F., Kovacs A., Wojnarovits L., *A radiochromic solid-state polymerization reaction* in Irradiation of Polymers: Fundamentals and Technological applications, ACS Symposium Series No. 620 (ACS, Washington: 1996).
5. McLaughlin W. L. et al., *The use of radiochromic detector for the determination of stereotactic radiosurgery dose characteristics*, Med Phys 21(3): 1994.
6. Saylor M. C., Tamargo T. T., McLaughlin W. L., *A thin film recording medium for use in food irradiation*, Radiat Phys Chem 31(4-6): 1988.
7. Muench P. J., Meigooni A. S., Nath R., McLaughlin W. L., *Photon energy dependence of the sensitivity of radiochromic film and comparison with silver halide film and LiF TLDs used for brachytherapy dosimetry*, Med Phys 18(4): 1991.
8. Chiu-Tsao S., Zerda A., Lin J., Kim J. H., *High-sensitivity GafChromic film dosimetry for $^{125}I$ seed*, Med Phys 21(5): 1994.
9. Reinstein L. E. and Gluckman G. R., *Comparison of dose response of radiochromic film measured with He—Ne laser, broadband, and filtered light densitometers*, Med Phys 24(9): 1997.
10. Chu R. D. H. et al., *GafChromic Dosimetry Media: A New High Dose, Thin Film Routine Dosimeter And Dose Mapping Tool*, Radiat Phys Chem, 35(4-6), 1990.
11. McLaughlin, Desrosiers, Radiat Phys Chem 46:1995 (1163-1174).
12. Mack A. et al., *High precision film dosimetry with GafChromic® films for quality assurance especially when using small fields*, Med Phys 30(9): 2003.
13. Meigooni A. S., Sanders M. F., Ibbott G. S., Szeglin S. R., *Dosimetric characteristics of an improved radiochromic film*, Med Phys 23(11): pp, 1883-1888, 1996.
14. Reinstein L. E. and Gluckman G. R., *Optical density dependence on postirradiation temperature and time for MD-55-2 type radiochromic film*, Med Phys 26(3): 1999.
15. Sullivan P. R., Hasson B. F., Grossman C. H., Simpson L. D., *Optical density changes of GafChromic MD-55 film resulting from laser light exposure at wavelengths of 671 nm and 633 nm*, Med Phys 27(1): 2000.
16. Sixl H., *Electronic Structures of Conjugated Polydiacetylene Oligomer Molecules*, in Electronic Properties of Polymers and Related Compounds, Kuzmany H., Mehring M. and Roth S. Eds, Springer Verlag: Heidelberg, Berlin (1985).
17. Sixl H. and Warta R., *Excitons and Polarons in Polyconjugated Diacetylene Molecules*, in Electronic Properties of Polymers and Related Compounds, Kuzmany H., Mehring M. and Roth S. Eds, Springer Verlag: Heidelberg, Berlin (1985).
18. Almong P. R. et al, *AAPM's TG-51 protocol for clinical reference dosimetry of high-energy photon and electron beams*, Med Phys 26(9): 1999.
19. Martell E., Galbraith D., Munro P., Rawlinson J. A., Taylor W. B., *A flatness and calibration monitor for accelerator photon and electron beams*, Int J Radiation Oncology Biol Phys 12: 1986.
20. Ali I., Costescu C., Vicic M., Dempsey J. F., Williamson J. F., *Dependence of radiochromic film optical density post-exposure kinetics on dose and dose fractionation*, Med Phys 30(8): 1958-1967, 2003.
21. Cheung T., Butson M. J., Yu P. K. N., *Use of multiple layers of GafChromic film to increase sensitivity*, Phys Med Biol 46: N235-N240, 2001.
22. Baughman R. H., *Solid-state reaction kinetics in single-phase polymerization*, J Chem Phys 68(7): 1978.
23. Nath R., 'Physical properties and clinical uses of brachytherapy radionuclide', in "Brachytherapy Physics: MPM Summer School 1994", J. F. Williamson, B. R. Thomadsen, R. Nath, Eds. Medical Physics Publishing Corporation (Wisconsin, USA: 1995).
24. Tsibouklis J. et al., *Pentacosa-10,13-diynoic Acid/Henicosa-2,4-diynalamine alternate-layer Langmuir-Blodgett films: Synthesis, polymerization and electrical properties*, J Mater Chem 3, p. 97-104: 1993.

We claim:

1. A radiation dosimeter system for estimating a deposited radiation dose to an object, wherein the radiation dosimeter system comprises at least one radiation dosimeter located at or within the object, the radiation dosimeter including a radiation sensitive medium having an optical property that changes due to the deposited radiation dose, and the radiation dosimeter system provides an optical interrogation signal to the radiation dosimeter via an enclosed optical path for interacting with the radiation sensitive medium, wherein, in use, the optical interrogation signal is transformed into an optical information signal that encodes an ionizing radiation induced change in the optical property and wherein the radiation dosimeter system processes the optical information signal for estimating the deposited radiation dose.

2. The radiation dosimeter system of claim 1, wherein the radiation dosimeter system further comprises:
   a) a processing assembly connected to the at least one radiation dosimeter for providing the optical interrogation signal to the radiation dosimeter and receiving the optical information signal from the radiation dosimeter; and,
   b) an analysis unit connected to the processing assembly for enabling the radiation dosimeter to measure the deposited radiation dose by receiving and analyzing the optical information signal.

3. The radiation dosimeter system of claim 2, wherein the at least one radiation dosimeter is coupled to the processing assembly via an optical fiber cable and the at least one radiation dosimeter includes:
   a) a connection port for connecting to the optical fiber cable;
   b) the radiation sensitive medium for sensing the deposited radiation dose, where the optical property of the radiation sensitive medium changes due to the delivered radiation at a rate enabling real-time estimation of the deposited radiation dose;
   c) a delivery conduit coupled to the connection port and the radiation sensitive medium for delivering the optical interrogation signal to the radiation sensitive medium; and,
   d) a return conduit coupled to the connection port and the radiation sensitive medium for receiving the optical information signal from the radiation sensitive medium and delivering the optical information signal to the connection port.

4. The radiation dosimeter system of claim 2, wherein the processing assembly includes:
   a) a light source for generating the optical interrogation signal, the light source being connected to the optical fiber cable for providing the optical interrogation signal thereto; and,
   b) a light detector for detecting the optical information signal, and providing the detected optical information signal to the analysis unit, the light detector being connected to the optical fiber cable for receiving the optical information signal.

5. The radiation dosimeter system of claim 4, wherein the processing assembly further includes a multi-channel connector connected to the light source and the light detector and the radiation dosimeter system further includes a plurality of radiation dosimeters each connected to the multi-channel connector.

6. The radiation dosimeter system of claim 3, wherein the radiation sensitive medium has a shape adapted for enabling point-based measurement.

7. The radiation dosimeter system of claim 1, wherein the optical property includes optical density and the radiation sensitive medium undergoes a rate of change in optical density that is related to the dose rate at which the radiation dose is deposited.

8. The radiation dosimeter system of claim 7, wherein the analysis unit analyzes the rate of change in optical density of the radiation sensitive medium by employing a process to estimate the applied dose rate and cumulative appiied dose by using an optical property model based upon prior knowledge of a relation between at least one of dose rate and total accumulated dose, and the change in optical density of the radiation sensitive medium.

9. The radiation dosimeter system of claim 8, wherein the optical property of the radiation sensitive medium has a linear response to the deposited radiation and the dose rate of the deposited radiation is nominally constant and wherein the optical property model is a linear optical property model including a pre-delivery phase, a delivery phase and a post-delivery phase, each phase being characterized by a line having a different slope, the beginning of radiation delivery being identified by the intersection of the lines indicating the pre-delivery phase and the delivery phase and the end of radiation delivery being identified by the intersection of the lines indicating the delivery phase and post-delivery phase.

10. The radiation dosimeter system of claim 8, wherein the optical property of the radiation sensitive medium has a continuous response to the deposited radiation, yielding increasing signal with dose, and the dose rate of the deposited radiation is non-constant and wherein the optical property model is a continuous and increasing optical property model including a pre-delivery phase, a delivery phase and a post-delivery phase, the pre-delivery and post-delivery phases being identified when the time derivative of the optical density change has a value comparable to a predefined threshold value representing noise.

11. The radiation dosimeter system of claim 8, wherein the optical property of the radiation sensitive medium has a non-linear response to the deposited radiation and wherein the optical property model is a non-linear optical property model including a pre-delivery phase, a delivery phase and a post-delivery phase, the pre-delivery and post-delivery phases being identified when the time derivative of the optical density change is comparable to a predefined threshold value representing noise.

12. The radiation dosimeter system of claim 7, wherein the radiation dosimeter system generates the optical interrogation signal in a wavelength range that includes the wavelength at which an optimum change in optical density occurs for the radiation sensitive medium for a given dose range of the deposited radiation dose.

13. The radiation dosimeter system of claim 12, wherein the radiation dosimeter system employs a spectral window of interest including the wavelength at which the optimum change in optical density occurs for the radiation sensitive medium for a given dose range of the deposited radiation dose.

14. The radiation dosimeter system of claim 13, wherein the optical property of the radiation sensitive medium has a linear or non-linear response to ionizing radiation and the spectral window of interest used for analysis is shifted due to a shift in the wavelength at which the optimum change in optical density occurs that results from at least one of temperature of the radiation sensitive medium, cumulative total dose applied to the radiation sensitive medium, and age of the radiation sensitive medium.

15. The radiation dosimeter system of claim 1, wherein the optical property is optical density and, for a given deposited radiation dose, the change in optical density for the radiation sensitive medium is independent of the dose rate used to deliver the given deposited radiation dose for dose rates deemed acceptable during characterization of the radiation sensitive medium.

16. The radiation dosimeter system of claim 1, wherein the optical property is optical density and the radiation sensitive medium is made from radiation sensitive material with an optical density that increases with applied dose regardless of the cumulative total dose applied when the total cumulative applied dose is less than a saturation point at which there is a significant loss in sensitivity.

17. The radiation dosimeter system of claim 1, wherein the optical property is optical density and the radiation sensitive medium is made from a radiation sensitive material having a non-linear change in optical density in response to ionizing radiation.

18. The radiation dosimeter system of claim 1, wherein the object is a patient and the at least one radiation dosimeter is placed within the patient.

19. The radiation dosimeter system of claim 1, wherein the optical property includes one of absorbance, polarization, reflectivity, and Raman spectra.

20. A radiation dosimeter for use in estimating a deposited radiation dose to an object, the radiation dosimeter comprising:
   a) a connection port;
   b) a radiation sensitive medium for sensing the deposited radiation dose the radiation sensitive medium having an optical property that changes due to the deposited radiation at a rate enabling real-time estimation of the deposited radiation dose;
   c) a delivery conduit coupled to the connection port and the radiation sensitive medium for delivering an optical interrogation signal to the radiation sensitive medium; and,
   d) a return conduit coupled to the connection port and the radiation sensitive medium for receiving an optical information signal from the radiation sensitive medium and delivering the optical information signal to the connection port; wherein, in use, the optical property of the radiation sensitive medium is modified by the deposited radiation dose and the optical interrogation signal is transformed by an ionizing radiation induced change in the optical property of the radiation sensitive medium and this change in the optical property is encoded in the optical information signal thereby allowing for the estimation of the deposited radiation dose.

21. The radiation dosimeter of claim 20, wherein the radiation sensitive medium has a shape adapted for enabling point-based measurement.

22. The radiation dosimeter of claim 20, wherein the optical property is optical density and the radiation sensitive medium has an optical density that increases with deposited radiation dose independent of the dose rate used to deliver the radiation dose.

23. The radiation dosimeter of claim 20, wherein the delivery conduit includes a plurality of delivery optical fibers and the return conduit includes a plurality of return optical fibers, and the plurality of delivery optical fibers are positioned off-center with respect to the longitudinal axis of the radiation dosimeter.

24. The radiation dosimeter of claim 23, wherein the delivery and return conduit are located in an optical fiber bundle and the plurality of delivery and return optical fibers are randomly dispersed within the optical fiber bundle.

25. The radiation dosimeter of claim 23, wherein the delivery and return conduit are located in an optical fiber bundle and the plurality of delivery and return optical fibers are arranged in one of an alternating row configuration and an alternating column configuration.

26. The radiation dosimeter of claim 20, wherein the optical property is optical density and the radiation sensitive medium is made from radiation sensitive material with an optical density that increases with applied dose regardless of the cumulative total dose applied when the total cumulative applied dose is less than a saturation point at which there is a significant loss in sensitivity.

27. The radiation dosimeter of claim 20, wherein the optical property is optical density and the radiation sensitive medium is made from a radiation sensitive material having a non-linear change in optical density in response to ionizing radiation.

28. A method for estimating a deposited radiation dose to an object comprising:
   a) locating at least one radiation dosimeter at or within the object, the radiation dosimeter including a radiation sensitive medium having an optical property that changes in response to ionizing radiation in a manner related to the deposited radiation dose;
   b) providing an optical interrogation signal to the radiation dosimeter while the radiation dose is delivered to the object for interacting with the radiation sensitive medium, wherein the optical interrogation signal is transformed into an optical information signal which encodes the change in the optical property; and,
   c) analyzing the change in the optical property of the radiation sensitive medium that is encoded in the optical information signal using an optical property model for estimating the deposited radiation dose therefrom.

29. The method of claim 28, wherein the optical property of the radiation sensitive medium changes due to the deposited radiation dose at a rate enabling real-time estimation of the deposited radiation dose.

30. The method of claim 29, wherein the optical property includes optical density and the radiation sensitive medium undergoes a rate of change in optical density that is related to the dose rate at which the radiation dose is deposited.

31. The method of claim 30, wherein the method further includes generating the optical interrogation signal in a wavelength range that includes the wavelength at which an optimum change in optical density occurs for the radiation sensitive medium for a given dose range of the deposited radiation dose.

32. The method of claim 30, wherein the change in optical density of the radiation sensitive medium is characterized by the optical property model based on prior knowledge of a relation between at least one of the delivered dose rate, and total accumulated dose, and the rate of change in optical density of the radiation sensitive medium.

33. The method of claim 32, wherein the optical property of the radiation sensitive material has a linear response to the deposited radiation dose during ionization, and the method further includes calibrating the radiation dosimeter prior to use by calculating a sensitivity factor by:
   a) irradiating the radiation dosimeter with a single known calibration dose over a time interval;
   b) calculating the resulting change in optical density for the single known calibration dose over the time interval;
   c) obtaining calibration values including the optical density change near the start and end of the time interval; and,
   d) fitting a line to the calibration values and calculating the sensitivity factor by determining the slope of the line over the time interval.

34. The method of claim 33, wherein the optical property model is a linear optical property model including a baseline optical density value, and the method includes estimating the delivered radiation at a given time by measuring the optical density for the given time, subtracting a baseline optical density value and multiplying by the sensitivity factor obtained during calibration of the radiation dosimeter.

35. The method of claim 33, wherein the linear optical property model includes a pre-delivery phase, and a delivery phase, each phase being characterized by line having a different rate of change in optical density, the method further including:
   a) finding the intersection of the lines corresponding to the pre-delivery phase and the delivery phase to determine the beginning of radiation delivery and defining a first optical density thereat;
   b) measuring a second optical density after the beginning of radiation delivery; and,
   c) subtracting the first optical density from the second optical density to generate a change in optical density during delivery of the radiation dose.

36. The method of claim 35, wherein the linear optical property model further includes a post-delivery phase being characterized by a line having a different slope from the lines representing the pre-delivery and delivery phases, the method further including:
   a) finding the intersection of the lines corresponding to the delivery phase and post-delivery phase to determine the end of radiation delivery and defining a third optical density thereat; and,
   b) subtracting the first optical density from the third optical density to generate a total change in optical density during delivery of the radiation dose.

37. The method of claim 36, wherein defining the third optical density includes averaging several optical density values immediately after the intersection of the lines corresponding to the delivery and post-delivery phases.

38. The method of claim 35, wherein defining the first optical density includes averaging several optical density values prior to the intersection of the lines corresponding to the pre-delivery and delivery phases.

39. The method of claim 33, wherein the optical property model is a continuous and increasing optical property model including a pre-delivery phase, a delivery phase and a post-delivery phase, the pre-delivery and post-delivery phases being identified when the time derivative of the optical density change has a value comparable to a predefined threshold value representing noise, and wherein the continuous and increasing optical property model includes a baseline optical density value, and the method further includes estimating the delivered radiation at a given time by measuring the optical density for the given time, subtracting a baseline optical density value therefrom and multiplying by the sensitivity factor obtained during calibration of the radiation dosimeter.

40. The method of claim 32, wherein the optical property of the radiation sensitive material has a non-linear response to the deposited radiation dose during ionization, and the method further includes calibrating the radiation dosimeter prior to use by:
   a) irradiating the radiation dosimeter with a known calibration dose taking into account the total accumulated dose that the nonlinear radiation sensitive medium has been subjected to since first use;
   b) calculating the resulting change in optical density over several time intervals during irradiation to the known calibration dose; and,
   c) calculating a calibration relationship between the time derivative of the change in optical density and the time derivative of the known given dose at the several intervals during the entire exposure to calibration dose.

41. The method of claim 40, wherein the method includes fitting a line to the calibration data to determine an equation that defines the calibration relationship between the time derivative of the change in optical density and the time derivative of the known given dose over the entire exposure to the calibration dose.

42. The method of claim 40, wherein the method includes generating a lookup table that provides information for estimating the deposited radiation dose based on a given optical change, the information including data relating a change in optical density to applied dose and the information further including a set of scaling factors obtained from the calibration relationship for adjusting the change in optical density based on the total accumulated dose being given thus far to the radiation dosimeter.

43. The method of claim 40, wherein the optical property model is a non-linear optical property model including a pre-delivery phase, a delivery phase and a post-delivery phase, the pre-delivery and post-delivery phases being identified when the time derivative of the optical property change is comparable to a predefined threshold value representing noise.

44. The method of claim 40, wherein estimating the deposited radiation dose during use for a given time interval includes:
   a) noting the previous dose that the radiation dosimeter had been subjected to prior to the given time interval
   b) measuring the time derivative of the change in optical density for the given time interval;
   c) using the calibration relationship and the total dose delivered to the radiation dosimeter thus far to obtain a sensitivity factor expected for this time interval; and,
   d) multiplying the sensitivity factor by the time derivative of the change in optical density and the time duration of the given time interval.

45. The method of claim 29, wherein the method further includes analyzing the optical information signal by using a spectral window of interest that is generated to include the wavelength at which an optimum change in optical density occurs for the radiation sensitive medium for a given dose range of the deposited radiation dose.

46. The method of claim 45, wherein the optical property of the radiation sensitive medium has a linear or non-linear response to ionizing radiation and the method further includes shifting the spectral window of interest due to a shift in the wavelength at which the optimum change in optical density occurs that results from at least one of the temperature of the radiation sensitive medium, the cumulative total dose applied to the radiation sensitive medium, and age of the radiation sensitive medium.

47. A method of creating an optical property model for calibrating a radiation dosimeter for estimating a radiation dose applied to an object, wherein the method comprises:
   a) selecting a radiation sensitive medium that undergoes an ionizing radiation induced change in an optical property when subjected to the radiation dose;
   b) selecting one of a linear, a continuous and increasing, and non-linear optical property model depending on the response properties of the optical property of the radiation sensitive medium and the dose rate of the applied radiation dose
   c) exposing the radiation sensitive medium to a range of doses and dose rates to obtain calibration data and parameters for classifying the behaviour of the radiation sensitive medium; and,
   d) using the parameters, calibration data and selected optical property model for estimating the radiation dose during use of the radiation dosimeter.

48. The method of claim 47, wherein (c) includes classifying the behaviour of the radiation sensitive medium at short time scales during which the optical property changes at a rate allowing radiation dose to be estimated in real-time.

49. The method of claim 47, wherein the linear optical property model is selected and the method further includes characterizing the linear optical property model by defining a pre-delivery phase, a delivery phase and a post-delivery phase, each phase being characterized by defining a line, the beginning of radiation delivery being identified by the intersection of the lines indicating the pre-delivery phase and the delivery phase and the end of radiation delivery being identified by the intersection of the lines indicating the delivery phase and post-delivery phase.

50. The method of claim 47, wherein one of the continuous and increasing optical property model and the non-linear optical property model is selected, and the method further includes characterizing the selected optical property model by defining a pre-delivery phase, a delivery phase and a post-delivery phase, the pre-deiivery and post-delivery phases being identified when the time derivative of the optical property has a value comparable to a predefined threshold value representing noise.

51. The method of claim 47, wherein one of the linear and the continuous and increasing optical property models is selected and the method further includes calibrating the radiation dosimeter prior to use by calculating a sensitivity factor by:

e) irradiating the radiation dosimeter with a single known calibration dose over a time interval;

f) calculating the resulting change in optical density for the single known calibration dose over the time interval;

g) obtaining calibration values including the optical density change near the start and end of the time interval; and, h) fitting a line to the calibration values and calculating the sensitivity factor by determining the slope of the line over the time interval.

52. The method of claim 47, wherein the nonlinear optical property model is selected and the method includes calibrating the radiation dosimeter prior to use by:

e) irradiating the radiation dosimeter with a known calibration dose taking into account the total accumulated dose that the radiation sensitive medium has been subjected to since first use;

f) calculating the resulting change in optical density over several time intervals during irradiation to the known calibration dose; and, g) calculating a calibration relationship between the time derivative of the change in optical density and the time derivative of the known given dose at the several intervals during the entire exposure to calibration dose.

* * * * *